(12) United States Patent
Kozareva et al.

(10) Patent No.: US 11,216,735 B2
(45) Date of Patent: Jan. 4, 2022

(54) METHOD AND SYSTEM FOR PROVIDING SYNTHETIC ANSWERS TO A PERSONAL QUESTION

(71) Applicant: Verizon Media Inc., New York, NY (US)

(72) Inventors: Zornitsa Kozareva, Santa Clara, CA (US); Scott Gaffney, Palo Alto, CA (US)

(73) Assignee: VERIZON MEDIA INC., New York, NY (US)

( * ) Notice: Subject to any disclaimer, the term of this patent is extended or adjusted under 35 U.S.C. 154(b) by 391 days.

(21) Appl. No.: 14/874,852

(22) Filed: Oct. 5, 2015

(65) Prior Publication Data
US 2017/0098168 A1  Apr. 6, 2017

(51) Int. Cl.
*G06N 5/04* (2006.01)

(52) U.S. Cl.
CPC ...................... *G06N 5/04* (2013.01)

(58) Field of Classification Search
CPC ........ G06N 7/02; G06N 99/005; G06N 5/022; G06F 17/30604
See application file for complete search history.

(56) References Cited

U.S. PATENT DOCUMENTS

| | | | |
|---|---|---|---|
| 8,055,675 B2 * | 11/2011 | Higgins | G06F 17/3064 707/711 |
| 8,935,277 B2 * | 1/2015 | Kuchmann-Beauger | G06F 17/30451 707/769 |
| 9,576,007 B1 * | 2/2017 | Sivathanu | G06F 17/30321 |
| 9,679,568 B1 * | 6/2017 | Taubman | G10L 15/30 |
| 9,842,166 B1 * | 12/2017 | Leviathan | G06F 16/9024 |
| 9,940,584 B2 * | 4/2018 | Bagchi | G06N 5/04 |
| 2013/0290234 A1 | 10/2013 | Harris et al. | |
| 2015/0006501 A1 * | 1/2015 | Talmon | G06F 17/30958 707/708 |
| 2015/0095303 A1 * | 4/2015 | Sonmez | G06N 5/003 707/707 |
| 2015/0178267 A1 * | 6/2015 | Heo | G06F 17/30684 707/722 |
| 2015/0356170 A1 * | 12/2015 | Allen | G06F 16/3329 707/725 |

(Continued)

OTHER PUBLICATIONS

Sanda Harabagiu and Cosmin Adrian Bejan, "Question Answering Based on Temporal Inference", 2005, American Association for Artificial Intelligence, pp. 1-8. (Year: 2005).*

(Continued)

*Primary Examiner* — Kamran Afshar
*Assistant Examiner* — Ying Yu Chen
(74) *Attorney, Agent, or Firm* — Venable LLP

(57) ABSTRACT

A method, implemented on at least one computing device each of which has at least one processor, storage, and a communication platform connected to a network for providing synthetic answers to a personal question is disclosed. A personal question is received from a person. One or more entities are extracted from the personal question. One or more relations are extracted from the personal question. A model is selected based on the personal question. One or more synthetic answers to the personal question are obtained based on the one or more entities, the one or more relations, and the selected model.

21 Claims, 39 Drawing Sheets

(56) References Cited

U.S. PATENT DOCUMENTS

2015/0370787 A1* 12/2015 Akbacak ................ G06F 40/47
704/2

OTHER PUBLICATIONS

Office Action dated Oct. 2, 2017 in U.S. Appl. No. 14/874,926.
Notice of Allowance dated Apr. 2, 2018 in U.S. Appl. No. 14/874,926.
Notice of Allowance dated May 17, 2018 in U.S. Appl. No. 14/874,926.

* cited by examiner

| Question | Feature 1 | Feature 2 | Feature 3 | Category |
|---|---|---|---|---|
| How to write a good resume? | Resume | | | Non-personal |
| When is Taylor Swift's birthday? | Taylor Swift | Birthday | | Non-personal |
| E-ticket for Taylor Swift's concert? | Taylor Swift | E-ticket | Concert | Personal |
| Where is Joe's football game on Sunday? | Joe | Football game | Sunday | Personal |
| ... | ... | ... | ... | |

Fig. 21

| Question | Pattern | Category | Last Modified Time | ... |
|---|---|---|---|---|
| How to write a good resume? | How | Non-personal | 2014-8-21 9:34 | ... |
| When is Taylor Swift's birthday? | celebrity | Non-personal | 2014-12-20 22:15 | ... |
| E-ticket for Taylor Swift's concert? | celebrity + personal event information | Personal | 2015-1-8 10:34 | ... |
| Where is Joe's football game on Sunday? | Personal entity | Personal | 2015-5-10 21:23 | ... |
| ... | ... | ... | ... | ... |

Fig. 23

| Sequential Action / Dwell time | Click on another person-centric answer card | Click on a public answer card | Click on multiple public answer cards | Ask a new question |
|---|---|---|---|---|
| Long | High | High | Moderate | Moderate |
| Moderate | High | Moderate | Low | Low |
| Short | Moderate | Low | Low | Low |
| ... | ... | ... | ... | ... |

Fig. 27

| Entity 1 | Entity 2 | Entity 3 | Entity 4 | Relation/ Action | Argument 1 | Argument 2 |
|---|---|---|---|---|---|---|
| Taylor Swift | Verizon Center | Concert | Oct. 10, 2015 | Book e-ticket | Taylor Swift's concert is on October 10, 2015. | Taylor Swift's concert is at Verizon Center. |
| Uncle Sam | Annie | 55 | | Wife | Anne is uncle Sam's wife. | Annie is 55 years old. |
| Joe | McLean High School | Football game | Sunday | Play | Joe's football game is on Sunday | Joe's football game is at McLean High School. |
| Mary | Flower | FTD.com | Mother's day | Your mother | Flower is delivered from FTD.com. | Flower is delivered to your mother. |
| ... | ... | ... | ... | ... | ... | ... |

Fig. 34

| Entity | Variation 1 | Variation 2 | Variation 3 | Variation 4 |
|---|---|---|---|---|
| Taylor Swift | Swifty | T-Swizzle | T-Swift | Shake it off |
| Verizon Center | Stadium | Center | Washington DC | |
| Recreation Center | Gym | Exercise | Swimming pool | Racquet Court |
| Uncle Sam's wife | Annie | | | |
| ... | ... | ... | ... | ... |

Fig. 35

| Verb | Variation 1 | Variation 2 | Variation 3 | Variation 4 |
|---|---|---|---|---|
| Book | Purchase | Order | Buy | Reserve |
| Call | Conference | Meet | Discuss | |
| Hike | Walk | Jogging | Trail | Explore |
| ... | ... | ... | ... | ... |

Fig. 36

| Entity 1 | Entity 2 | Entity 3 | Entity 4 | Relation/Action | Argument 1 | Argument 2 |
|---|---|---|---|---|---|---|
| Taylor Swift | Verizon Center | Concert | Oct. 10, 2015 | Book e-ticket | Taylor Swift's concert is on October 10, 2015. | Taylor Swift's concert is at Verizon Center. |
| Uncle Sam | Annie | 55 | | Wife | Annie is uncle Sam's wife. | Annie is 55 years old. |

| Entity | Variation 1 | Variation 2 | Variation 3 |
|---|---|---|---|
| Verizon Center | Stadium | Center | Washington DC |
| Uncle Sam's wife | Annie | | |

| Question | Entity 1 | Relation | Entity 3 | Entity 3 Variation | Answer |
|---|---|---|---|---|---|
| How old is uncle Sam's wife? | Uncle Sam (Exact match found) | Wife (Exact match found) | | | Uncle Sam's wife is 55 years old. |
| Taylor Swift's concert in a DC stadium? | Taylor Swift (Exact match found) | Concert (Exact match found) | DC stadium (Exact match not found) | Verizon Center (Similar match found) | Taylor Swift's concert is in DC Verizon Center. |

Fig. 37

METHOD AND SYSTEM FOR PROVIDING SYNTHETIC ANSWERS TO A PERSONAL QUESTION

CROSS-REFERENCE TO RELATED APPLICATION

The present application is related to U.S. Application Ser. No. 14/874,926, filed on even date, entitled METHOD AND SYSTEM FOR CLASSIFYING A QUESTION, which is incorporated herein by reference in its entirety.

BACKGROUND

1. Technical Field

The present teaching generally relates to organizing, retrieving, presenting, and utilizing information. Specifically, the present teaching relates to methods and systems for classifying a question into a personal question or a non-personal question and providing synthetic answers to a personal question.

2. Discussion of Technical Background

The Internet has made it possible for a person to electronically access virtually any content at any time and from any location. The Internet technology facilitates information publishing, information sharing, and data exchange in various spaces and among different persons. One problem associated with the rapid growth of the Internet is the so-called "information explosion," which is the rapid increase in the amount of available information and the effects of this abundance. As the amount of available information grows, the problem of managing the information becomes more difficult, which can lead to information overload. With the explosion of information, it has become more and more important to provide users with information from a public space that is relevant to the individual person and not just information in general.

In addition to the public space such as the Internet, semi-private spaces including social media and data sharing sites have become another important source where people can obtain and share information in their daily lives. The continuous and rapid growth of social media and data sharing sites in the past decade has significantly impacted the lifestyles of many; people spend more and more time on chatting and sharing information with their social connections in the semi-private spaces or use such semi-private sources as additional means for obtaining information and entertainment. Similar to what has happened in the public space, information explosion has also become an issue in the social media space, especially in managing and retrieving information in an efficient and organized manner.

Private space is another data source used frequently in people's everyday lives. For example, personal emails in YAHOO! mail, GMAIL, OUTLOOK etc. and personal calendar events are considered as private sources because they are only accessible to a person when she or he logs in using private credentials. Although most information in a person's private space may be relevant to the person, it is organized in a segregated manner. For example, a person's emails may be organized by different email accounts and stored locally in different email applications or remotely at different email servers. As such, to get a full picture of some situation related to, e.g., some event, a person often has to search different private spaces to piece everything together. For example, to check with a friend of the actual arrival time for a dinner, one may have to first check a particular email (in the email space) from the friend indicating the time the friend will arrive, and then go to Contacts (a different private space) to search for the friend's contact information before making a call to the friend to confirm the actual arrival time. This is not convenient.

The segregation of information occurs not only in the private space, but also in the semi-private and public spaces. This has led to another consequential problem given the information explosion: requiring one to constantly look for information across different segregated spaces to piece everything together due to lack of meaningful connections among pieces of information that are related in actuality yet isolated in different segregated spaces.

Efforts have been made to organize the huge amount of available information to assist a person to find the relevant information. Conventional scheme of such effort is application-centric and/or domain-centric. Each application carves out its own subset of information in a manner that is specific to the application and/or specific to a vertical or domain. For example, such attempt is either dedicated to a particular email account (e.g., www.Gmail.com) or specific to an email vertical (e.g., Outlook); a traditional web topical portal allows users to access information in a specific vertical, such as www.IMDB.com in the movies domain and www.ESPN.com in the sports domain. In practice, however, a person often has to go back and forth between different applications, sometimes across different spaces, in order to complete a task because of the segregated and unorganized nature of information existing in various spaces. Moreover, even within a specific vertical, the enormous amount of information makes it tedious and time consuming to find the desired information.

Another line of effort is directed to organizing and providing information in an interest-centric manner. For example, user groups of social media in a semi-private space may be formed by common interests among the group members so that they can share information that is likely to be of interest to each other. Web portals in the public space start to build user profiles for individuals and recommend content based on an individual person's interests, either declared or inferred. The effectiveness of interest-centric information organization and recommendation is highly relied on the accuracy of user profiling. Oftentimes, however, a person may not like to declare her/his interests, whether in a semi-private space or a public space. In that case, the accuracy of user profiling can only be relied on estimation, which can be questionable. Accordingly, neither of the application-centric, domain-centric, and interest-centric ways works well in dealing with the information explosion challenge.

FIG. 1 depicts a traditional scheme of information organization and retrieval in different spaces in a segregated and disorganized manner. A person 102 has to interact with information in private space 104, semi-private space 106, and public space 108 via unrelated and separate means 110, 112, 114, respectively. For accessing private data from the private space 104, means 110, such as email applications, email sites, local or remote Contacts and calendars, etc., has to be selected and used. Each means 110 is domain or application-oriented, allowing the person 102 to access information related to the domain with the specific application that the means 110 is developed for. Even for information residing within different applications/domains in the private space 104, a person 102 still has to go by different means 110 to access content of each application/domain, which is not convenient and not person-centric. For example, in order to find out the phone numbers of attendees of a birthday party, the person 102 has to first find all the confirmation emails from the attendees (may be sent in different emails and even to different email accounts), write down each name, and open different Contacts to look for their phone numbers.

Similarly, for interacting with the semi-private space 106, a person 102 needs to use a variety of means 112, each of which is developed and dedicated for a specific semi-private data source. For example, FACEBOOK™ desktop application, FACEBOOK™ mobile app, and FACEBOOK™ site are all means for accessing information in the person 102's FACEBOOK™ account. But when the person 102 wants to open any document shared on DROPBOX™ by a FACE-BOOK™ friend, the person 102 has to switch to another means dedicated to DROPBOX™ (a desktop application, a mobile app, or a website). As shown in FIG. 1, information may be transmitted between the private space 104 and the semi-private space 106. For instance, private photos can be uploaded to a social media site for sharing with friends; social media or data sharing sites may send private emails to a person 102's private email account notifying her/him of status updates of social friends. However, such information exchange does not automatically create any linkage between data between the private and semi-private spaces 104, 106. Thus, there is no application that can keep track of such information exchange and establish meaningful connections, much less utilizing the connections to make it easier to search for information.

As to the public space 108, means 114 such as traditional search engines (e.g., www.Google.com) or web portals (e.g., www.CNN.com, www.AOL.com, www.IMDB.com, etc.) are used to access information. With the increasing challenge of information explosion, various efforts have been made to assist a person 102 to efficiently access relevant and on-the-point content from the public space 108. For example, topical portals have been developed that are more domain-oriented as compared to generic content gathering systems such as traditional search engines. Examples include topical portals on finance, sports, news, weather, shopping, music, art, movies, etc. Such topical portals allow the person 102 to access information related to subject matters that these portals are directed to. Vertical search has also been implemented by major search engines to help to limit the search results within a specific domain, such as images, news, or local results. However, even if limiting the search result to a specific domain in the public space 108, there is still an enormous amount of available information, putting much burden on the person 102 to identify desired information.

There is also information flow among the public space 108, the semi-private space 106, and the private space 104. For example, www.FedEx.com (public space) may send a private email to a person 102's email account (private space) with a tracking number; a person 102 may include URLs of public websites in her/his tweets to followers. However, in reality, it is easy to lose track of related information residing in different spaces. When needed, much effort is needed to dig them out based on memory via separate means 110, 112, 114 across different spaces 104, 106, 108. In today's society, this consumes more and more people's time.

Because information residing in different spaces or even within the same space is organized in a segregated manner and can only be accessed via dedicated means, the identification and presentation of information from different sources (whether from the same or different spaces) cannot be made in a coherent and unified manner. For example, when a person 102 searches for information using a query in different spaces, the results yielded in different search spaces are different. For instance, search result from a conventional search engine directed to the public space 108 is usually a search result page with "blue links," while a search in the email space based on the same query will certainly look completely different. When the same query is used for search in different social media applications in the semi-private space 106, each application will again likely organize and present the search result in a distinct manner. Such inconsistency affects user experience. Further, related information residing in different sources is retrieved piece meal so that it requires the person 102 to manually connect the dots provide a mental picture of the overall situation.

Therefore, there is a need for improvements over the conventional approaches to organize, retrieve, present, and utilize information.

SUMMARY

The present teaching relates to methods, systems, and programming for classifying a question and providing synthetic answers to a personal question.

In one embodiment, a method, implemented on at least one computing device each of which has at least one processor, storage, and a communication platform connected to a network for providing synthetic answers to a personal question is disclosed. A personal question is received from a person. One or more entities are extracted from the personal question. One or more relations are extracted from the personal question. A model is selected based on the personal question. One or more synthetic answers to the personal question are obtained based on the one or more entities, the one or more relations, and the selected model.

In some embodiments, the selected model comprises one or more entity-relation arguments generated based on information associated with the person.

In some embodiments, a determination is made as to whether there is a first exact match between the one or more entities and the selected model. A further determination is made as to whether there is a second exact match between the one or more relations and the selected model. When there is a first exact match between the one or more entities and the selected model and there is a second exact match between the one or more relations and the selected model, a first set of answers is obtained from the selected model.

In some embodiments, when there is no first exact match between the one or more entities and the selected model or there is no second exact match between the one or more relations and the selected model, a second set of answers is obtained from the selected model that satisfy a first fuzzy match between the one or more entities and the selected model and a second fuzzy match between the one or more relations and the selected model.

In some embodiments, the selected model is trained using a machine learning system.

In some embodiments, each of the one or more entity-relation arguments indicates an aspect of person-centric knowledge associated with the person.

In some embodiments, validities of the one or more synthetic answers are determined. When it is determined that one synthetic answer is invalid, a list of tasks is generated to search for information that validates the synthetic answer.

In another embodiment, a system having at least one processor, storage, and a communication platform connected to a network for providing synthetic answers to a personal question is disclosed. The system comprises a user interface implemented on the at least one processor and configured to receive a personal question from a person; an entity extractor implemented on the at least one processor and configured to extract one or more entities from the personal question; a relation extractor implemented on the at least one processor and configured to extract one or more relations from the personal question; a person-centric knowledge retriever implemented on the at least one processor and configured to retrieve a model selected based on the personal question; and a synthetic answer engine implemented on the at least one processor and configured to generate one or more synthetic answers to the personal question.

In yet another embodiment, a non-transitory machine-readable medium having information recorded thereon for providing synthetic answers to a personal question is disclosed. The information, when read by the machine, causes the machine to perform receiving a personal question from a person; extracting one or more entities from the personal question; extracting one or more relations from the personal question; retrieving a model selected based on the personal question; and obtaining one or more synthetic answers to the personal question based on the one or more entities, the one or more relations, and the selected model.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 21 depicts an exemplary person-centric knowledge for classifying a question, according to an embodiment of the present teaching;

FIG. 23 depicts an exemplary person-centric knowledge for classifying a question, according to another embodiment of the present teaching;

FIG. 27 depicts an example of determining the classification accuracy based on two parameters, according to another embodiment of the present teaching;

FIG. 34 depicts exemplary person-centric knowledge for providing synthetic answers to a personal question, according to an embodiment of the present teaching;

FIG. 35 depicts an exemplary person-centric knowledge for providing synthetic answers to a personal question, according to another embodiment of the present teaching;

FIG. 36 depicts an exemplary person-centric knowledge for providing synthetic answers to a personal question, according to another embodiment of the present teaching;

FIG. 37 depicts an example of obtaining synthetic answers to a personal question based on the person-centric knowledge, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching describes methods, systems, and programming aspects of efficiently and effectively organizing, retrieving, presenting, and utilizing information.

Figure 1:
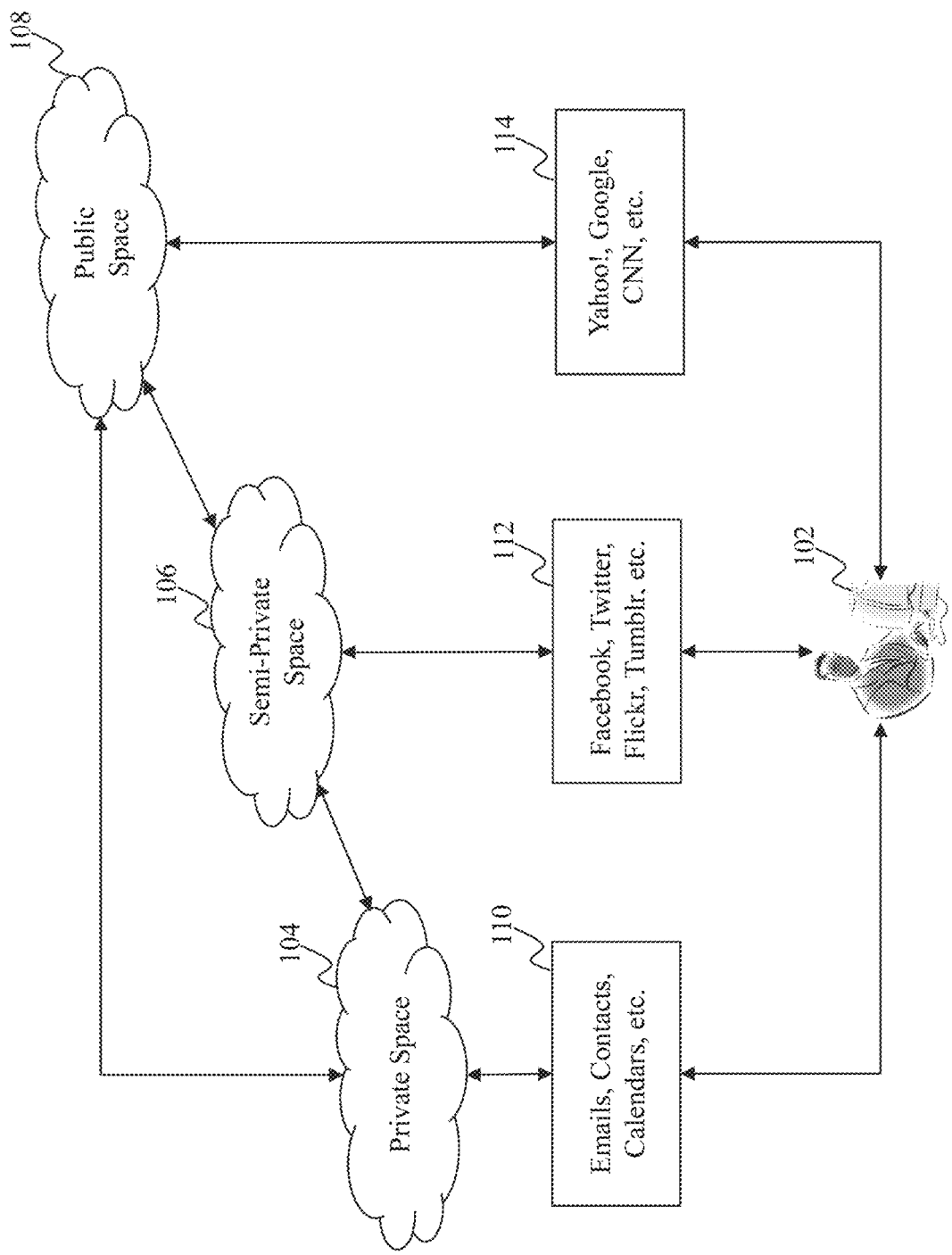
FIG. 1 (prior art) depicts a traditional scheme of information organization and retrieval from different spaces in a segregated and disorganized manner.
Figure 2:
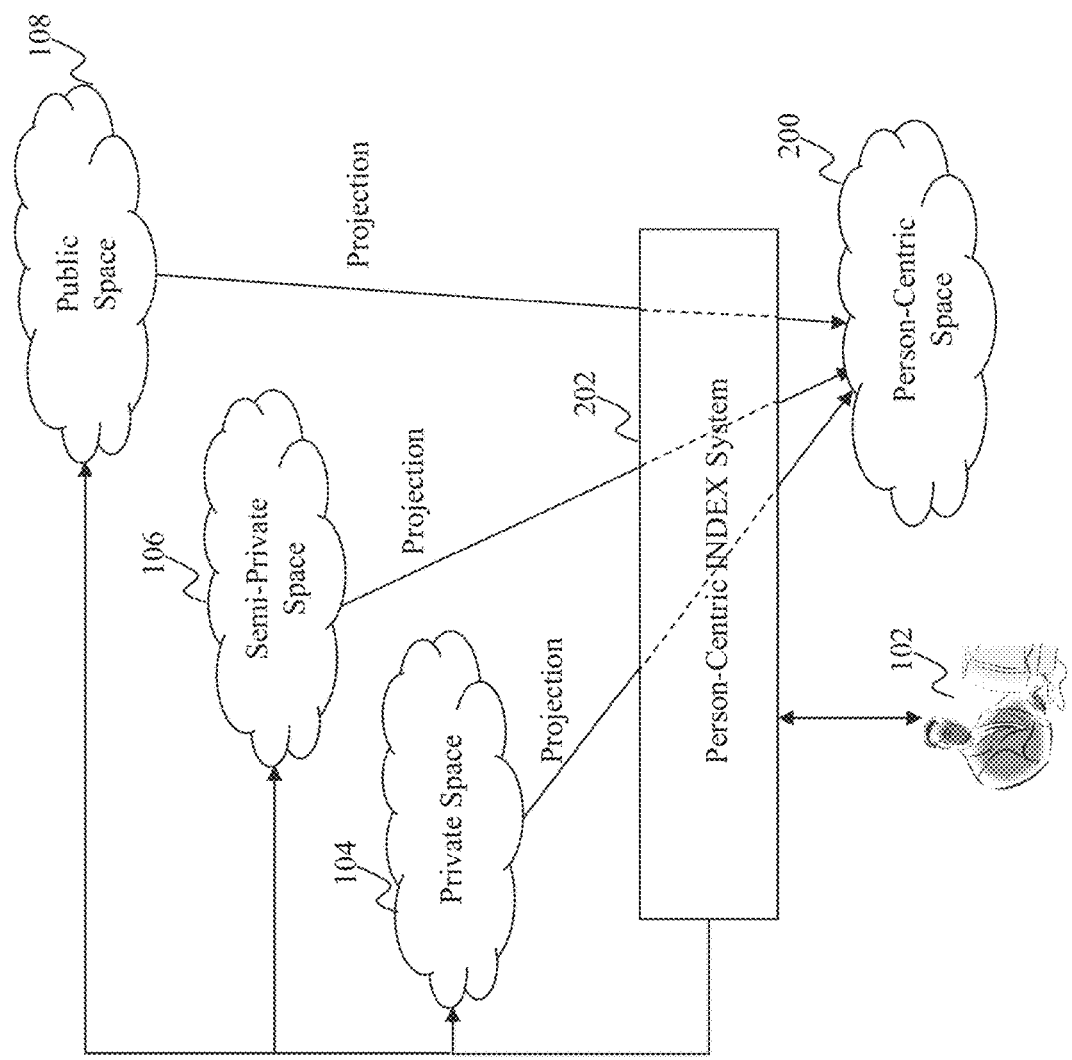
FIG. 2 depicts a novel scheme of building a person-centric space for a person by cross-linking data from different spaces and applications thereof, according to an embodiment of the present teaching.

FIG. 2 depicts a novel scheme of building a person-centric space 200 for a person 102 by cross-linking data from different spaces and applications thereof, according to an embodiment of the present teaching. Unlike the traditional approach to organize information in different spaces in a segregated and disorganized manner, as illustrated in FIG. 1, FIG. 2 provides a person-centric INDEX system 202, which builds the person-centric space 200 specific to the person 102 by digesting information from the public space 108, semi-private space 106, and private space 104 and cross-linking relevant data from those spaces 104, 106, 108. As described herein, a person 102 referred herein may include a human being, a group of people, an organization such as a business department or a corporation, or any unit that can use the person-centric INDEX system 202. A space, whether private, semi-private, or public, may be a collection of information in one or more sources. Through the person-centric INDEX system 202, information relevant to the person 102 from each of the private, semi-private, and public spaces 104, 106, and 108 is projected, into the person-centric space 200 in a meaningful manner. That is, a part of the data in the person-centric space 200 is projected from the public space 108 in a manner relevant to the person 102; a part of the data in the person-centric space 200 is projected from the semi-private space 106 in a manner relevant to the person 102; a part of the data in the person-centric space 200 is projected from the private space 104. Thus, the person-centric space 200 is an information universe meaningful to the person 102 and formed from the perspective of the person 102.

Different from conventional approaches, which organize information in an application-centric, domain-centric, or interest-centric manner, the person-centric INDEX system 202 recognizes relevant information from the enormous information available in the public space 108, semi-private space 106, and private space 104 in accordance with the perspective of the person 102, thereby filtering out information that is not relevant to the person 102, assisting the person 102 to make sense out of the relevance among different pieces of information in the person-centric space. The person-centric space 200 is dynamic and changes with the online (possibly offline) activities of the person 102. For example, the person 102 can search more content via the person-centric INDEX system 202 (this function may be similar to conventional search engine) that will lead to the continuously expansion of the person-centric space 200. The person-centric INDEX system 202 can cross-link data across information different spaces, or information from different sources in the same space. For instance, by identifying a FedEx tracking number in an order confirmation email sent to a personal email account from www.Amazon.com, the person-centric INDEX system 202 can automatically search for any information in any space that is relevant to the tracking number, such as package delivery status information from www.FedEx.com in the public space 108. Although most information from www.FedEx.com may not be related to the person 102, the particular package delivery status information relevant to the person 102 and can be retrieved by the person-centric INDEX system 202 and indexed against the information from the person 102's private emails. In other words, the package delivery status information, even though from the public space 108, can be projected into the person-centric space 200 and, together with other information in the person-centric space 200 (such as a confirmation email related to the package), the person-centric INDEX system 202 integrates relevant information from different sources to yield unified and semantically meaningful information, such as a card related to an order incorporating the name of the ordered item, the name of the person who ordered it, the name of the company that is to deliver the item, as well as the current delivery status.

In another example, when a private email reminding of an upcoming soccer game from a coach is received, the person-centric INDEX system 202 may be triggered to process the private email and identify, based on the content of the email, certain information in the sports domain such as date/time, location, and players and coaches of the soccer game and cross link the email with such information. The person-centric INDEX system 202 may also retrieve additional relevant information from other data sources, such as phone number of the coach from Contacts of the person 102. The person-centric INDEX system 202 may also retrieve map and directions to the soccer game stadium from Google Maps based on the location information and retrieve weather forecast of the game from www.Weather.com based on the date. If the coach is connected with the person 102 in any social media, then the person-centric INDEX system 202 may go to the social media site in the semi-private space 106 to retrieve any content made by the coach that is relevant to the soccer game. In this example, all those different pieces of information from the public space 108, semi-private space 106, and private space 104 are cross-linked and projected to the person-centric space 200 in accordance with the person 102's perspective on the soccer game.

The person-centric INDEX system 202 may build the initial person-centric space 200 when the person 102 first time accesses the person-centric INDEX system 202. By analyzing all the information in the private space 104 which the person 102 has granted access permission, the person-centric INDEX system 202 can identify, retrieve, and link relevant information from the public space 108, semi-private space 106, and private space 104 and project them into the person-centric space 200. As mentioned above, the person-centric INDEX system 202 also maintains and updates the person-centric space 200 in a continuous or dynamic manner. In one example, the person-centric INDEX system 202 may automatically check any change, either in the private space 104 or otherwise, based on a schedule and initiates the update of the person-centric space 200 when necessary. For example, every two hours, the person-centric INDEX system 202 may automatically check any new email that has not been analyzed before. In another example, the person-centric INDEX system 202 may automatically check any change occurring in the public space 108 and the semi-private space 106 that is relevant to the person 102. For instance, in the soccer game example described above, every day before the scheduled soccer game, the person-centric INDEX system 202 may automatically check www.Weather.com to see if the weather forecast needs to be updated. The person-centric INDEX system 202 may also update the person-centric space 200 responsive to some triggering event that may affect any data in the person-centric space 200. For example, in the FedEx package example described above, once the scheduled delivery date has passed or a package delivery email has been received, the person-centric INDEX system 202 may update the person-centric space 200 to remove the temporary relationship between the person 102 and www.FedEx.com until a new connection between them is established again in the future. The triggering event is not limited to events happening in the public space 108, semi-private space 106, or private space 104, but can include any internal operation of the person-centric INDEX system 202. As an example, every time the person-centric INDEX system 202 performs a search in response to a query or to answer a question, it may also trigger the person-centric INDEX system 202 to update the person-centric space 200 based on, e.g., newly retrieved information related to, e.g., a search result or some answers. When the search result or answers cannot be found in the person-centric space 200, the person-centric INDEX system 202 may also update the person-centric space 200 to include those search results and answers. That is, the person-centric INDEX system 202 may dynamically update the person-centric space 200 in response to any suitable triggering events.

To better understand information in the person-centric space 200 and make it meaningful, the person-centric INDEX system 202 may further build a person-centric knowledge database including person-centric knowledge by extracting and associating data about the person 102 from the person-centric space 200. The person-centric INDEX system 202 can extract entities related to the person 102 and infer relationships between the entities without the person 102's explicit declaration. A person-centric knowledge representation for the person 102 can be created by person-centric INDEX system 202 the based on the entities and relationships. The inference can be based on any information in the person-centric space 200. The knowledge elements that can be inferred or deduced may include the person 102's social contacts, the person 102's relationships with places, events, etc.

In order to construct the person-centric knowledge representation, the person-centric INDEX system 202 may extract entities from content in the person 102's person-centric space 200. These entities can be places like restaurants or places of interest, contact mentions like names, emails, phone numbers or addresses, and events with date, place and persons involved. In addition to extracting these mentions, the person-centric INDEX system 202 can resolve them to what they refer to (i.e. can disambiguate an extracted entity when it may refer to multiple individuals). For example, a word "King" in a private email may refer to a title of a person who is the King of a country or refer to a person's last name. The person-centric INDEX system 202 may utilize any information in the person-centric space 200 to determine what type of entity the word "King" refers to in the email. In addition to determining an entity type for an extracted entity name, the person-centric INDEX system 202 may also determine a specific individual referred to by this entity name. As one instance, a person's first name may refer to different contacts, and a same restaurant name can refer to several restaurants. The person-centric INDEX system 202 can make use of contextual information and/or textual metadata associated with the entity name in the email to disambiguate such cases, thereby providing a high precision resolution. With the precise disambiguation, the person-centric INDEX system 202 can find right information from unstructured personal data and provide it in a structured way (e.g. in a graph associated with the person 102). In contrast to a conventional personal profile, the person-centric INDEX system 202 generates a single personal graph for an individual to encompass connections, interests, and events associated with the person 102. It can be understood that a person-centric knowledge may also be represented in a format other than a graph.

The person-centric INDEX system 202, in conjunction with the person-centric space 200, may organize related information from different sources and provide the information to a person 102 in a user-friendly, unified presentation style. In addition to providing requested information in any known format, such as hyperlinks on a search results page, the person-centric INDEX system 202 may present information in intent-based cards. Unlike existing entity-based search results cards organizing results based on an entity, the person-centric INDEX system 202 may focus on a person 102's intent to dynamically build a card for the person 102. The intent may be explicitly specified in the query, or estimated based on the context, trending events, or any knowledge derived from the person-centric space 200. Knowing the person 102's intent when the card is created to answer the query, the person-centric INDEX system 202 can provide relevant information on the card. The relevant information may include partial information associated with the entity in the query, and/or additional information from the person-centric space 200 that is related to the person's intent. In the soccer game example described above, in response to the person's query or question related to the soccer game, the person-centric INDEX system 202 may estimate the person's intent is to know the date/time of the game and thus, build a card that includes not only the direct answer of the date/time but also other information related to the soccer game in the person-centric space 200, such as the map and directions, weather forecast, and contact information of the coach.

In one embodiment, knowing the current intent of the person 102, the person-centric INDEX system 202 can anticipate the next intent of the person 102, such that the current card provided by the person-centric INDEX system 202 can lead to next steps. For example, the person-centric INDEX system 202 can anticipate that after looking at the show times of a new movie, the person 102 will be likely to buy tickets. In another embodiment, focusing on the person 102's intent, the person-centric INDEX system 202 can answer the person 102 with a card even when there is no entity in the query or request (i.e., in a query-less or anticipatory use case). For example, if the person-centric INDEX system 202 determines that the person 102 has a behavior pattern of searching traffic information from work place to home at 5 pm on workdays, then from now on, the person-centric INDEX system 202 may automatically generate and provide a notice card to the person 102 at around 5 pm on every workday, to notify the person 102 about the traffic information regardless whether a query is received from the person 102.

The person-centric INDEX system 202 can be used for both building the person-centric space 200 for a person 102 and facilitating the person 102 to apply the person-centric space 200 in a variety for applications. Instead of using different means 110, 112, 114 shown in FIG. 1 to access different data sources across different spaces, the person-centric INDEX system 202 can serve as a centralized interface between the person 102 and her/his own person-centric space 200, thereby reducing the time and efforts spent by the person 102 on retrieving desired information or any other applications. As different pieces of relevant information from the public space 108, semi-private space 106, and private space 104 have been projected to the person-centric space 200 in a well-organized way, they can be handled by a single person-centric INDEX system 202, thereby improving the efficiency and effectiveness in finding the desired information. For example, in the FedEx package example described above, any time the person wants to know the current status of the package, she/he no longer needs to dig out the email with the tracking number, write down the tracking number, and open www.FedEx.com in a browser and type in the tracking number. The person-centric INDEX system 202 may have already stored the package status information since the time when the initial order email was received and have kept updating the package status information in the person-centric space 200. So any time when the person 102 inputs a request for package status update, either in the form of a search query or a question n, the person-centric INDEX system 202 can go directly to retrieve the updated package status information from the person-centric space 200 or automatically call the tracking application programing interface (API) of FedEx server with the stored tracking number for the current status update. The result is then provided to the person 102 without any additional efforts made by the person 102. In some embodiments, the person 102 may not even need to explicitly request the status update. Responsive to receiving the order confirmation email, the person-centric INDEX system 202 may automatically set up a task to regularly send the status update to the person 102 until the package is delivered or may dynamically notify the person 102 with any event, like if the package is delayed or lost.

In one aspect of the present teaching, the person-centric INDEX system 202, in conjunction with the person-centric space 200, can be used for answering questions. To achieve this, the person-centric INDEX system 202 may classify a question from a person 102 into a personal question or a non-personal question. In some embodiment, data from the person-centric space 200 may be for classification. For example, a question related to "uncle Sam" may be classified as a personal question if "uncle Sam" is a real person identified from the private contact list. Once the question is classified as personal, the person-centric INDEX system 202 may extract various features including entities and relationships from the question. The extracted entities and relationships may be used by the person-centric INDEX system 202 to traverse a person-centric knowledge database derived from the person-centric space 200. In some embodiments, the person-centric knowledge database may store data in a triple format including one or more entities and a relationship between the one or more entities. When an exact match of relationship and entity are found, an answer is returned. When there is no exact match, a similarity between the question and answer triples is taken into consideration and used to find the candidate answers. In the "uncle Sam" example described above, if the question is "where is uncle Sam," the person-centric INDEX system 202 may search the person-centric knowledge database for any location entity that has a valid relationship with the entity "uncle Sam." In one example, a recent email may be sent by "uncle Sam," and the email may also mention that he will be attending a conference on these days. The location of the conference can be retrieved from the conference website in the public space 108, stored in the person-centric space 200, and associated with entity "uncle Sam." Based on the relationship, the person-centric INDEX system 202 can answer the question with the location of the conference. The person-centric INDEX system 202 thus provides an efficient solution to search for answers to personal questions and increases user engagement and content understanding.

In another aspect of the present teaching, the person-centric INDEX system 202, in conjunction with the person-centric space 200, can be used for task completion. Task completion often involves interactions with different data sources across different spaces. A task such as "making mother's day dinner reservation" involves task actions such as identifying who is my mother, checking what date is mother's day this year, finding out a mutually available time slot on mother's day for my mother and me, picking up a restaurant that my mother and I like, making an online reservation on the restaurant's website, etc. Traditionally, in order to complete each task action, a person 102 has to open a number of applications to access information from different sources across different spaces and perform a series of tedious operations, such as searching for "mother's day 2015" in a search engine, checking my own calendar and mother's shared calendar, digging out past emails about the restaurant reservations for dinners with my mother, making online reservation via a browser, etc. In contrast to the traditional approaches for task completion, the person-centric INDEX system 202 can complete the same task more efficiently and effectively because all pieces of information related to mother's day dinner reservation have already been projected to the person-centric space 200. This makes automatic task generation and completion using the person-centric INDEX system 202 become possible. In response to receiving an input of "making mother's day dinner reservation" from a person 102, the person-centric INDEX system 202 can automatically generate the list of task actions as mentioned above and execute each of them based on information from the person-centric space 200 and update the person 102 with the current status of completing the task.

With the dynamic and rich information related to the person 102 that is available in the person-centric space 200, the person-centric INDEX system 202 can even automatically generate a task without any input from the person 102. In one embodiment, anytime a card is generated and provided to the person 102, the information on the card may be analyzed by the person-centric INDEX system 202 to determine whether a task needs to be generated as a follow-up of the card. For example, once an email card summarizing an online order is constructed, the person-centric INDEX system 202 may generate a task to track the package status until it is delivered and notify any status update for the person 102. In another embodiment, any event occurring in the public space 108, semi-private space 106, or private space 104 that is relevant to the person 102 may trigger the task completion as well. For instance, a flight delay message on an airline website in the public space 108 may trigger generation of a task for changing hotel, rental car, and restaurant reservations in the same trip. In still another embodiment, the person 102's past behavior patterns may help the person-centric INDEX system 202 to anticipate her/his intent in the similar context and automatically generate a task accordingly. As an instance, if the person 102 always had a dinner with her/his mother on mother's day at the same restaurant, a task may be generated by the person-centric INDEX system 202 this year, in advance, to make the mother's day dinner reservation at the same restaurant.

It is understood that in some occasions, certain task actions may not be completed solely based on information from the person-centric space 200. For example, in order to complete the task "sending flowers to mom on mother's day," flower shops need to be reached out to. In one embodiment of the present teaching, a task exchange platform may be created to facilitate the completion of tasks. The person-centric INDEX system 202 may send certain tasks or task actions to the task exchange platform so that parties interested in completing the task may make bids on it. The task exchange platform alone, or in conjunction with the person-centric INDEX system 202, may select the winning bid and update the person 102 with the current status of task completion. Monetization of task completion may be achieved by charging service fee to the winning party and/or the person 102 who requests the task.

In still another aspect of the present teaching, the person-centric INDEX system 202, in conjunction with the person-centric space 200, can be used for query suggestions. By processing and analyzing data from the person-centric space 200, the person-centric INDEX system 202 may build a user corpus database, which provides suggestions based on information from the private space 104 and/or semi-private space 106. In response to any input from a person 102, the person-centric INDEX system 202 may process the input and provide suggestions to the person 102 at runtime based on the person 102's relevant private and/or semi-private data from the user corpus database as well other general log-based query suggestion database and search history database. The query suggestions may be provided to the person 102 with very low latency (e.g., less than 10 ms) in response to the person 102's initial input. Further, in some embodiments, before presenting to the person 102, suggestions generated using the person 102's private and/or semi-private data from the user corpus database may be blended with suggestions produced based on general log-based query suggestion database and search history database. Such blended suggestions may be filtered and ranked based on various factors, such as type of content suggested (e.g., email, social media information, etc.), estimated intent based on an immediate previous input from the person 102, context (e.g., location, data/time, etc.) related to the person 102, and/or other factors.

Figure 3:
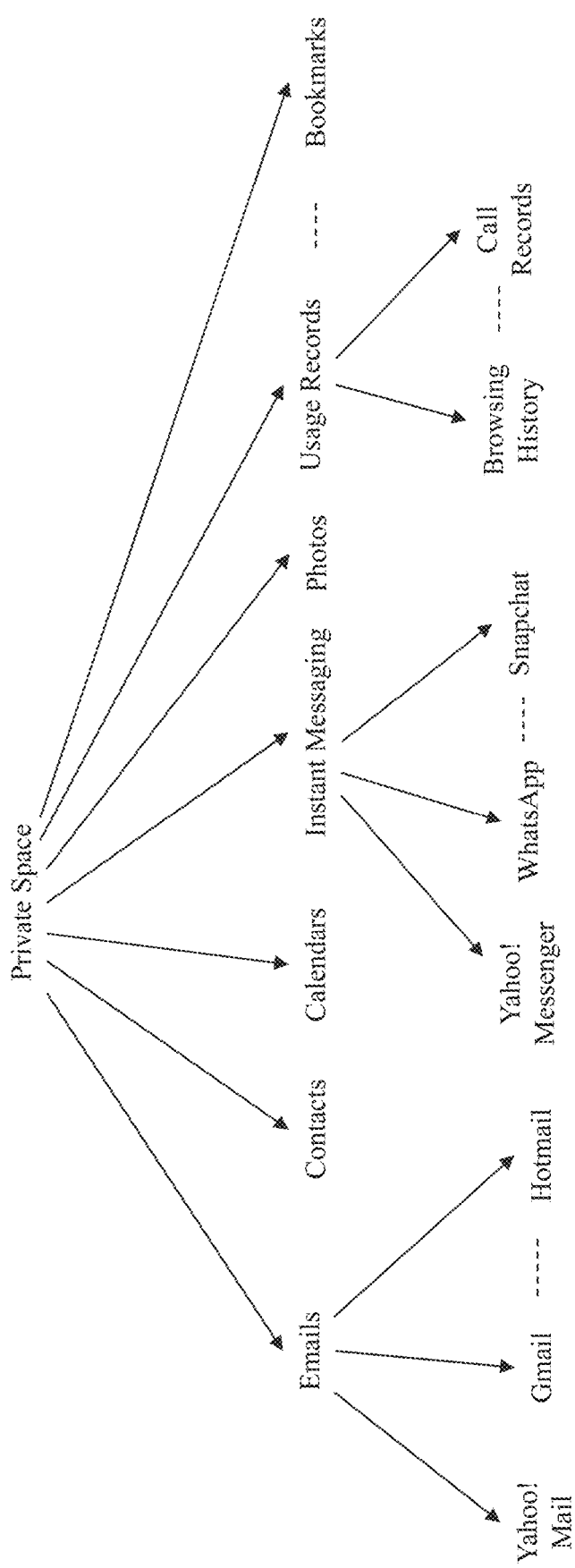
FIG. 3 illustrates exemplary types of data sources in a private space.

FIG. 3 illustrates exemplary types of data sources in a private space. The private space of a person may include any data source that is private to the person. For example, the private space may include any data source that requires access information of the person (e.g., password, token, biometric information, or any user credentials). The private space may also include any data source that is intended to be accessed only by the person even without requiring access control, such as data on a person's smart phone that does not require password or finger print verification. In this illustration, the private space includes several categories of data sources such as emails, contacts, calendars, instant messaging, photos, usage records, bookmarks, etc. Emails include emails stored in remote email servers such as YAHOO! Mail, GMAIL, HOTMAIL, etc. and local emails in an email application on a personal computer or mobile device. Instant messaging includes any messages communicated between the person 102 and others via any instant messaging applications, for example, YAHOO! Messenger, WHATSAPP, SNAPCHAT, to name a few. Usage records may be any logs private to the person, such as, but not limited to, browsing history and call records. It is understood that the examples described above are for illustrative purpose and are not intended to be limiting.

Figure 4:
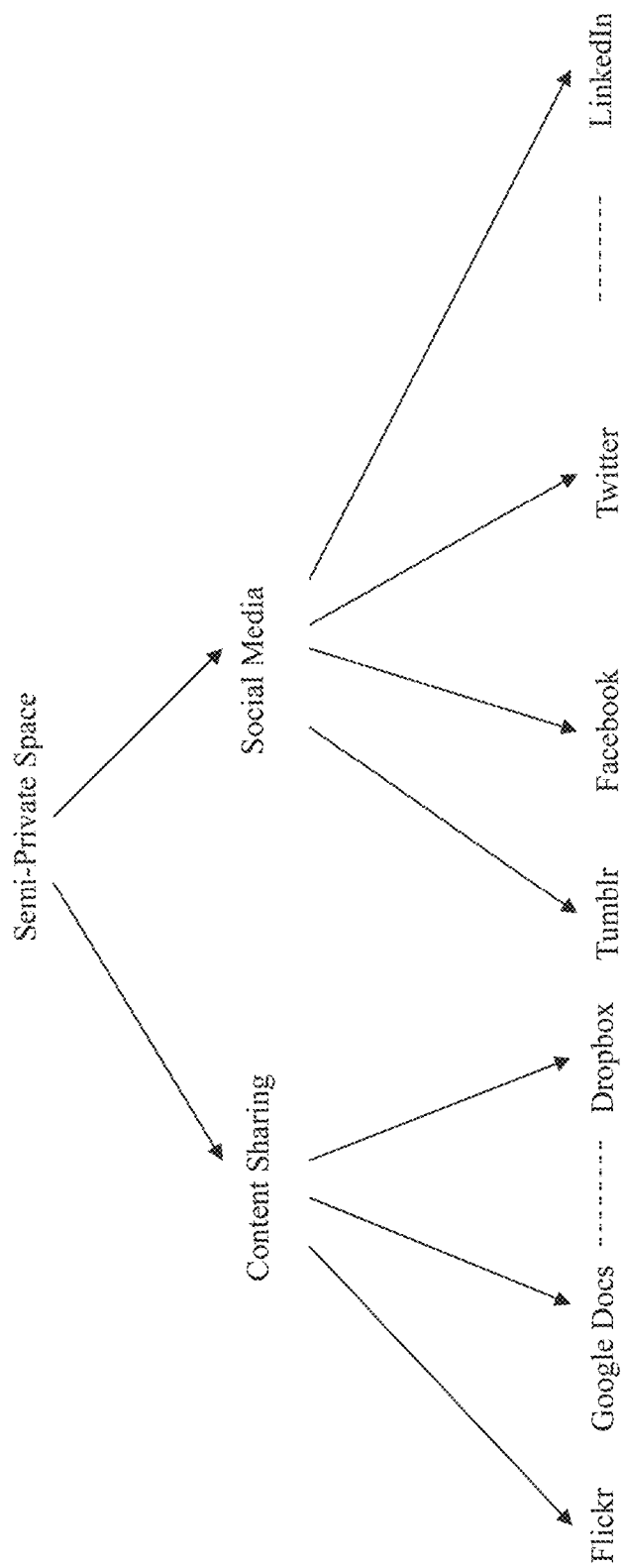
FIG. 4 illustrates exemplary types of data sources in a semi-private space.

FIG. 4 illustrates exemplary types of data sources in a semi-private space. The semi-private space of a person may include any data source that is accessible for a group of people designated by the person. One example of data sources in the semi-private space is social media, such as TUMBLR™, FACEBOOK™, TWITTER™, LINKEDIN™, etc. A person can designate a group of people who can access her/his information shared in the social media sites, such as status updates, posts, photos, and comments. Another example of data sources in the semi-private space is a content sharing site. For instance, a person can share photos with family and friends at FLICKR™, share work documents with colleagues or classmates at GOOGLE™ Docs, and share any files at DROPBOX™. It is understood that in some cases, there is not a clear boundary between a data source in the private space and a data source in the semi-private space. For instance, if a person restricts photos at FLICKR™ to be only accessible by her/himself, then FLICKR™ becomes a private source of the person, just like local photos stored on the person's device. Similarly, when the entire or a portion of a calendar is shared with others, the calendar becomes part of the semi-private space. It is understood that the examples described above are for illustrative purpose and are not intended to be limiting.

Figure 5:
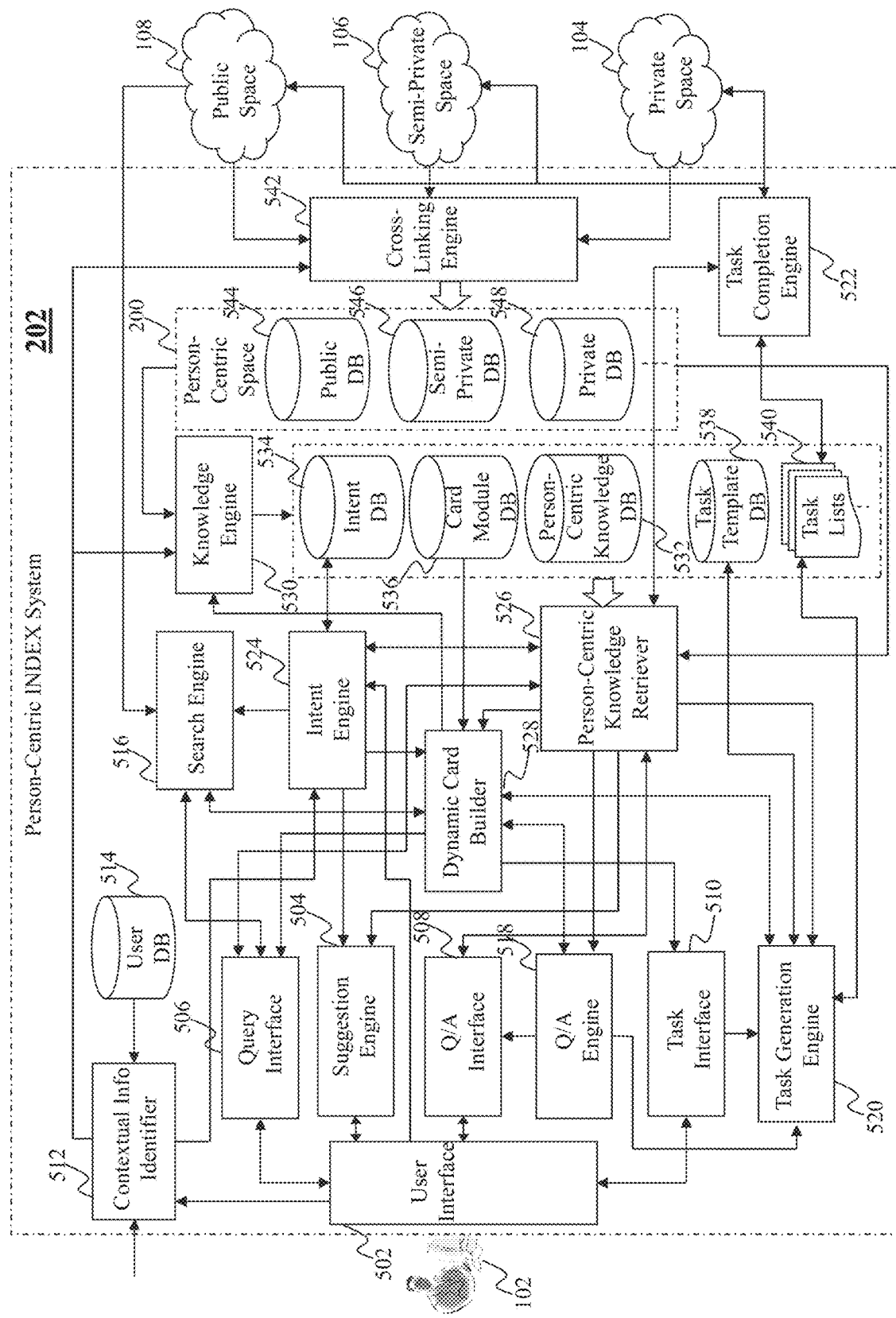
FIG. 5 depicts an exemplary system diagram of a person-centric INDEX system, according to an embodiment of the present teaching.

FIG. 5 depicts an exemplary system diagram of the person-centric INDEX system 202, according to an embodiment of the present teaching. The person-centric INDEX system 202 includes a user interface 502 that connects a person 102 with multiple front-end components including a suggestion engine 504, a query interface 506, a Q/A interface 508, a task interface 510, and a contextual information identifier 512 coupled with a user database 514. To support the front-end components, the person-centric INDEX system 202 further includes multiple functional components including a search engine 516, a Q/A engine 518, a task generation engine 520, a task completion engine 522, an intent engine 524, a person-centric knowledge retriever 526, and a dynamic card builder 528. In the back-end, the person-centric INDEX system 202 includes a variety of databases for storing information in different forms for different purposes, such as the person-centric space 200 having a public database 544, a semi-private database 546, and a private database 548. The person-centric space 200 in this embodiment is built up by a cross-linking engine 542. The person-centric INDEX system 202 further includes a knowledge engine 530 for building a person-centric knowledge database 532 by processing and analyzing information in the person-centric space 200. In addition, additional types of analytic results from the knowledge engine 530 based on data from the person-centric space 200 and/or any other suitable data sources may be stored in an intent database 534, a card module database 536, and a task template database 538.

A person 102 may interact with the person-centric INDEX system 202 via the user interface 502 by providing an input. The input may be made by, for example, typing in a query, question, or task request, or clicking or touching any user interface element in the user interface 502 to enter a query, question, or task request. With each input from the person 102, the suggestion engine 504 provides a list of suggestions to facilitate the person 102 to complete the entire input. In this embodiment, the suggestion engine 504 may provide suggestions based on the person's private and/or semi-private information retrieved by the person-centric knowledge retriever 526 from the person-centric space 200 and/or the person-centric knowledge database 532. Those suggestions include, for example, a contact name from the private contact list, part of a tweet from Twitter, or a package tracking status stored in the person-centric space 200. In some embodiments, the suggestion engine 504 may blend those suggestions based on the person 102's private and/or semi-private information with the conventional suggestions based on popular query logs and search history. In this embodiment, the intent engine 524 may provide an estimated intent associated with each input to help filtering and/or ranking the suggestions provided to the person 102.

Each of the query interface 506, Q/A interface 508, and task interface 510 is configured to receive a particular type of user inputs and forward them to the respective engine for handling. Once the results are returned from the respective engine and/or from the dynamic card builder 528, each of the query interface 506, Q/A interface 508, and task interface 510 forwards the results to the user interface 502 for presentation. In one embodiment, the user interface 502 may first determine the specific type of each input and then dispatch it to the corresponding interface. For example, the user interface 502 may identify that an input is a question based on semantic analysis or keyword matching (e.g., looking for keywords like "why" "when" "who," etc. and/or a question mark). The identified question is then dispatched to the Q/A interface 508. Similarly, the user interface 502 may determine, based on semantic analysis and/or machine learning algorithms, that an input is a task request and forward the input to the task interface 510. For any input that cannot be classified or does not fall within the categories of question and task request, the user interface 502 may forward it to the query interface 506 for general query search. It is understood that, in some embodiments, the user interface 502 may not classify an input first, but instead, forward the same input to each of the query interface 506, Q/A interface 508, and task interface 510 to have their respective engines to process the input in parallel.

Another function of the user interface 502 involves presenting information to the person 102 either as responses to the inputs, such as search results, answers, and task status, or as spontaneous notices, reminders, and updates in response to any triggering events. In this embodiment, the information to be presented to the person 102 via the user interface 502 may be presented in the form of cards that are dynamically built on-the-fly by the dynamic card builder 528 based on the intent estimated by the intent engine 524. The cards may be of different types, such as an email card summarizing one or more related emails, a search results card summarizing information relevant to one or more search results, an answer card including an answer to a question with additional information associated with the answer, or a notice card that is automatically generated to notify the person 102 of any event of interest. Based on its type, a card may be dispatched to one of the query interface 506, Q/A interface 508, and task interface 510 and eventually presented to the person 102 via the user interface 502. In addition to cards, information in any other format or presentation styles, such as search results in a research results page with "blue links" or answers in plain text, may be provided by the search engine 516 and the Q/A engine 518 directly to the query interface 506 and Q/A interface 508, respectively. It is understood that the user interface 502 may also provide information in a hybrid matter, meaning that some information may be presented as cards, while other information may be presented in its native format or style.

As the user interface 502 receives an input from the person 102, it also triggers the contextual information identifier 512 to collect any contextual information related to the person 102 and the input of the person 102. The contextual information identifier 512 in this embodiment receives user-related information from the user database 514, such as the person 102's demographic information and declared and inferred interests and preferences. Another source of contextual information is the person 102's device including, for example, date/time obtained from the timer of the person 102's device, location obtained from a global positioning system (GPS) of the person 102's device, and information related to the person 102's device itself (e.g., the device type, brand, and specification). Further, the contextual information identifier 512 may also receive contextual information from the user interface 502, such as one or more inputs immediately before the current input (i.e., user-session information). Various components in the person-centric INDEX system 202, including the cross-linking engine 542, knowledge engine 530, and intent engine 524, may take advantage of the contextual information identified by the contextual information identifier 512.

The intent engine 524 in this embodiment has two major functions: creating and updating the intent database 534 and estimating an intent based on the information stored in the intent database 534. The intent database 534 may store a personal intent space which includes all the intents that make sense to the person 102 in the form of an action plus a domain. For example, based on the person 102's search history, the intent engine 524 may identify that the person 102 has repeatedly entered different queries all related to the same intent "making restaurant reservations." This intent then may be stored as a data point in the person's personal intent space in the intent database 534 in the form of {action=making reservations; domain=restaurant}. More and more data points will be filled into the personal intent space as the person 102 continues interacting with the person-centric INDEX system 202. In some embodiments, the intent engine 524 may also update the personal intent space in the intent database 534 by adding new intents based on existing intents. For instance, the intent engine 524 may determine that hotel is a domain that is close to the restaurant domain and thus, a new intent "making hotel reservations" (in the form of {action=making reservations; domain=hotel}) likely makes sense to the person 102 as well. The new intent "making hotel reservations," which is not determined from user data directly, may be added to the personal intent space in the intent database 534 by the intent engine 524. In some embodiments, the intent database 534 includes a common intent space for the general population. Some intent that is not in the personal intent space may exist in the common intent space. If they are popular among the general population or among people similar to the person 102, then the intent engine 524 may consider those intents as candidates as well in intent estimation.

In estimating intent of the person 102, the intent engine 524 receives the input from the user interface 502 or any information retrieved by the person-centric knowledge retriever 526 and tries to identify any action and/or domain from the input that is also in the intent spaces in the intent database 534. If both action and domain can be identified from the input, then an intent can be derived directly from the intent space. Otherwise, the intent engine 524 may need to take the contextual information from the contextual information identifier 512 to filter and/or rank the intent candidates identified from the intent space based on the action or domain. In one example, if the input involves only the action "making reservations" without specifying the domain, the intent engine 524 may first identify a list of possible domains that can be combined with such action according to the personal intent space, such as "hotel" and "restaurant." By further identifying that the location where the input is made is at a hotel, the intent engine 524 may estimate that the person 102 likely intends to make restaurant reservations as he is already in the hotel. It is understood that in some cases, neither action nor domain can be identified from the input or the identified action or domain does not exist in the intent space, the intent engine 524 may estimate the intent purely based on the available contextual information. Various components in the person-centric INDEX system 202, including the search engine 516, the suggestion engine 504, the dynamic card builder 528, and the person-centric knowledge retriever 526, may take advantage of the intent estimated by the intent engine 524.

The search engine 516 in this embodiment receives a search query from the query interface 506 and performs a general web search or a vertical search in the public space 108. Intent estimated by the intent engine 524 for the search query may be provided to the search engine 516 for purposes such as query disambiguation and search results filtering and ranking. In some embodiments, some or all of the search results may be returned to the query interface 506 in their native format (e.g., hyperlinks) so that they can be presented to the person 102 on a conventional search results page. In this embodiment, some or all of the search results are fed into the dynamic card builder 528 for building a dynamic search results card based on the estimated intent. For instance, if the intent of the query "make reservation" is estimated as "making restaurant reservations," then the top search result of a local restaurant may be provided to the dynamic card builder 528 for building a search results card with the name, directions, menu, phone number, and reviews of the restaurant.

The Q/A engine 518 in this embodiment receives a question from the Q/A interface 508 and classifies the question into either a personal or non-personal question. The classification may be done based on a model such as a machine learning algorithm. In this embodiment, the Q/A engine 518 may check the person-centric knowledge database 532 and/or the private database 548 and semi-private database 546 in the person-centric space 200 via the person-centric knowledge retriever 526 to see if the question is related to any private, semi-private data, or personal knowledge of the person 102. For instance, the question "who is Taylor Swift" is normally classified as a non-personal question. But in the case if "Taylor Swift" is in the person 102's contact list or social media friend list, or if "Taylor Swift" has sent emails to the person 102, the Q/A engine 518 then may classify the question as a personal question. For non-personal questions, any known approaches may be used to obtain the answers.

Once the question is classified as personal, various features including entities and relationships are extracted by the Q/A engine 518 from the question using, for example, a machine learned sequence tagger. The extracted entities and relationships are used to traverse, by the person-centric knowledge retriever 526, the person-centric knowledge database 532, which stores person-centric relationships stored in a pre-defined form. In some embodiments, the person-centric relationships may be stored in a triple format including one or more entities and a relationship therebetween. When the Q/A engine 518 finds an exact match of relationship and entity, it returns an answer. When there is no exact match, the Q/A engine 518 takes into consideration a similarity between the question and answer triples and uses the similarity to find the candidate answers. To measure the similarity, words embedded over a large corpus of user texts may be collected and trained by the Q/A engine 518. The well-organized, person-centric information stored in the person-centric space 200 and the person-centric knowledge database 532 makes it possible for the Q/A engine 518 to answer a personal question in a synthetic manner without the need of fully understanding the question itself. The answers generated by the Q/A engine 518 may be provided to the dynamic card builder 528 for building answer cards.

The task generation engine 520 and the task completion engine 522 work together in this embodiment to achieve automatic task generation and completion functions of the person-centric INDEX system 202. The task generation engine 520 may automatically generate a task in response to a variety of triggers, including for example, a task request from the person 120 received via the task interface 510, an answer generated by the Q/A engine 518, a card constructed by the dynamic card builder 528, or an event or behavior pattern related to the person 102 from the person-centric space 200 and/or the person-centric knowledge database 532. Intent may have also been taken into account in some embodiments in task generation. The task generation engine 520 in this embodiment also divides each task into a series of task actions, each of which can be scheduled for execution by the task completion engine 522. The task template database 538 stores templates of tasks in response to different triggers. The task generation engine 520 may also access the task template database 538 to retrieve relevant templates in task generation and update the templates as needed. In some embodiments, the task generation engine 520 may call the dynamic card builder 528 to build a card related to one or more tasks so that the person 102 can check and modify the automatically generated task as desired.

The tasks and task actions are stored into task lists 540 by the task generation engine 520. Each task may be associated with parameters, such as conditions in which the task is to be executed and completed. Each individual task action of a task may also be associated with execution and completion conditions. The task completion engine 522 fetches each task from the task lists 540 and executes it according to the parameter associated therewith. For a task, the task completion engine 522 dispatches each of its task actions to an appropriate executor to execute it, either internally through the person-centric knowledge retriever 526 or externally in the public space 108, semi-private space 106, or private space 104. In one example, task actions such as "finding available time on Tuesday for lunch with mom" can be completed by retrieving calendar information from the private database 548 in the person-centric space 200. In another example, task actions like "ordering flowers from Aunt Mary's flower shop" can only be completed by reaching out to the flower shop in the public space 108. The task completion engine 522 may also schedule the execution of each task action by putting it into a queue. Once certain conditions associated with a task action are met, the assigned executor will start to execute it and report the status. The task completion engine 522 may update the task lists 540 based on the status of each task or task action, for example, by removing completed tasks from the task lists 540. The task completion engine 522 may also provide the status updates to the person-centric knowledge retriever 526 such that the status updates of any ongoing task become available for any component in the person-centric INDEX system 202 as needed. For instance, the dynamic card builder 528 may build a notice card notifying the person that your task request "sending flowers to mom on Mother's day" has been completed.

As a component that supports intent-based dynamic card construction for various front-end components, the dynamic card builder 528 receives requests from the search engine 516, the Q/A engine 518, the task generation engine 520, or the person-centric knowledge retriever 526. In response, the dynamic card builder 528 asks for the estimated intent associated with the request from the intent engine 524. Based on the request and the estimated intent, the dynamic card builder 528 can create a card on-the-fly by selecting suitable card layout and/or modules from the card module database 536. The selection of modules and layouts is not predetermined, but may depend on the request, the intent, the context, and information from the person-centric space 200 and the person-centric knowledge database 532. Even for the same query repeatedly received from the same person 102, completely different cards may be built by the dynamic card builder 528 based on the different estimated intents in different contexts. A card may be created by populating information, such as search results, answers, status updates, or any person-centric information, into the dynamically selected and organized modules. The filling of information into the modules on a card may be done in a centralized manner by the dynamic card builder 528 regardless of the type of the card or may be done at each component where the request is sent. For example, the Q/A engine 518 may receive an answer card construction with dynamically selected and organized modules on it and fill in direct and indirect answers into those modules by itself.

In one embodiment, the person-centric knowledge retriever 526 can search the person-centric space 200 and the person-centric knowledge database 532 for relevant information in response to a search request from the intent engine 524, the query interface, the Q/A engine 518, the suggestion engine 504, the dynamic card builder 528, or the task generation engine 520. The person-centric knowledge retriever 526 may identify one or more entities from the search request and search for the matched entities in the person-centric knowledge database 532. As entities stored in the person-centric knowledge database 532 are connected by relationships, additional entities and relationships associated with the matched entities can be returned as part of the retrieved information as well. As for searching in the person-centric space 200, in one embodiment, the person-centric knowledge retriever 526 may first look for private data in the private database 548 matching the entities in the search request. As data in the person-centric space 200 are cross-linked by cross-linking keys, the entities and/or the cross-linking keys associated with the relevant private data may be used for retrieving additional information from the semi-private database 546 and the public database 544. For instance, to handle a search request related to "amazon package," the person-centric knowledge retriever 526 may first look for information in the private database 548 that is relevant to "amazon package." If an order confirmation email is found in the private database 548, the person-centric knowledge retriever 526 may further identify that the order confirmation email is associated with a cross-linking key "tracking number" in the package shipping domain. Based on the tracking number, the person-centric knowledge retriever 526 then can search for any information that is also associated with the same tracking number in the person-centric space 200, such as the package status information from www.FedEx.com in the public database 544. As a result, the person-centric knowledge retriever 526 may return both the order confirmation email and the package status information as a response to the search request.

In some embodiments, the person-centric knowledge retriever 526 may retrieve relevant information from multiple data sources in parallel and then blend and rank all the retrieved information as a response to the search request. It is understood that information retrieved from each source may be associated with features that are unique for the specific source, such as the feature "the number of recipients that are cc'd" in the email source. In order to be able to blend and rank results from different sources, the person-centric knowledge retriever 526 may normalize the features of each result and map them into the same scale for comparison.

The cross-linking engine 542 in this embodiment associates information relevant to the person 102 from the private space 104, the semi-private space 106, and the public space 108 by cross-linking data based on cross-linking keys. The cross-linking engine 542 may first process all information in the private space 104 and identify cross-linking keys from the private space 104. For each piece of content in the private space 104, the cross-linking engine 542 may identify entities and determine the domain to which the content belongs. Based on the domain, one or more entities may be selected as cross-linking keys for this piece of content. In one example, tracking number may be a cross-linking key in the package shipping domain. In another example, flight number, departure city, and departure date may be cross-linking keys in the flight domain. Once one or more cross-linking keys are identified for each piece of information in the private space 104, the cross-linking engine 542 then goes to the semi-private space 106 and the public space 108 to fetch information related to the cross-linking keys. For example, the tracking number may be used to retrieve package status information from www.FedEx.com in the public space 108, and the flight number, departure city, and departure date may be used to retrieve flight status from www.UA.com in the public space 108. Information retrieved by the cross-linking engine 542 from the private space 104, semi-private space 106, and public space 108 may be stored in the private database 548, semi-private database 546, and public database 544 in the person-centric space 200, respectively. As each piece of information in the person-centric space 200 is associated with one or more cross-linking keys, they are cross-linked with other information associated with the same cross-linking keys, regardless which space it comes from. Moreover, as the cross-linking keys are identified based on the person's private data (e.g., emails), all the cross-linked information in the person-centric space 200 are relevant to the person 102.

Although only one database is shown in FIG. 5 for information from the private space 104, the semi-private space 106, or the public space 108, it is understood that information within a particular space may be organized and stored in different databases in the person-centric space 200. For instance, private data from emails, contacts, calendars, and photos may be stored in separate databases within the private database 548; semi-private data from Facebook, Twitter, LinkedIn, etc. may be stored in separate databases within the semi-private database 546 as well. Such arrangement may enable applying different feature extraction models to different data sources, which may be helpful for the suggestion engine 504 and the person-centric knowledge retriever 526. As mentioned above, the cross-linking engine 542 continuously and dynamically maintains and updates the person-centric space 200 on a regular basis and/or in response to any triggering event. For example, any internal operation, such as query search, question answering, or task completion, may trigger the cross-linking engine 542 to update the affected data or add missing data in the person-centric space 200.

The knowledge engine 530 in this embodiment processes and analyzes the information in the person-centric space 200 to derive analytic results in order to better understand the person-centric space 200. In one embodiment, the knowledge engine 530 extracts entities from content in the person-centric space 200 and resolves them to what they refer to (i.e., can disambiguate an extracted entity when it may refer to multiple individuals). In addition to determining an entity type for an extracted entity name, the knowledge engine 530 may also determine a specific individual referred to by this entity name. The knowledge engine 530 can make use of contextual information and/or textual metadata associated with the entity name in the email to disambiguate such cases, providing a high precision resolution.

The knowledge engine 530 also builds a person-centric knowledge representation for a person 102 by extracting and associating data about the person 102 from personal data sources. The person-centric knowledge representation for the person 102 is stored in the person-centric knowledge database 532. The knowledge engine 530 can extract entities related to the person 102 and infer relationships between the entities without the person 102's explicit declaration, and create, for example, a person-centric knowledge graph for the person 102 based on the entities and relationships. The knowledge elements that can be inferred or deduced may include, for example, the person 102's social contacts, and the person 102's relationships with places, events, or other users.

Figure 6:
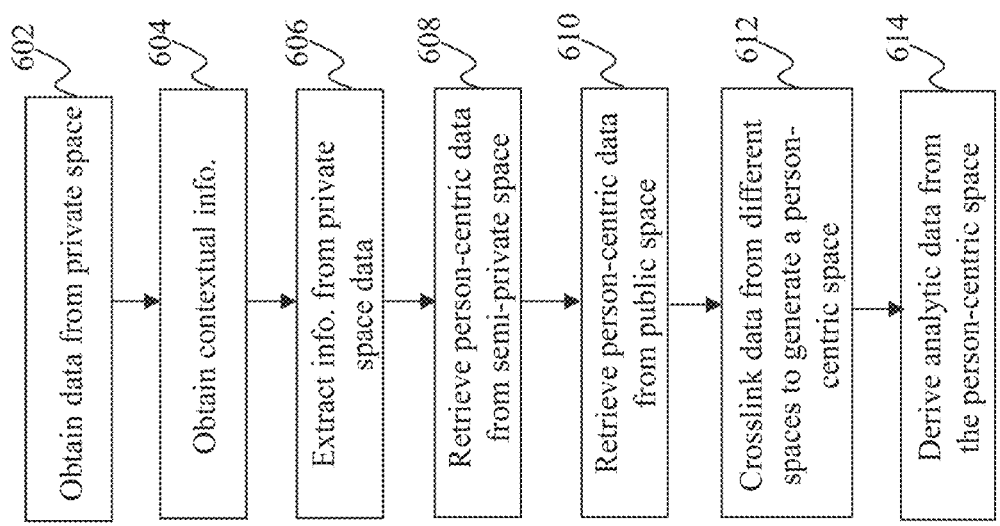
FIG. 6 is a flowchart of an exemplary process for building a person-centric space, according to an embodiment of the present teaching.

FIG. 6 is a flowchart of an exemplary process for building a person-centric space, according to an embodiment of the present teaching. Starting at 602, data from the private space 104 is obtained. The data includes any content that is private to a person, such as emails, contacts, calendar events, photos, bookmarks, instant messages, usage records, and so on. Contextual information is obtained at 604. The contextual information includes, but is not limited to, user information such as demographic information and interests and preferences, locale information, temporal information, device information, and user-session information (e.g., other user inputs in the same or adjacent user-sessions). At 606, information from the private space data is extracted. The information may be cross-linking keys determined from entities extracted from the private space data based on the domain of the private space data and/or the obtained contextual information. Person-centric data is then retrieved from the semi-private space at 608. Similarly, person-centric data is retrieved from the public space at 610. In this embodiment, the person-centric data is retrieved based on the cross-linking keys. At 612, all pieces of person-centric data retrieved from the private space, semi-private space, and public space are cross-linked together to generate a person-centric space. In this embodiment, the cross-linking is done based on the same cross-linking keys associated with these pieces of person-centric data. At 614, analytic data is derived from the person-centric space. For example, entities may be extracted from the person-centric space and are disambiguated by the knowledge engine 530 to ascertain their extract meanings Relationships between the entities may be inferred based on information from the person-centric space by the knowledge engine 530 as well. Based on the entities and relationships, person-centric knowledge can be derived and stored in the person-centric knowledge database 532.

Figure 7:
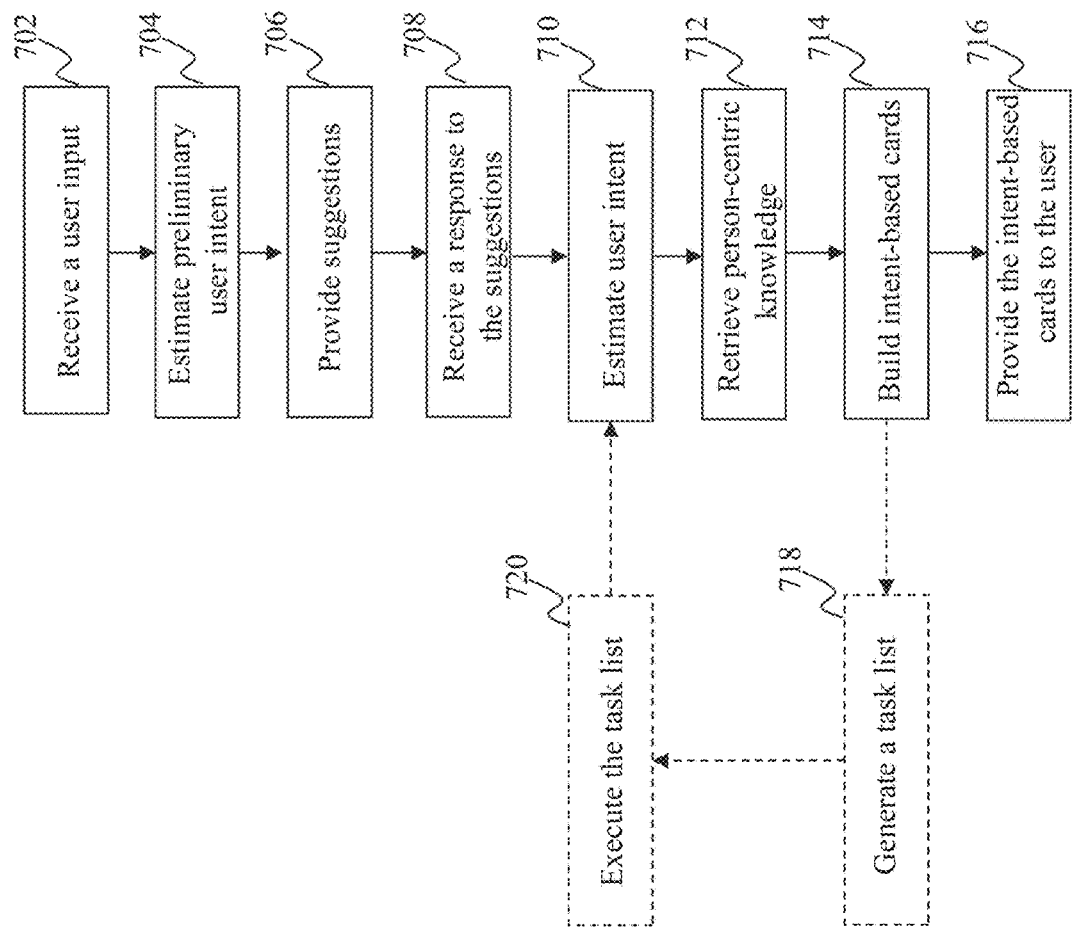
FIG. 7 is a flowchart of an exemplary process for applying a person-centric space for digital personal assistance, according to an embodiment of the present teaching.

FIG. 7 is a flowchart of an exemplary process for applying a person-centric space for digital personal assistance, according to an embodiment of the present teaching. Starting at 702, an input from a person is received. As the person enters the input, a preliminary intent is estimated and continuously updated at 704. The estimation may be based on the current input and any contextual information currently available. At 706, one or more suggestions are generated based on the current input and the estimated intent and provided to the person to assist completing the current input. A response to the suggestions is received from the person at 708. The response may be a selection of one suggestion or ignoring the suggestions and finishing the input as the person desires. Once the completed input is received, either as a selection of a suggestion or a fully-entered input, at 710, the intent is estimated again for the completed input. The intent may be estimated based on the completed input and the currently available contextual information. In some embodiments, if no input is received (e.g., when the person just logs into and has not entered anything yet), the intent may be estimated based on the contextual information alone. At 712, person-centric knowledge is retrieved based on the input. In some embodiments, the estimated intent may be used for retrieving the person-centric knowledge as well. As described above in detail, the input may be a question, a task request, or a query. In any event, entities and/or relationships may be derived from the input and are used for retrieving relevant person-centric knowledge from the person-centric knowledge database 532. In some embodiments, additional information may be retrieved from the person-centric space. Intent-based cards are built at 714. Each card may be constructed based on a layout and one or more modules that are selected based on the type of the card and the estimated intent. Content in each module may be filled in based on the person-centric knowledge and any additional information retrieved at 712. Optionally or additionally, at 718, the construction of a card may cause a task to be generated based on the estimated intent. For instance, an email card summarizing an online order confirmation email may trigger the generation of a task for automatically tracking the package status. At 720, the task is executed. Nevertheless, at 716, the intent-based cards, either an email card, an answer card, a search results card, or a notice card, are provided to the person as a response to the input.

Figure 8:
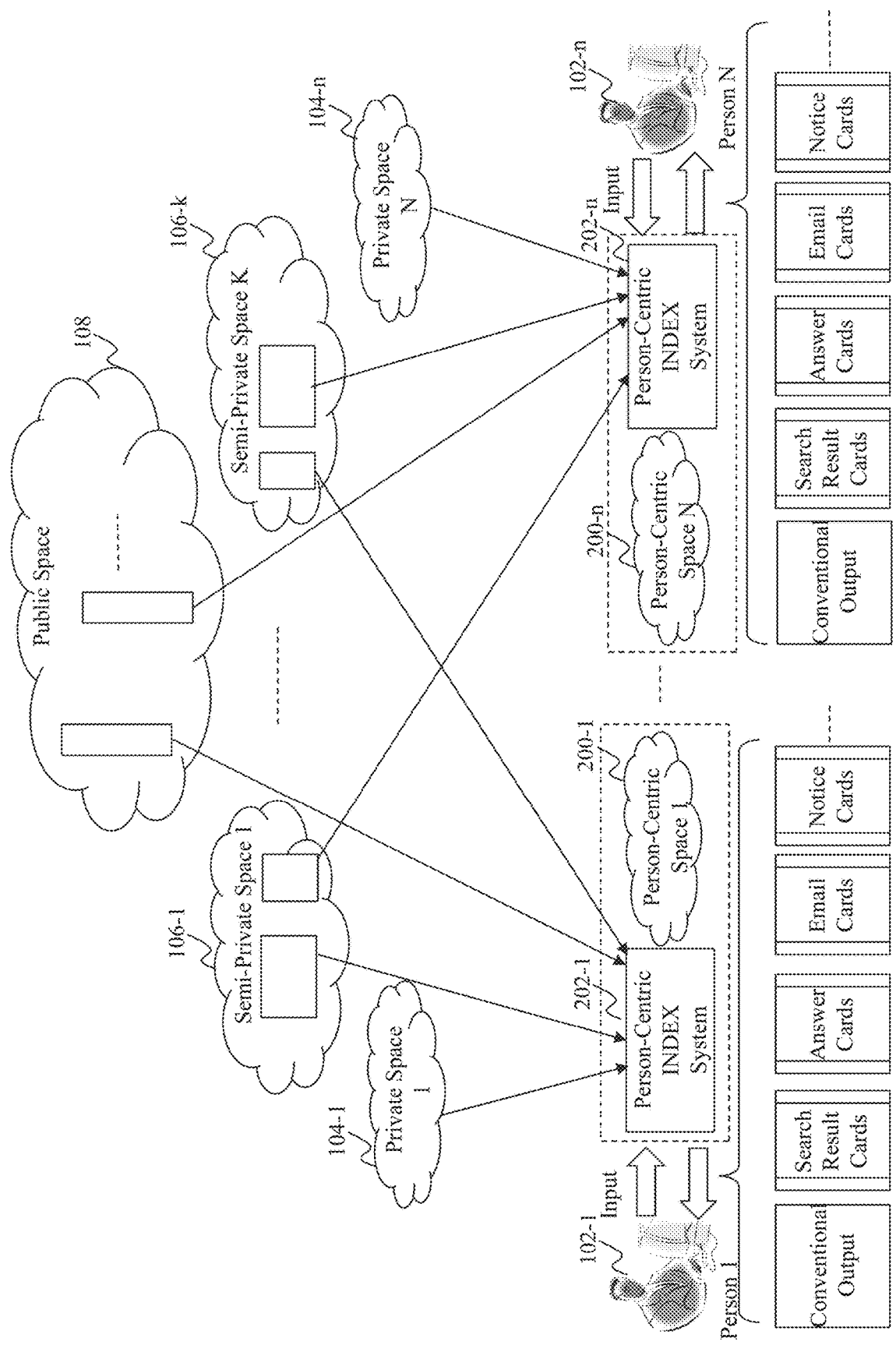
FIG. 8 depicts an exemplary scheme of building a person-centric space for each individual person via a person-centric INDEX system and applications thereof, according to an embodiment of the present teaching.

FIG. 8 depicts an exemplary scheme of building a person-centric space for each individual person via the person-centric INDEX system and applications thereof, according to an embodiment of the present teaching. In this embodiment, each person 102-1, . . . 102-n may access its own person-centric INDEX system 202-1, . . . 202-*n*, respectively. The person-centric INDEX system 202 may be a stand-alone system installed on each person 102-1, . . . 102-*n*'s device, a cloud-based system shared by different persons 102-1, . . . 102-*n*, or a hybrid system in which some components are installed on each person 102-1, . . . 102-*n*'s device and some components are in the cloud and shared by different persons 102-1, . . . 102-*n*.

In this embodiment, individual person-centric spaces 200-1, . . . 200-*n* are generated for each person 102-1, . . . 102-*n* via its own person-centric INDEX system 202-1, . . . 202-*n*, respectively For example, person-centric space 1 200-1 includes the projections from different spaces related to person 1 102-1 from the perspectives of person 1 102-1 (e.g., the entire private space 1 104-1, parts of the semi-private spaces 1-*k* 106-1, . . . 106-*k* that are relevant to person 1 102-1, and a slice of the public space 108 that is relevant to person 1 102-1). Each person 102-1, . . . 102-*n* then uses its own person-centric INDEX system 202-1, . . . 202-*n* to access its own person-centric space 200-1, . . . 200-*n*, respectively. Based on inputs from a person to its person-centric INDEX system, outputs are returned based on information from the person-centric space in any forms and styles, including, for example, any conventional outputs such as search result pages with "blue links," and any types of intent-based cards such as search results cards, answer cards, email cars, notice cards, and so on.

Figure 9:
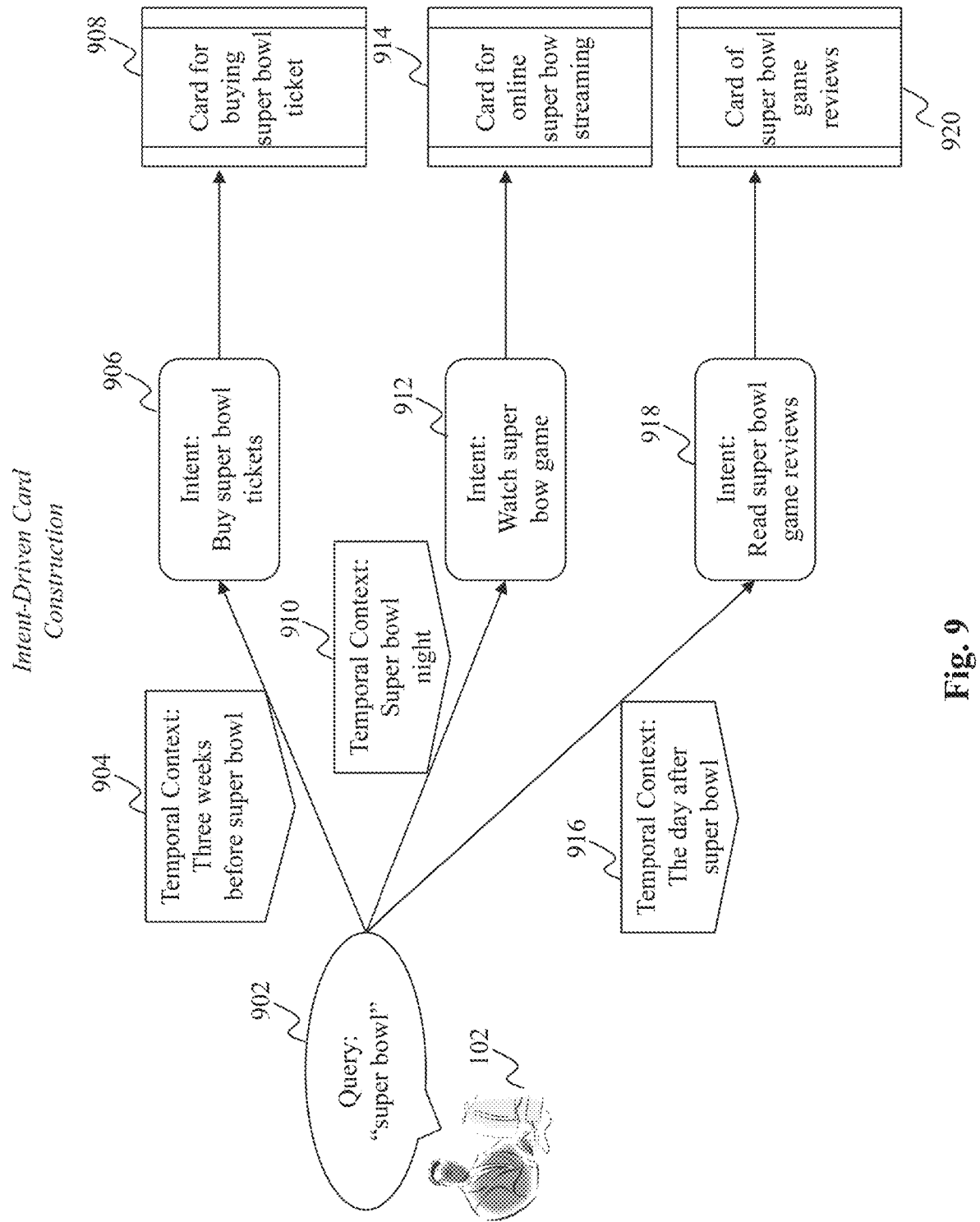
FIG. 9 depicts an exemplary scheme in which a variety of dynamic cards are built and provided to a person based on different intents estimated for the same query in different contexts, according to an embodiment of the present teaching.

FIG. 9 depicts an exemplary scheme in which a variety of dynamic cards are built and provided to a person based on different intents estimated for the same query in different contexts, according to an embodiment of the present teaching. Conventionally, a static card that has been pre-constructed for certain popular entities may be presented to a person when the query from the person happens to include one of those popular entities. In contrast, intent-based cards according to the present teaching can be dynamically generated on-the-fly by the person-centric INDEX system 202 responsive to a query 902 from the person 102. In this example, the person 102 inputs the same query 902 "super bowl" at different times. When the query 902 is entered three weeks before the super bowl game, its temporal context 904 will likely cause the intent 906 to be estimated as "buying super bowl tickets." Based on such intent, a card 908 is dynamically generated for buying super bowl tickets, including information such as super bowl ticket prices, tips on how to purchase, purchase website, etc. In some embodiments, the generation of this card 908 would cause a task of purchasing super bowl tickets to be automatically generated and completed. As time passes, when the temporal context 910 changes to the super bowl night, when the person 102 enters the same query 902, the intent 912 will likely change to "watching super bowl game." Accordingly, a different card 914 for online super bowl game streaming is built and presented to the person 102, which may include, for example, websites currently streaming the game. When the game finishes and the temporal context 916 changes to the day after the super bowl game, if the person 102 again enters the query 902, the intent 918 will likely become "reading super bowl game reviews." A card 920 of super bowl game reviews is constructed and presented to the person 102. It is understood that the examples described above are for illustrative purpose and are not intended to be limiting.

Figure 10:
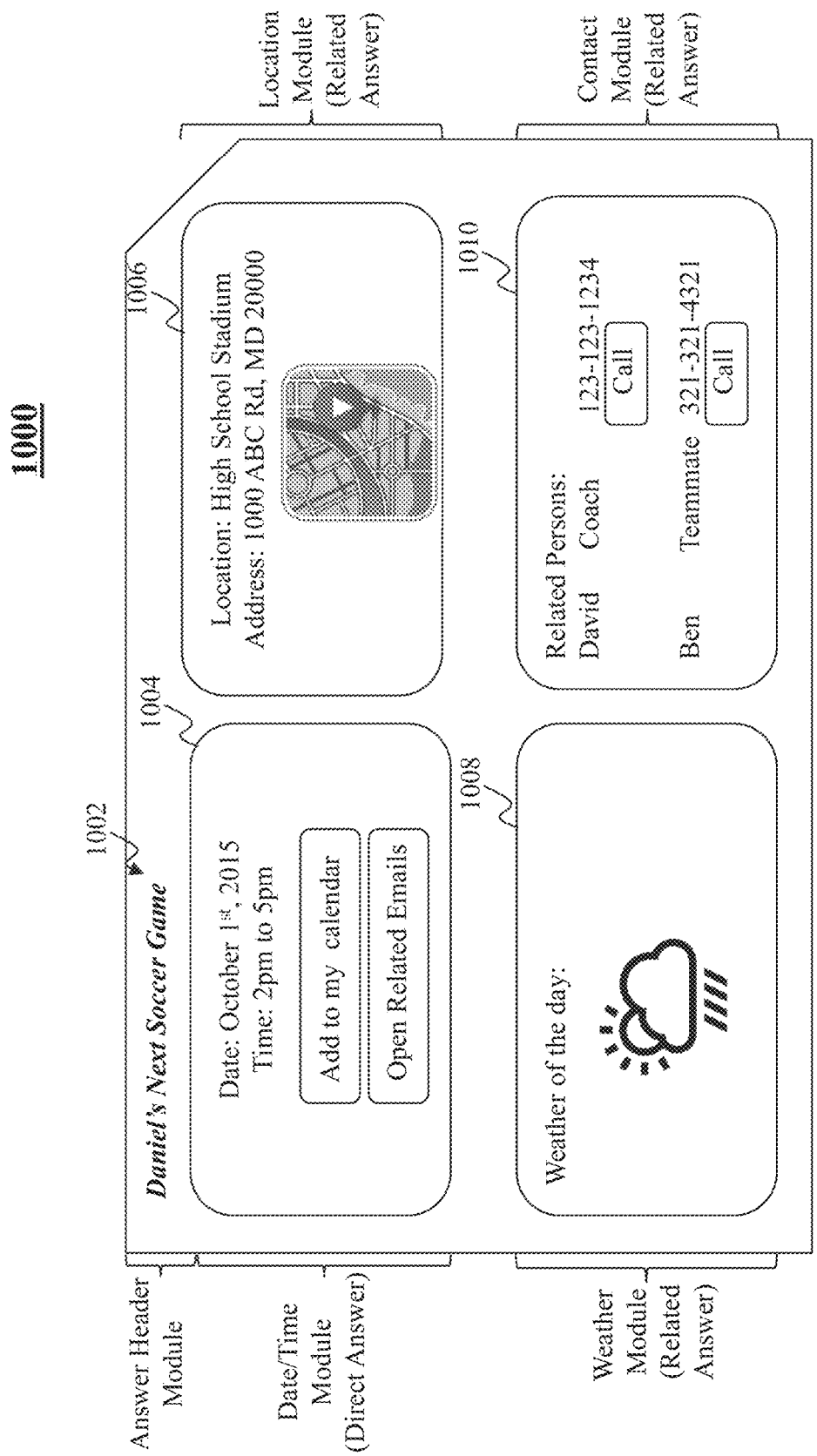
FIG. 10 illustrates an exemplary answer card, according to an embodiment of the present teaching.

FIG. 10 illustrates an exemplary answer card, according to an embodiment of the present teaching. The answer card 1000 in this example is dynamically constructed on-the-fly in response to the question "when is my son's soccer game?" Based on the type of the card (answer card) and intent (finding out my son's soccer game date/time), the layout and modules are determined as shown in FIG. 10. It is understood that the shape, size, and layout of the answer card 1000 is for illustrative purpose only and may vary in other examples. In some embodiments, the shape, size, and layout may be dynamically adjusted to fit the specification of the user device (e.g., screen size, display resolution, etc.).

In this example, the answer card includes an answer header module 1002 indicating that the topic of the answer card 1000 is "Daniel's (my son's name identified according to person-centric knowledge) Next Soccer Game." The direct answer to the question is found from a private email and provided in the date/time module 1004. Optionally, certain actions related to the answer may be provided as well, such as "add to my calendar" and "open related emails." Other information related to the direct answer is provided in other modules as well. The location module 1006 provides the location, address, and map of the soccer game. Information such as location and address may be retrieved from the email related to the game in the private database 548 of the person-centric space 200, while the map may be retrieved from Google Maps in the public space 108. The weather module 1008 provides the weather forecast of the game day, which may be retrieved from wwww.Weather.com in the public space 108. The contact module 1010 shows persons involved in the game and their contact information retrieved from the email about the game and private contact lists in the private database 548 of the person-centric space 200. Optionally, action buttons may be provided to call the persons directly from the answer card 1000. It is understood that the example described above is for illustrative purpose and are not intended to be limiting.

Figure 11:
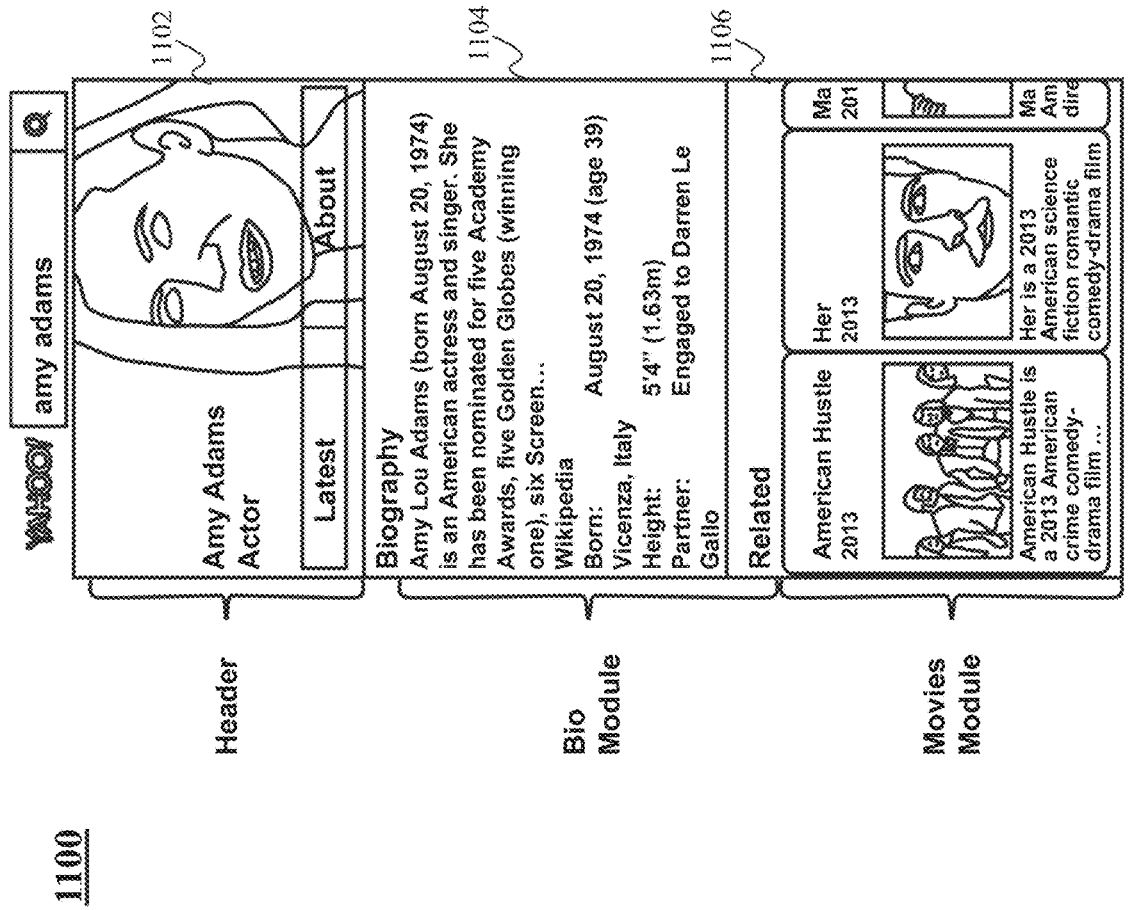
FIG. 11 illustrates an exemplary search results card, according to an embodiment of the present teaching.

FIG. 11 illustrates an exemplary search result card, according to an embodiment of the present teaching. The search results card 1100 in this example is dynamically constructed on-the-fly in response to the query "amy adams." Based on the type of the card (a search results card) and intent (learning more about actor Amy Adams), the layout and modules are determined as shown in FIG. 11. It is understood that the shape, size, and layout of the search results card 1100 is for illustrative purpose only and may vary in other examples. In some embodiments, the shape, size, and layout may be dynamically adjusted to fit the specification of the user device (e.g., screen size, display resolution, etc.). In this example, the search results card 1100 includes a header module 1102 with the name, occupation, and portrait of Amy Adams. The bio module 1104 includes her bio retrieved from Wikipedia, and the movies module 1106 includes her recent movies. In the movies module 1106, each movie may be presented in a "mini card" with the movie's name, release year, poster, and brief instruction, which are retrieved from www.IMDB.com. The movies module 1106 is actionable so that a person can swap the "mini cards" to see information of more her movies. If more modules cannot be shown simultaneously due to the size of the search results card 1100 (for example when it is shown on a smart phone screen), tabs (e.g., "Latest," "About") may be used to display different modules. It is understood that the example described above is for illustrative purpose and are not intended to be limiting.

Figure 12:
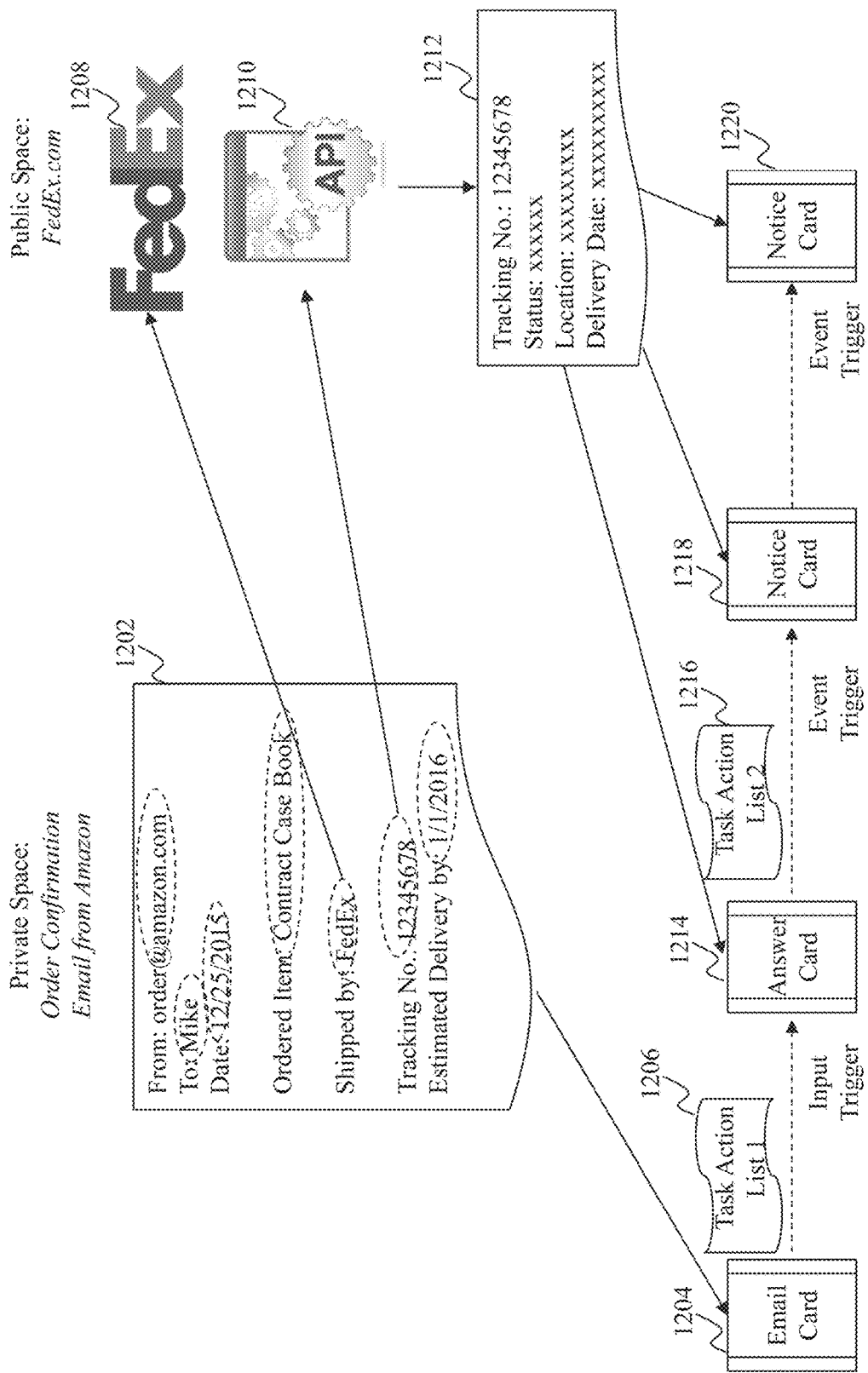
FIG. 12 depicts an exemplary scheme of automatic online order email summary and package tracking via cross-linked data in a person-centric space, according to an embodiment of the present teaching.

FIG. 12 depicts an exemplary scheme of automatic online order email summary and package tracking via cross-linked data in a person-centric space, according to an embodiment of the present teaching. Various aspects of the present teaching are illustrated in FIG. 12 as well as related FIGS. 13-15, including cross-linking data from different spaces, entity extraction and building person-centric knowledge representation, dynamic card productions based on intent, answering personal questions, and automatic task generation and completion. In this example, at time t0, an order confirmation email 1202 is received from www.Amazon.com. The email 1202 in the private space is processed to extract and identify entities. The entities include, for example, seller/vendor—www.Amazon.com, recipient/person—Mike, order date—Dec. 25, 2015, item—Contract Case book, shipping carrier—FedEx, tracking number—12345678, and estimated delivery date: Jan. 1, 2016. In response to receiving the email 1202, an email card 1204 summarizing the email 1202 is generated and may be provided to Mike automatically or upon his request.

Figure 13:
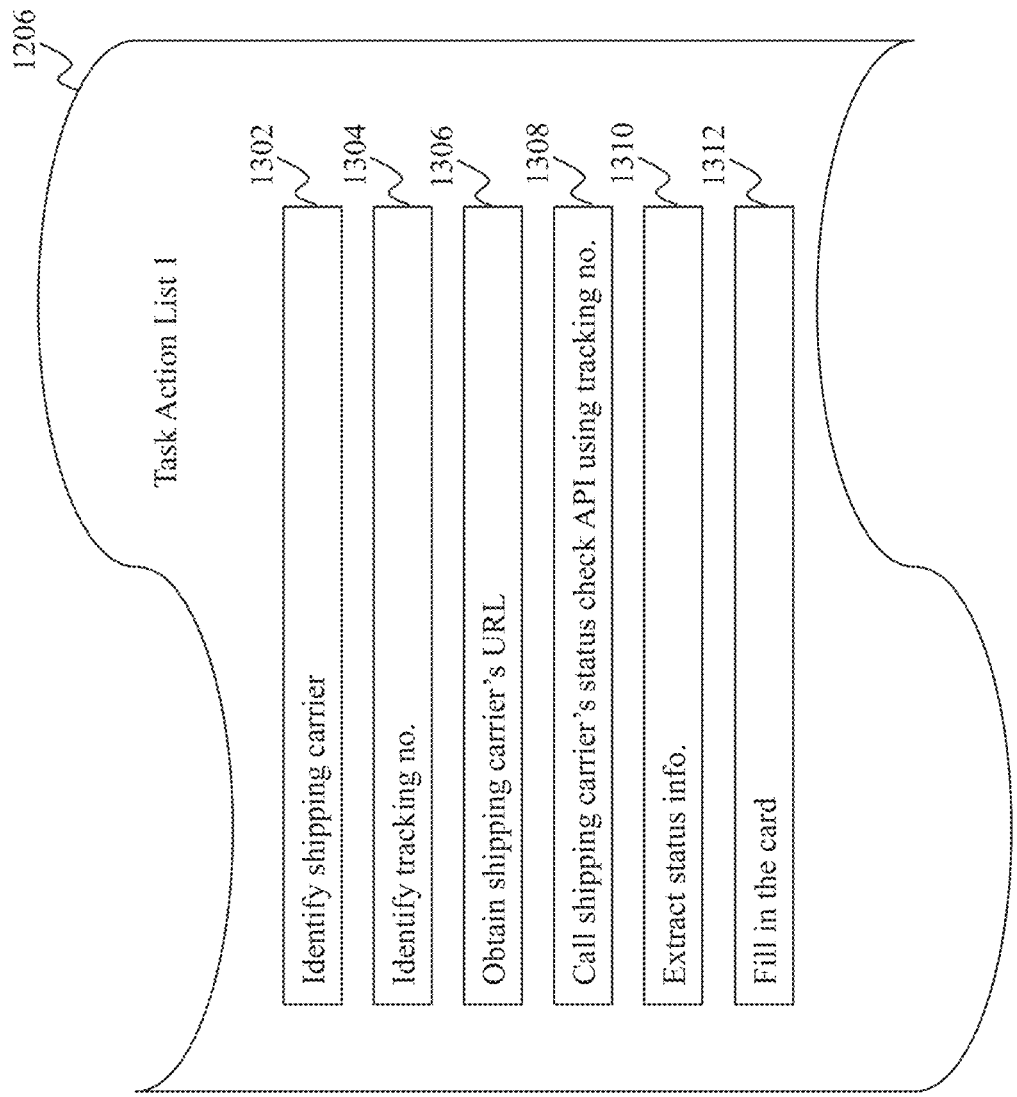
FIG. 13 illustrates an exemplary task with a list of task actions for automatic package tracking.

The generation of the email card 1204 in this example automatically initiates the generation of task 1 1206 for checking package status. The details of task 1 1206 will be described in FIG. 13. In order to check the package status, one or more cross-linking keys in the package shipping domain are identified among the entities extracted from the email 1202. As shown in FIG. 13, the entity "shipping carrier—FedEx" is a cross-linking key used for identifying the website of FedEx 1208 in the public space, and the entity "tracking number—12345678" is a cross-linking key used for calling the status check API 1210 of FedEx 1208. Based on the tracking number, package status information 1212 is retrieved from FedEx 1208. Different pieces of information from the private space and public space are thus cross-linked based on the cross-linking keys and can be projected into the person-centric space.

At time t1, in response to an input from Mike (e.g., a question "where is my amazon order?"), an answer card 1214 is dynamically generated based on private information in the email card 1204 and the public package status information 1212. The answer card 1214 is presented to Mike as an answer to his question. In this example, the generation of the answer card 1214 automatically initiates another task 2 1216 for monitoring and reporting package status update. According to task 2 1216, package status information 1212 may be regularly refreshed and updated according to a schedule (e.g., every two hours) or may be dynamically refreshed and updated upon detecting any event that affects the package delivery. In this example, at times t2 and tn, certain events, such as package being delayed due to severe weather or package being delivered, trigger the generation of notice cards 1218, 1220, respectively. It is understood that the example described above is for illustrative purpose and are not intended to be limiting.

FIG. 13 illustrates an exemplary task with a list of task actions for automatic package tracking Task 1 1206 for tracking package status in this example includes a series of task actions (task action list): identifying shipping carrier 1302, identifying tracking number 1304, obtaining shipping carrier's URL 1306, calling shopping carrier's status check API using the tracking number 1308, extracting status information 1310, and filling in the card 1312. Each task action may be associated with parameters such as conditions in which the task action is to be executed. For example, for task action 1312 "filling in the card," the condition may be filling the current package status into an answer card when a question about the package status is asked by the person or filling the current package status into a notice card of package status update without waiting for any input from the person. Some task actions (e.g., 1302, 1304) may be executed by retrieving relevant information from the person-centric space 200 and/or the person-centric knowledge database 532, while some task actions (e.g., 1308) need to be completed in the public space 108. It is understood that the example described above is for illustrative purpose and are not intended to be limiting.

Figure 14:
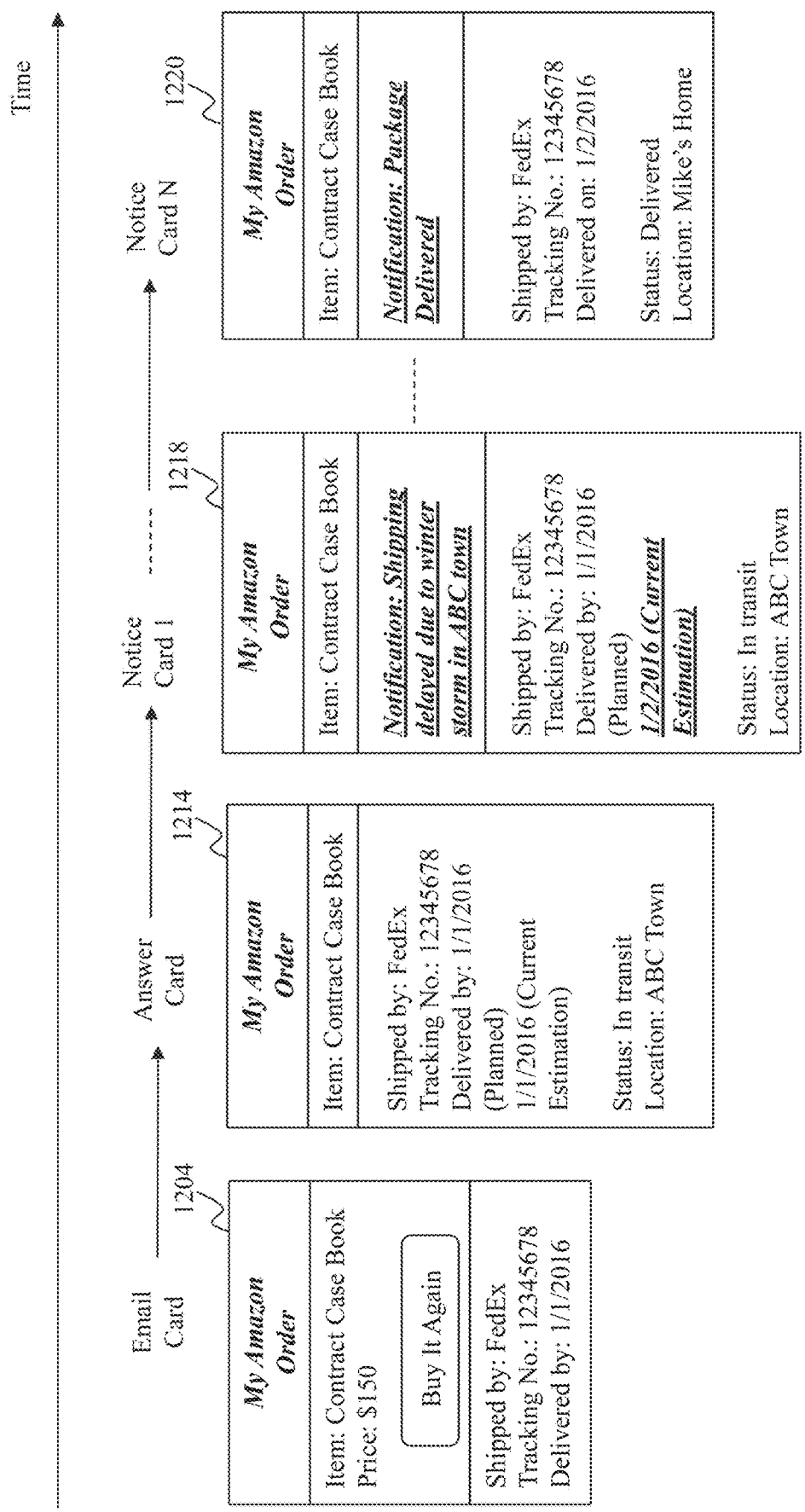
FIG. 14 illustrates a series of exemplary cards provided to a person in the process of automatic online order email summary and package tracking.

FIG. 14 illustrates a series of exemplary cards provided to a person in the process of automatic online order email summary and package tracking In this example, the email card 1204 is automatically generated responsive to receiving the amazon order confirmation email 1202 and summarizes the email 1202 based on the entities extracted from the email 1202 and relationships thereof. The email card 1204 includes a header module "My Amazon Order" and an order module with entities of item and price. A "buy it again" action button may be added in the order module. The email card 1204 also includes a shipping module with entities of shipping carrier, tracking number, and scheduled delivery date.

In this example, the answer card 1214 is generated in response to a question from the person about the status of the package. The answer card 1214 includes the header module and order module (but with less information as the order information is not a direct answer to the question). The answer card 1214 includes a shipping module with rich information related to shipping, which is retrieved from both the private email 1202 and FedEx 1208. The information includes, for example, entities of shipping carrier, tracking number, and scheduled delivery date from the private email 1202, and current estimated delivery date, status, and location from FedEx 1208.

In this example, multiple notice cards 1218, 1220 are automatically generated in response to any event that affects the status of the package. Each notice card 1218, 1220 includes an additional notification module. If any other information is affected or updated due to the event, it may be highlighted as well to bring to the person's attention. In notice card 1 1218, shipment is delayed due to a winter storm in ABC town and as a consequence, the current estimated delivery date is changed according to information retrieved from FedEx 1208. According to notice card N 1220, the package has been delivered to Mike's home. It is understood that the examples described above are for illustrative purpose and are not intended to be limiting.

Figure 15:
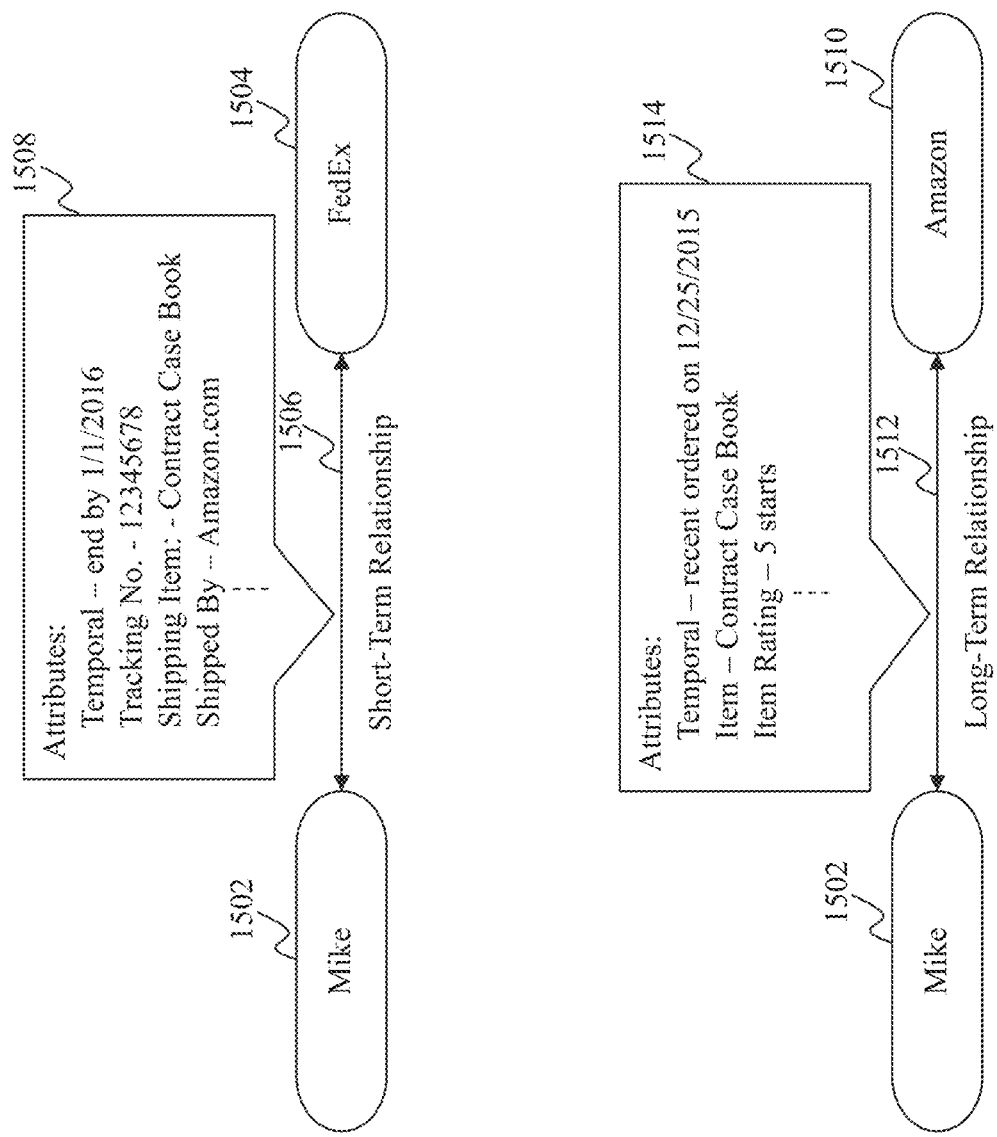
FIG. 15 illustrates exemplary entities extracted from a person-centric space and their relationships established in the process of automatic online order email summary and package tracking.

FIG. 15 illustrates exemplary entities extracted from a person-centric space and their relationships established in the process of automatic online order email summary and package tracking. As described above, the person-centric knowledge database 532 stores person-centric knowledge organized in the form of entity-relationship-entity triples. Entities extracted from the amazon order confirmation email 1202 are formed into entity-relationship-entity triples by the knowledge engine 530. In the example of FIG. 15, entity "Mike" 1502 from the recipient field of the email 1202 is determined as the person using the person-centric INDEX system 202, and entity "FedEx" 1504 is determined as a shipping carrier with a short-term relationship 1506 with entity "Mike" 1502. Attributes 1508 may be associated with the relationship 1506 including, for example, temporal attribute, tracking number, shipping item, sender, etc. These attributes may include related entities extracted from the email 1202 and any other attributes inferred based on the relationship 1506. It is noted that the relationship 1506 between entity "Mike" 1502 and entity "FedEx" 1504 is a short-term, temporary relationship in the sense that the relationship 1506 will become invalid after the shipment is completed, as indicated by the temporal attribute. In this example, entity "Mike" 1502 and another entity "Amazon" 1510 establish a long-term relationship 1512 with a different set of attributes 1514 thereof. The attributes 1514 include, for example, the temporal attribute, item, item rating, and so on. The relationship 1512 is long-term in this example because Mike has been repeatedly ordered goods from Amazon, which has become his behavior pattern or preference. It is understood that the examples described above are for illustrative purpose and are not intended to be limiting.

More detailed disclosures of various aspects of the person-centric INDEX system 202 are covered in different U.S. patent applications, entitled "Method and system for associating data from different sources to generate a person-centric space," "Method and system for searching in a person-centric space," "Methods, systems and techniques for providing search query suggestions based on non-personal data and user personal data according to availability of user personal data," "Methods, systems and techniques for personalized search query suggestions," "Methods, systems and techniques for ranking personalized and generic search query suggestions," "Method and system for entity extraction and disambiguation," "Method and system for generating a knowledge representation," "Method and system for generating a card based on intent," "Method and system for dynamically generating a card," "Method and system for updating an intent space and estimating intent based on an intent space," "Method and system for classifying a question," "Method and system for providing synthetic answers to a personal question," "Method and system for automatically generating and completing a task," "Method and system for online task exchange," "Methods, systems and techniques for blending online content from multiple disparate content sources including a personal content source or a semi-personal content source," and "Methods, systems and techniques for ranking blended content retrieved from multiple disparate content sources." The present teaching is particularly directed to classifying a question using person-centric knowledge associated with the person who asked the question and providing synthetic answers to a personal question.

Internet technology facilitates information publishing, information sharing, and data exchange in various spaces and among various types of users. Some information is publicly available to all Internet users. For example, services provided through FedEx.com and fashion clothes carried by Nordstrom.com are publicly accessible to all Internet users. Yet some information is completely private and can only be accessible to a user. For example, personal emails in YAHOO! mail, GMAIL, OUTLOOK, etc. and personal calendar events are only accessible to the user when he or she logs in using his or her private credentials. Although FedEx.com and Nordstrom.com provide public information, these commercial websites may also host private information associated with individual users at the same time (e.g., a personal account with FedEx.com or a personal account with Nordstrom.com). In some circumstances, information is semi-private and is shared with a certain group of people. For example, Facebook user, Mark, may choose to set his information as public so everyone can search and view; while another Facebook user, Jennie, may choose to share some of her personal information with her selected friends. Information shared by Jennie among her selected friends is semi-private.

When a user asks a question via an Internet browser from a personal device, answers are searched from all spaces connected to Internet including a public space, a semi-private space, a private space, etc. In general, the question is initially analyzed and understood before answers are searched. When the question is more like a personal question, for example, "when is my son's football game?" searching vastly in Internet is unnecessary and inefficient. Further, answers from different spaces are presented to the user in an order of relevance, which does not take into account the association between the question and the user. Therefore, locating the desired answer from the presented multiple answers may be difficult.

There is a need for improvements over the conventional approaches to provide synthetic answers to a personal question.

The present teaching discloses a method and a system for answering personal questions. To achieve this, a question is first classified into a personal question or a non-personal question based on a model. The model may be one or more computer algorithms such as a machine learning algorithm. Once the question is classified as personal, various features including entities and relations are extracted from the question. The extracted entities and relations are used to traverse a person-centric knowledge database, which stores person-centric knowledge extracted from private spaces and semi-private spaces, such as emails, blog posts, and calendar events, in a pre-defined form. In some embodiments, the person-centric information may be stored in a triple format including one or more entities and a relation between the one or more entities. When an exact match of relation and entity are found, an answer is returned. When there is no exact match, a similarity between the question and answer triples is taken into consideration and used to find the candidate answers. To measure the similarity, words embedded over a large corpus of user texts may be collected and trained. The present teaching provides an efficient solution to search for answers to personal questions and increases user engagement and content understanding.

Additional novel features will be set forth, in part, in the description which follows and, in part, will become apparent to those skilled in the art upon examination of the following and the accompanying drawings. Also, it may be learned by production or operation of the examples. The novel features of the present teachings may be realized and attained by practice or use of various aspects of the methodologies, instrumentalities and combinations set forth in the detailed examples discussed below.

Figure 16:
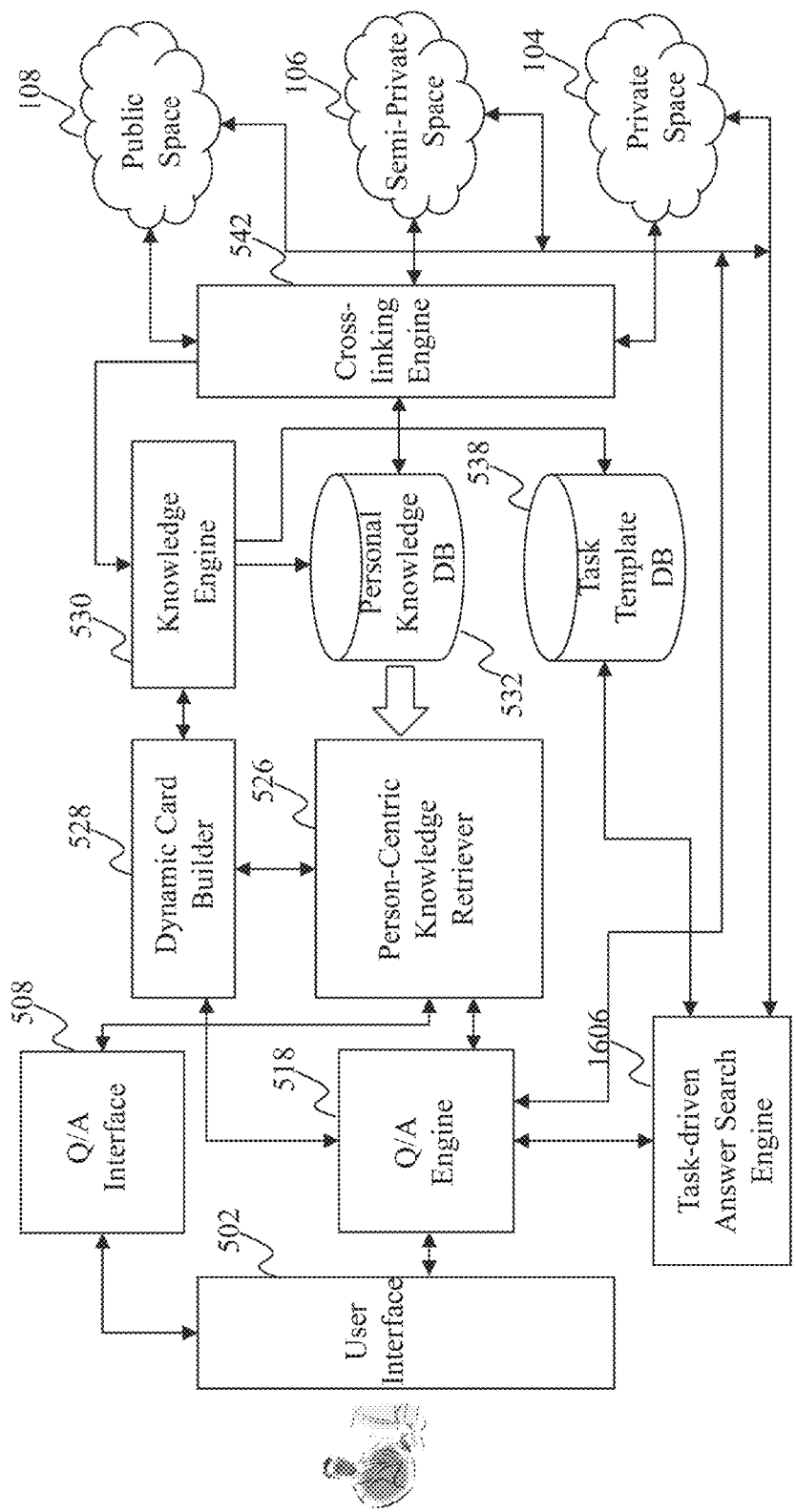
FIG. 16 depicts an exemplary system diagram for question classification and providing synthetic answers to a personal question, according to an embodiment of the present teaching.

FIG. 16 depicts an exemplary system diagram for question classification and providing synthetic answers to a personal question, according to an embodiment of the present teaching. The system comprises one or more elements of the person-centric INDEX system 202 illustrated in FIG. 5 including the user interface 502, the Q/A interface 508, the Q/A engine 518, the dynamic card builder 528, the person-centric knowledge retriever 526, the knowledge engine 530, and the cross-linking engine 542. The basic functions of the noted elements are described above, and therefore, are not detailed herein. For the aspect of question classification and providing synthetic answers, user interface 502 is configured to receive a question inputted by a person 102; Q/A interface 508 is configured to parse the question and classify the question into a personal question or a non-personal question based on established person-centric knowledge; Q/A engine 518 is configured to generate one or more synthetic answers to the classified question and present the one or more synthetic answers in a format, such as an f answer card, to the person 102; person-centric knowledge retriever 526 is configured to retrieve person-centric knowledge associated with the person 102 from a person-centric knowledge database 532 upon determining that the question is classified as a personal question and provide the person-centric knowledge associated with the person 102 to Q/A engine 518; dynamic card builder 528 is configured to dynamically build one or more answer cards based on the question classification and provide the one or more answer cards to Q/A engine 518; knowledge engine 530 is configured to analyze information collected from a public space 108, a semi-private space 106, and a private space 104, create person-centric knowledge about the person 120 based on the analysis, and store and/or update the person-centric knowledge in person-centric knowledge database 532; and cross-linking engine 542 is configured to collect information associated with the person 102 from public space 108, semi-private space 106, and private space 104.

The system for question classification and providing synthetic answers may further comprises a task-driven answer search engine 1606 configured to search answers to a personal question from all available spaces when Q/A engine 518 determines that the answers obtained from the person-centric knowledge associated with the person 102 are no longer valid. Task-driven answer search engine 1606 generates a list of tasks to search answers to the personal question from semi-private space 106 and private space 104. In some embodiments, task-driven answer search engine 1606 may search answers to the personal question from all available resources in addition to semi-private space 106 and private space 104. Task-driven answer search engine 1606 may use an available template from a task template database 538 or create a new template if it is a new task. Task-driven answer search engine 1606 may correspond to one or more elements of the person-centric INDEX system 202 illustrated in FIG. 5, for example, a task generation engine 520 and a task completion engine 522. The system components described above are for illustrative purpose; however, the present teaching is not intended to be limiting and may comprises and/or cooperate with other elements to provide synthetic answers to a personal question. It is understood that although the present teaching related to question classification will be described below in detail as part of the person-centric INDEX system 202, in some embodiments, the system and method disclosed in the present teaching can be independent from the person-centric INDEX system 202 or as part of another system.

Figure 17:
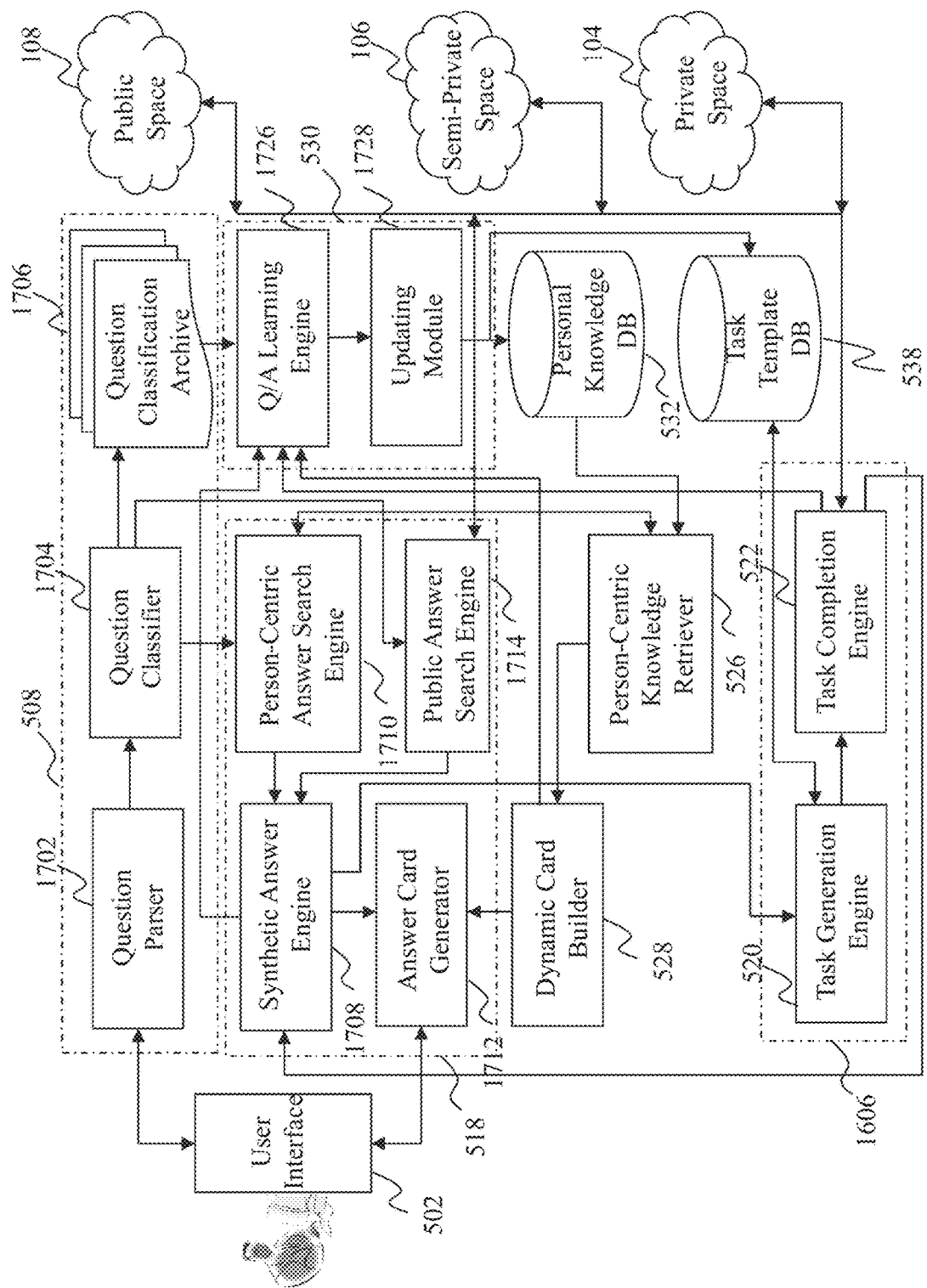
FIG. 17 depicts a detailed system diagram for question classification and providing synthetic answers to a personal question, according to another embodiment of the present teaching.

FIG. 17 depicts a detailed system diagram for question classification and providing synthetic answers to a personal question, according to another embodiment of the present teaching. The system comprises a user interface 502, a question parser 1702, a question classifier 1704, a question classification archive 1706, a synthetic answer engine 1708, a person-centric answer search engine 1710, an answer card generator 1712, a public answer search engine 1714, a dynamic card builder 528, and a person-centric knowledge retriever 526. The question parser 1702 is configured to analyze the textual information of the question into logical syntactic components and identity one or more features from the question. Question parser 1702 may implement one or more computational methods to analyze the textual information of the question, for example, a machine learned sequence tagger to identify and categorize entities presented in the question. Question parser 1702 may further implement a natural language parser to extract one or more relations between the identified entities. Question classifier 1704 is configured to classify the question into a personal question or a non-personal question using a selected model based on the question. Question classification archive 1706 is configured to temporarily archive the classification results for the purpose of training the person-centric knowledge. Person-centric answer search engine 1710 is configured to search one or more person-centric answers with respect to the person 102 based on information retrieved from a person-centric knowledge database 532 by person-centric knowledge retriever 526. Public answer search engine 1714 is configured to search for answers from all available sources, for example, from a public space 108, a semi-private space 106, and/or a private space 104. The searched person-centric answers and public answers are provided to synthetic answer engine 1708. Synthetic answer engine 1708 is configured to synthesize and prioritize the received person-centric answers and the public answers and provide the synthetic answers to answer card generator 1712. Answer card generator 1712 obtains one or more answer card templates from dynamic card builder 528 and generates one or more integrated answer cards embedded with the synthetic answers, respectively. The one or more integrated answer cards are further presented to the person via user interface 502 as a response to the question. In some embodiments, all synthetic answers use a same answer card template; yet in some other embodiments, more than one answer card template are used to present the synthetic answers. In some embodiments, the synthetic answers may be presented in a combination of different formats including answer cards, list of answers, graphic representations of answers, etc.

In some embodiments, the system for question classification and providing synthetic answers to a personal question may further comprises a task generation engine 520 and a task completion engine 522. When it is determined that the received person-centric answer is no longer valid and/or out-of-date, synthetic answer engine 1708 instructs task generation engine 520 to generate a list of tasks to search for a valid version and/or an up-to-date version related to the person-centric answer from all available resources. Task completion engine 522 is configured to perform the list of tasks and provide a valid version and/or an up-to-date version related to the person-centric answer to synthetic answer engine 1708. In some embodiments, task generation engine 520 may search a task template database 538 and determine whether a template with respect to the generated list of tasks is available. If an available template is found in template database 538, task generation engine 520 integrates the list of tasks with the available template and forwards the integrated list of tasks to task completion engine 522. If an available template is not found in template database 538, task generation engine 520 creates a task template with respect to the person-centric answer, integrates the list of tasks with the newly created template, and forwards the integrated list of tasks to task completion engine 522.

In some embodiments, the system for question classification and providing synthetic answers to a personal question may further comprises a Q/A learning engine 1726 and an updating module 1728. Q/A learning engine 1726 receives inputs from question classification archive 1706, synthetic answer engine 1708, dynamic card builder 528, and/or other components of the person-centric INDEX system 202 directly or indirectly. Q/A learning engine 1726 is configured to analyze information related to the question classification, the synthetic answers to a personal question, person's interactions with the provided answer cards, etc. based on the received inputs, and determine whether the person-centric knowledge associated with the person 102 needs to be updated in person-centric knowledge database 532, and/or whether the task templates need to be updated in task template database 538. Once it is determined that the person-centric knowledge and/or the task templates need to be updated, updating module 1728 updates person-centric knowledge database 532 and/or task template database 538 accordingly.

Figure 18:
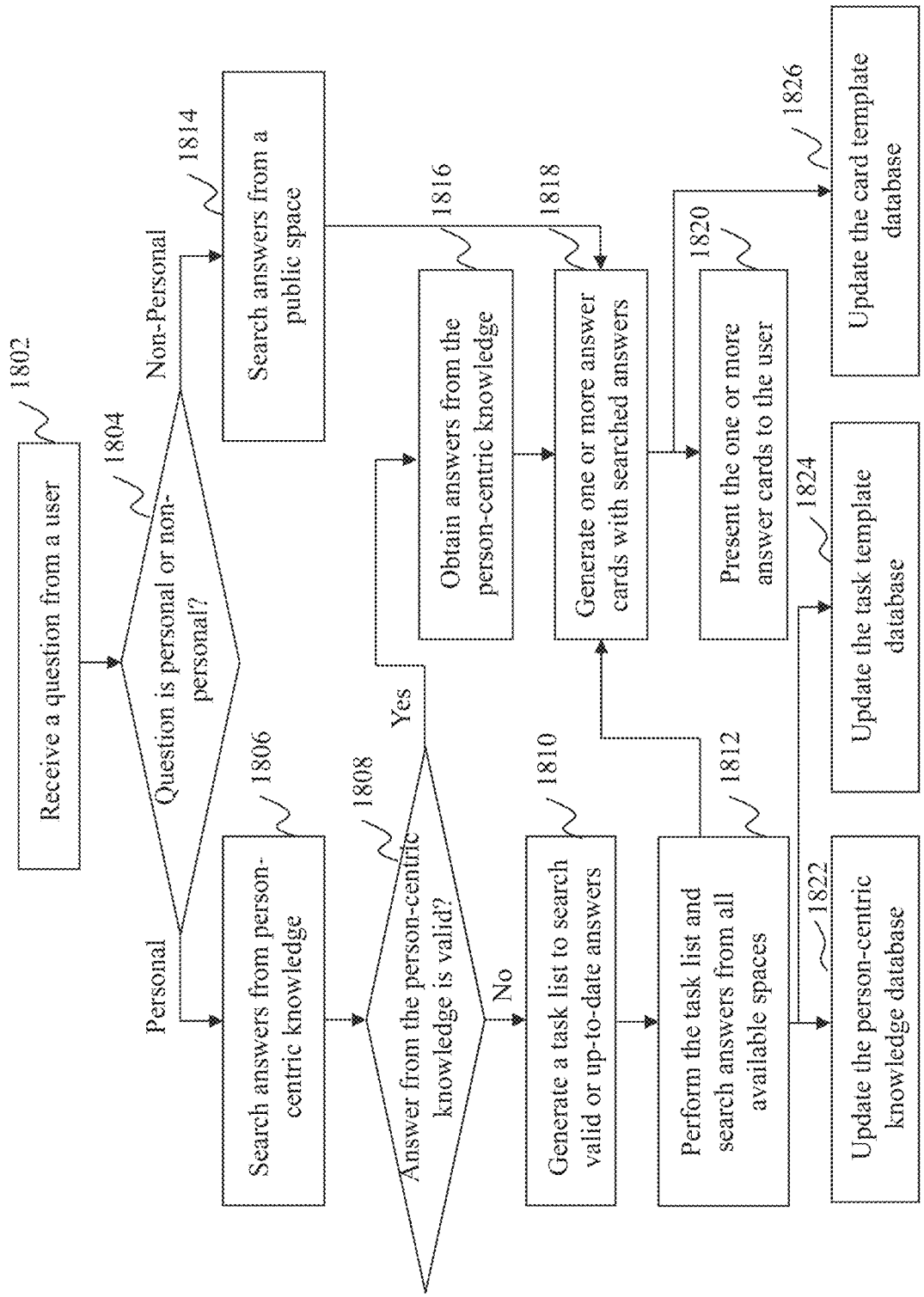
FIG. 18 is a flowchart of an exemplary process for question classification and providing synthetic answers to a personal question, according to an embodiment of the present teaching.

FIG. 18 is a flowchart of an exemplary process for question classification and providing synthetic answers to a personal question, according to an embodiment of the present teaching. A question from a person is received at 1802. A determination as to whether the question is personal or non-personal is made at 1804. If it is determined that the question is personal, answers to the personal question is searched from a person-centric knowledge database at 1806. If it is determined that the question is non-personal, answers to the non-personal question is searched from a public space at 1814. A determination as to whether the searched answer from the person-centric knowledge database 532 is valid is made at 1808. If it is determined that the searched answer from the person-centric knowledge database 532 is valid, answers are obtained from the person-centric knowledge database 532 at 1816. If it is determined that the searched answer from the person-centric knowledge database 532 is invalid, a task list to search for answers is generated at 1810. The task list is performed and answers are searched from all available spaces at 1812. One or more answer cards with integrated synthetic answers are generated at 1820. The person-centric knowledge database 532 is updated at 1822. The task template database 538 is updated at 1824. The card template database is updated at 1826.

Figure 19:
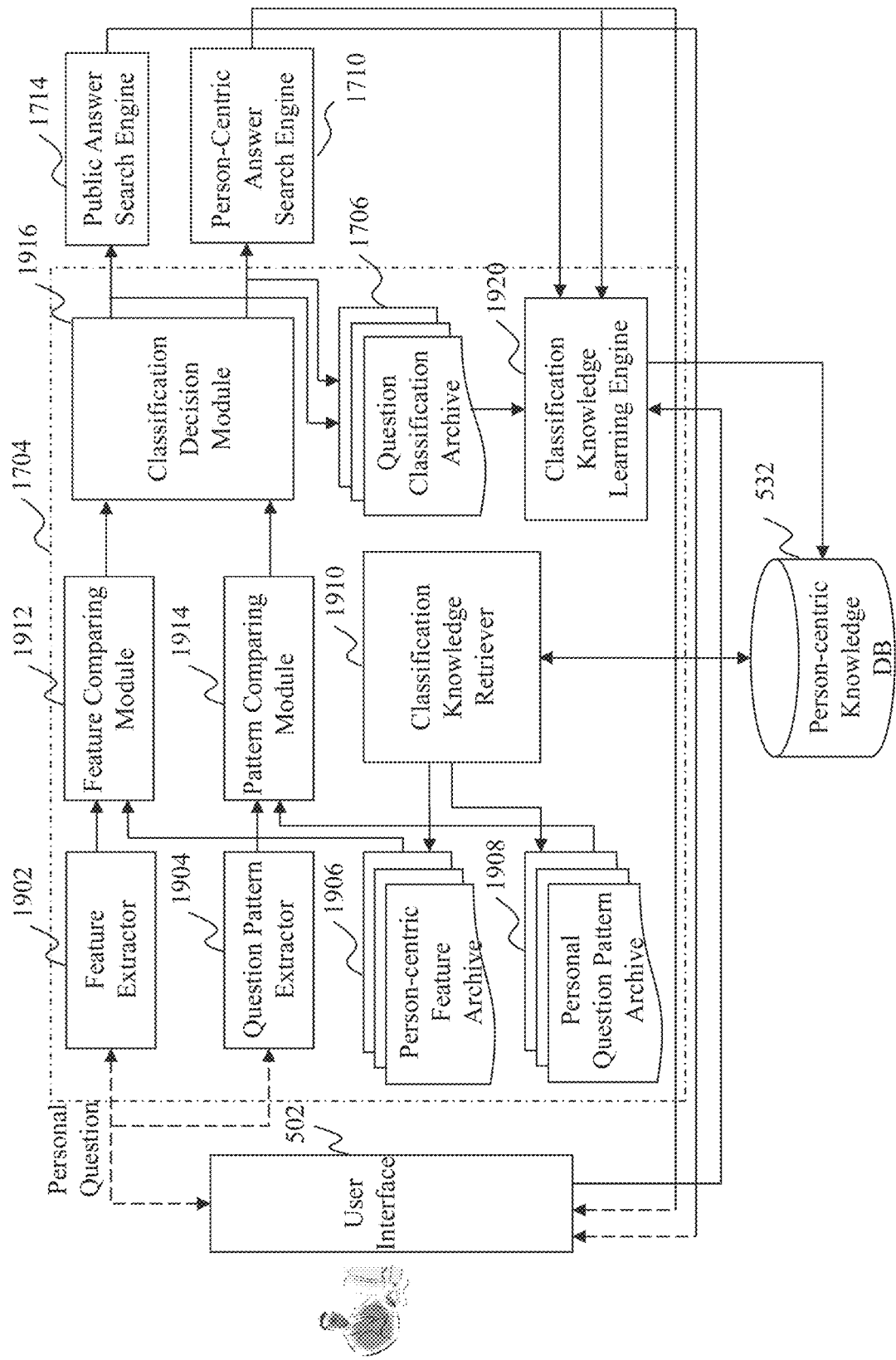
FIG. 19 depicts an exemplary system diagram of a question classifier, according to an embodiment of the present teaching.

FIG. 19 depicts an exemplary system diagram of a question classifier, according to an embodiment of the present teaching. Question classifier 1704 as illustrated in FIG. 17 comprises a feature extractor 1902, a question pattern extractor 1904, a person-centric feature archive 1906, a personal question pattern archive 1908, a classification knowledge retriever 1910, a feature comparing module 1912, a pattern comparing module 1914, a classification decision module 1916, and a question classification archive 1706. Feature extractor 1902 is configured to extract one or more features from the received question. The one or more features may be categorized into personal entities, non-personal entities, dates and/or time, locations, verbs and/or action words, relations between personal entities and/or non-personal entities, etc. Personal entities may be a person's name, a person's nickname, a person's user ID in the semi-private space such as Twitter, Facebook, etc. Non-personal entities may be a name, a nickname, and/or an abbreviation of a business entity, a building and/or a construction, a botanical entity, an animal, and/or any non-human being entities. Feature extractor 1902 may be further configured to determine the relations between any personal entities and/or non-personal entities based on the categorized features. The extracted features and the associated relations are further used to construct a plurality of arguments that define person-centric knowledge with respect to a particular person.

Question pattern extractor 1904 is configured to extract one or more patterns related to the question. For example, the received question is "How to write a good resume?" and the pattern of the question may be extracted as a pattern of using interrogative word "How." Based on the questions being asked over the Internet, most of the questions with the pattern of using interrogative word "How" receive answers from all available resources. Accordingly, a question with the pattern of using interrogative word "How" may be classified as a non-personal question. In some embodiments, question pattern extractor 1904 may determine whether the question contains some type of entities, for example, an entity associated with the person who asked the question, or an entity related to a celebrity, etc. In some other embodiments, question pattern extractor 1904 may combine the knowledge of the interrogative word and the entities to generate patterns of questions.

Classification knowledge retriever 1910 is configured to retrieve person-centric knowledge related to question classification from a person-centric knowledge database 532. Classification knowledge retriever 1910 may function as a part of person-centric knowledge retriever 526. In some embodiments, classification knowledge retriever 1910 may function independently from person-centric knowledge retriever 526 but exchange data with person-centric knowledge retriever 526. The retrieved classification knowledge is saved in one or more knowledge archives based on the categories of the classification knowledge. In some embodiments, the retrieved classification knowledge is saved in person-centric feature archive 1906 and personal question pattern archive 1908, respectively. Person-centric feature archive 1906 and personal question pattern archive 1908 may be stored in a cached memory of the system. Information saved in person-centric feature archive 1906 and personal question pattern archive 1908 may be updated dynamically in accordance with the question and/or the user who asked the question. Feature comparing module 1912 compares the retrieved features with the archived person-centric feature and pattern comparing module 1914 compares the retrieved question pattern with the archived personal question patterns. The comparison results are sent to classification decision module 1916 to determine whether the question is in a personal question category or a non-personal question category. Classification decision module 1916 may use different decision schemes based on the received comparison results. For example, classification decision module 1916 may determine the question classification based on the feature comparison result or the question pattern comparison result. In some embodiments, classification decision module 1916 may combine both results from the feature comparison and the question pattern comparison to determine the question classification. It should be appreciated that the above description related to question classification is for illustrative purpose and is not intended to be limiting. The present teaching may classify a question into a personal category or a non-personal category based on other knowledge associated with the question and/or the user asked the question. In some embodiments, the present teaching may further classify the personal category or the non-personal category into one or more sub-categories in order to provide more satisfying answers to the person.

In some embodiments, question classifier 1704, as illustrated in FIG. 17, may further comprise a classification knowledge learning engine 1920. Classification knowledge learning engine 1920 is configured to analyze the question being asked, the classification of the question, answers to the question, and/or person's interaction with the answers, etc. to determine whether the question classification is appropriate or not. Information related to the question classification is saved in question classification archive 1706, which includes a complete question being asked by a person, parsed question components, extracted features, extracted question pattern, classification decision, i.e., personal or non-personal, etc. If the question is classified as personal, person-centric answer search engine 1710 searches for one or more person-centric answers based on the person-centric knowledge. If the question is classified as non-personal, public answer search engine 1714 searches for one or more public answers from all available resources. The plurality of person-centric answers and public answers are presented to the person. In some embodiments, the plurality of person-centric answers and public answers are presented together with one or more sponsored search results. Upon receiving the answers via user interface 502, the person selects and reviews one or more of the presented answers and/or sponsored search results. Such person interactions are collected and sent to classification knowledge learning engine 1920. Classification knowledge learning engine 1920 analyzes information related to the question classification, the plurality of person-centric answers and public answers, and information related to person interactions with the presented answers. Classification knowledge learning engine 1920 determines whether the person is satisfied with the presented answers and whether the question classification is appropriate or not. The classification knowledge is further updated in person-centric knowledge database 532 directly or indirectly. Classification knowledge learning engine 1920 as illustrated functions as a part of question classifier 1704, and therefore, the classification knowledge data is communicated to knowledge engine 530 to update person-centric knowledge database 532. However, the present teaching is not intended to be limiting. In some embodiments, classification knowledge learning engine 1920 may be integrated to knowledge engine 530 as one function module, and the classification knowledge data is updated directly to person-centric knowledge database 532.

Figure 20:
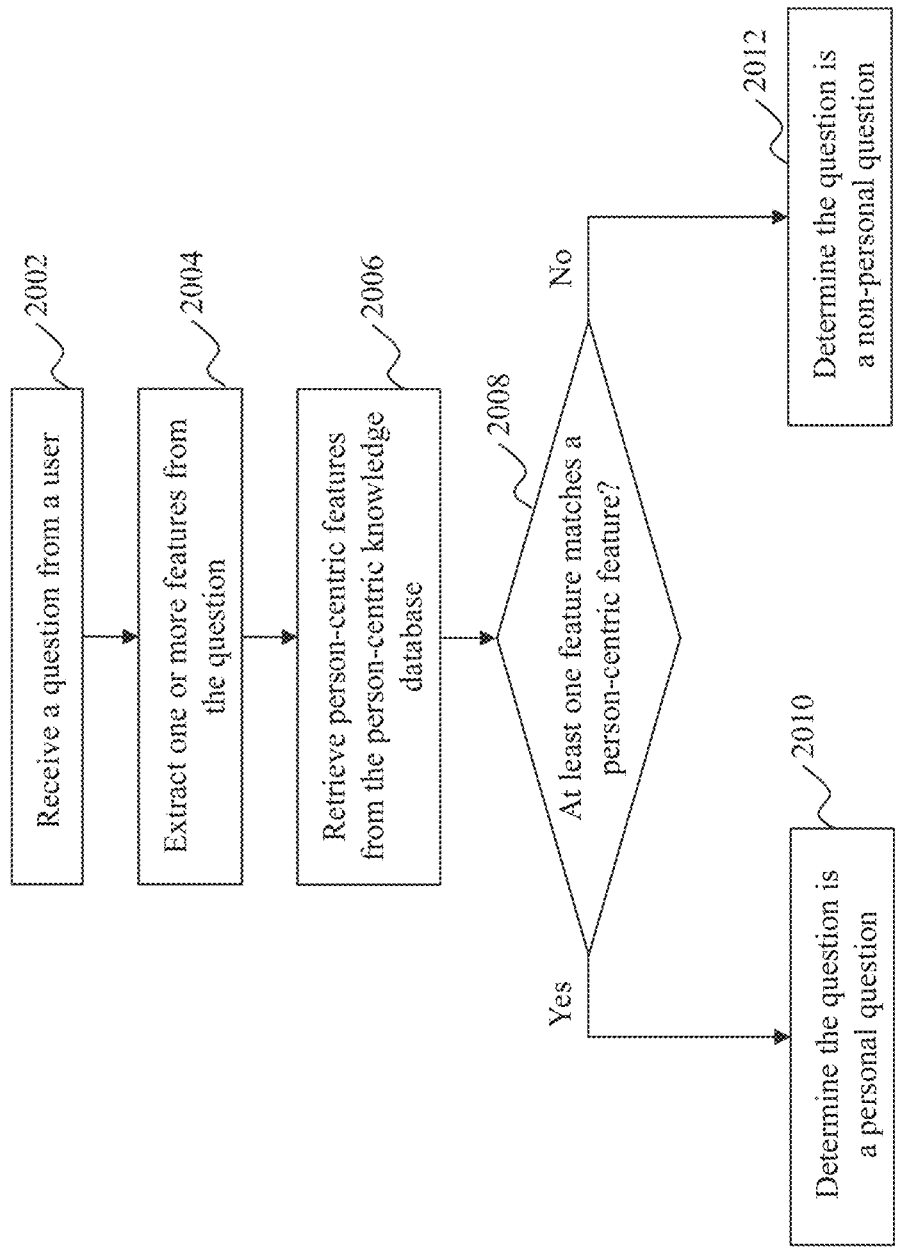
FIG. 20 is a flowchart of an exemplary process of classifying a question, according to an embodiment of the present teaching.

FIG. 20 is a flowchart of an exemplary process of classifying a question, according to an embodiment of the present teaching. A question is initially received from a person at 2002. Further, one or more features are extracted from the question at 2004. The person-centric features are retrieved from person-centric knowledge database 532 at 2006. A decision is made as to whether at least one feature extracted from the question matches a person-centric feature from person-centric knowledge database 532 at 2008. If at least one feature extracted from the question matches a person-centric feature from person-centric knowledge database 532, a decision is made that the question is a personal question at 2010. If no features extracted from the question matches a person-centric feature from person-centric knowledge database 532, a decision is made that the question is a non-personal question at 2012.

FIG. 21 depicts an exemplary person-centric knowledge for classifying a question, according to an embodiment of the present teaching. For example, when a question "How to write a good resume?" is received, a feature of "resume" is extracted from the question. If no match is found from person-centric knowledge database 532, the question is classified as non-personal. In another example, when a question "When is Taylor Swift's birthday?" is received, a feature of "Taylor Swift" and a feature of "birthday" are extracted from the question. If no match with respect to the two extracted features is found from person-centric knowledge database 532, the question is classified as non-personal. In yet another example, when a question "E-ticket for Taylor Swift's concert?" is received, "Taylor Swift," "E-ticket," and "concert" are extracted from the question. When "E-ticket" matches a person-centric feature from person-centric knowledge database 532, the question is classified as personal. The person may ask any types of questions, and the examples described above are for illustrative purpose and are not intended to be limiting.

Figure 22:
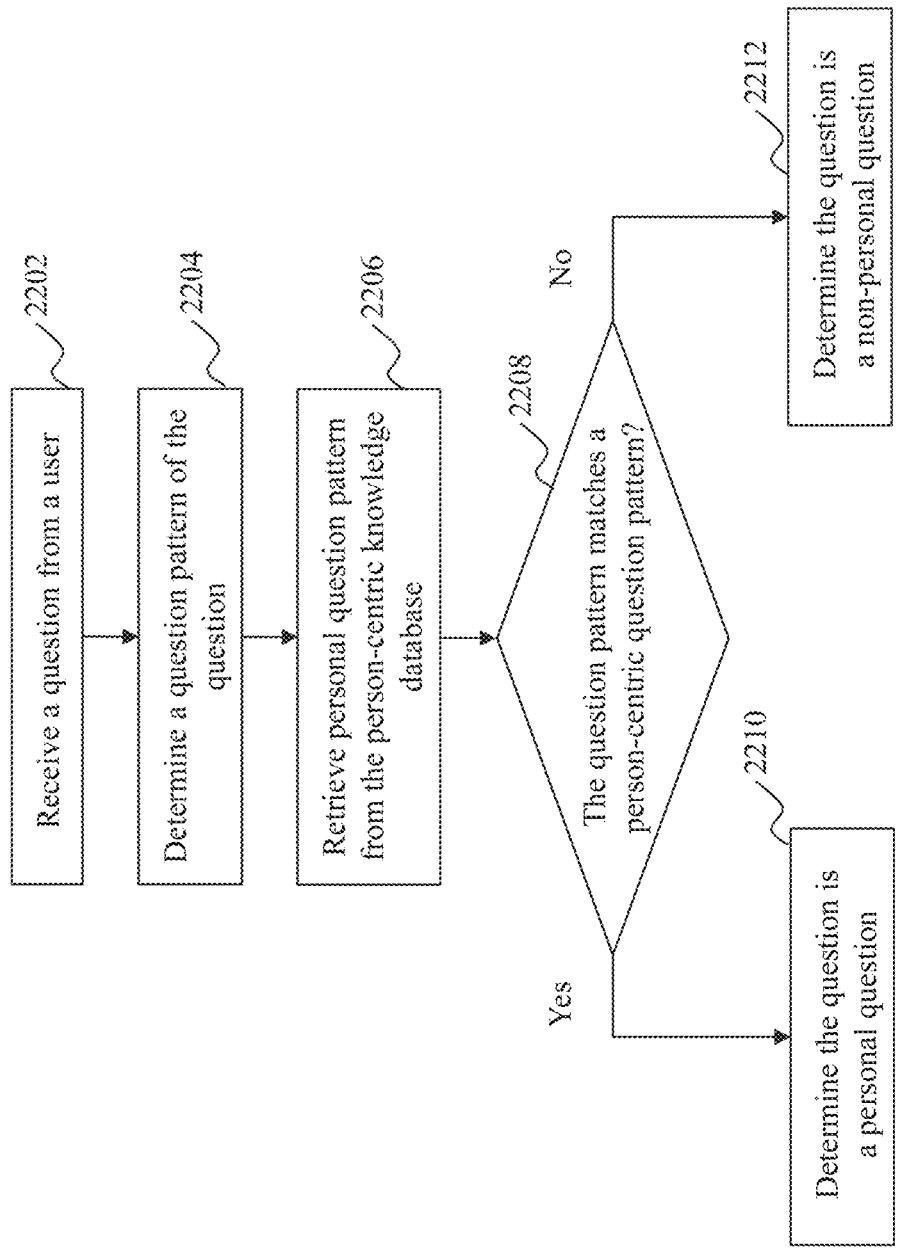
FIG. 22 is a flowchart of an exemplary process of classifying a question, according to another embodiment of the present teaching.

FIG. 22 is a flowchart of an exemplary process of classifying a question, according to another embodiment of the present teaching. A question is received from a person at 2202. Further, a question pattern is determined from the question at 2204. The personal question patterns are retrieved from person-centric knowledge database 532 at 2206. A decision is made as to whether the question pattern matches a personal question pattern from person-centric knowledge database 532 at 2208. If the question pattern matches a personal question pattern from person-centric knowledge database 532, a decision is made that the question is a personal question at 2210. If the question pattern does not match a personal question pattern from person-centric knowledge database 532, a decision is made that the question is a non-personal question at 2212.

FIG. 23 depicts an exemplary person-centric knowledge for classifying a question, according to another embodiment of the present teaching. For example, when a question "How to write a good resume?" is received, a question pattern of using interrogative word "How" is determined. The personal questions patterns retrieved from person-centric knowledge database 532 does not have a pattern that uses interrogative word "How," and therefore, the question is classified as non-personal. In another example, when a question "When is Taylor Swift's birthday?" is received, a question pattern is determined to have a celebrity name. The personal questions patterns retrieved from person-centric knowledge database 532 do not consider the celebrity name as a personal question pattern, and therefore, the question is classified as non-personal. In yet another example, when a question "E-ticket for Taylor Swift's concert?" is received, a question pattern is determined to have celebrity name and personal event information which is defined as a personal question pattern. Therefore, the question is determined as personal. The system may construct all types of personal question patterns. The examples described above are for illustrative purpose and are not intended to be limiting.

Figure 24:
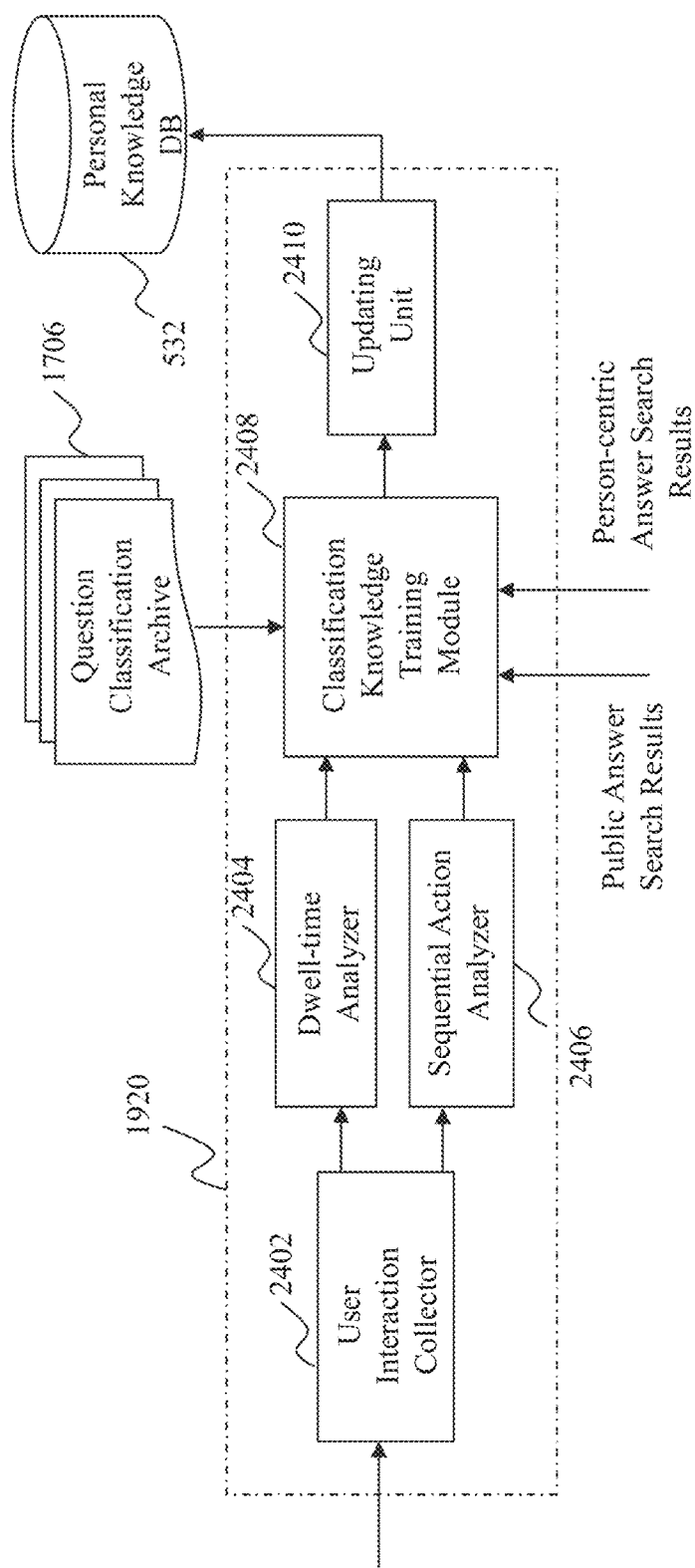
FIG. 24 depicts an exemplary system diagram of a machine learning system for training the person-centric knowledge for classifying a question, according to an embodiment of the present teaching.

FIG. 24 depicts an exemplary system diagram of a machine learning system for training the person-centric knowledge for classifying a question, according to an embodiment of the present teaching. Classification knowledge learning engine 1920 as illustrated in FIG. 19 comprises a user interaction collector 2402, a dwell-time analyzer 2404, a sequential action analyzer 2406, a classification knowledge training module 2408, and an updating unit 2410. User interaction collector 2402 is configured to communicate with user interface 502 to collect the person's interactions with the presented answers. The presented answers include a plurality of person-centric answers and public answers, each of which in a format of an answer card. Dwell-time analyzer 2404 is configured to analyze the time that the person spent on reviewing an answer card, information related to the answer card, and/or a webpage redirected from the answer card. The longer the dwell-time, the more interest that the user may have on a particular answer card. Sequential action analyzer 2406 is configured to analyze a series of user interactions sequentially occurred after reviewing an answer card. If the sequentially occurred user interactions are closely related to a person-centric answer card, a decision is made that the classification of the question as a personal category is more likely to be appropriate. If the sequentially occurred user interactions appear random, a decision is made that the classification of the question as a personal category may be inappropriate.

Classification knowledge training module 2408 is configured to receive information related to the question classification from question classification archive 1706, searched results such as person-centric answers and/or public answers from person-centric answer search engine 1710 and public answer search engine 1714, dwell-time analysis result from dwell-time analyzer 2404, and sequentially occurred user interaction analysis result from sequential action analyzer 2406. Classification knowledge training module 2408 is further configured to train the received data and generate classification knowledge as a basis for further question classification. Classification knowledge training module 2408 may use computer programs such as machine learning system to train the received data. Classification knowledge training module 2408 may train the data based on the dwell-time analysis result or the sequential action analysis result alone. In some other embodiments, classification knowledge training module 2408 may combine the dwell-time analysis result and the sequential action analysis result to train the data. Updating unit 2410 is configured to update person-centric knowledge database 532 with the newly-trained person-centric knowledge. It should be appreciated that the description above is for illustrative purpose. Various characters related to the person interactions may be analyzed to determine whether the user is satisfied with the presented answers, which in turn indicates whether the question classification is appropriate or not.

Figure 25:
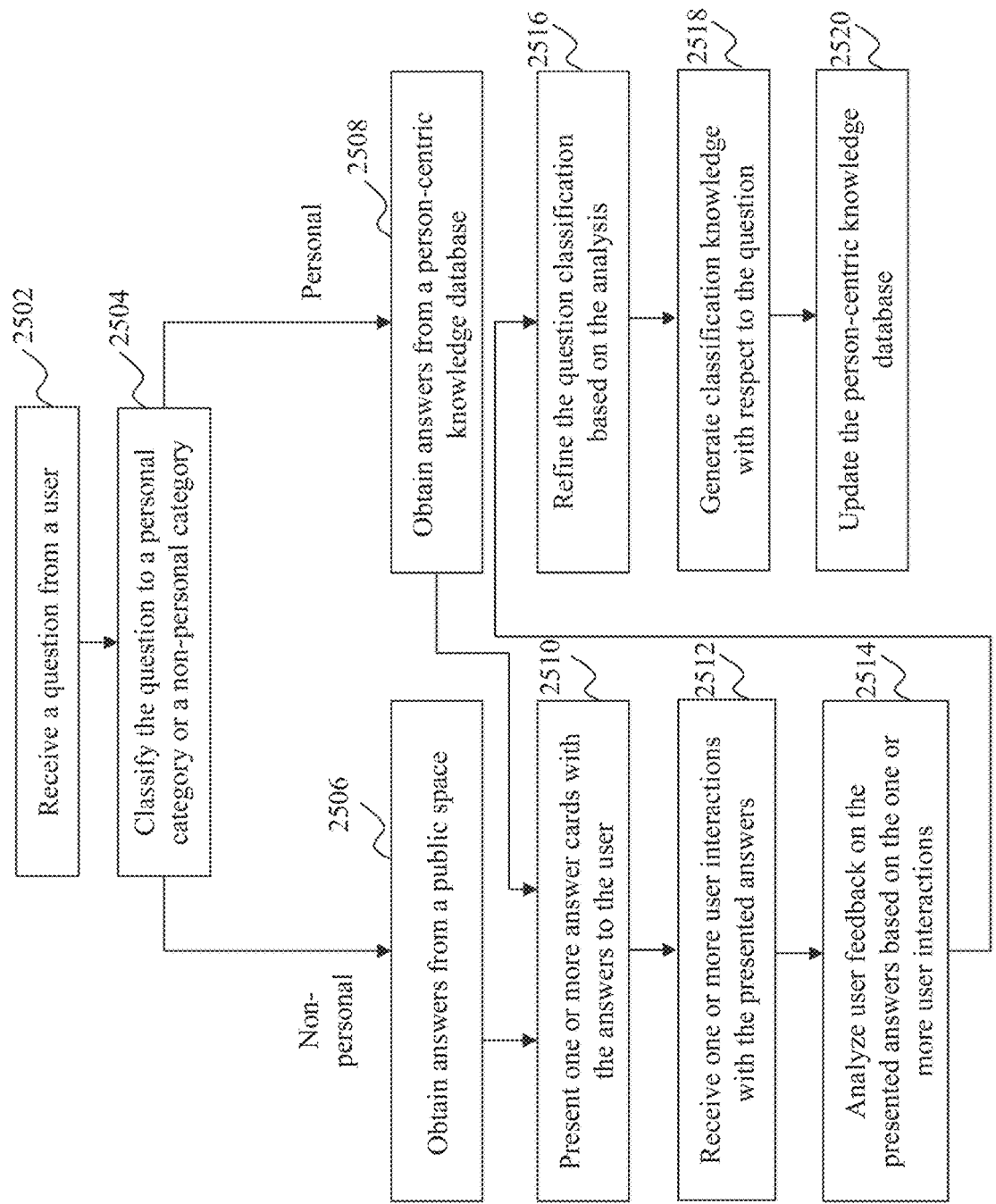
FIG. 25 is a flowchart of an exemplary process of a machine learning process for training the person-centric knowledge for classifying a question, according to an embodiment of the present teaching.

FIG. 25 is a flowchart of an exemplary process of a machine learning process for training the person-centric knowledge for classifying a question, according to an embodiment of the present teaching. Initially, a question is received from the user at 2502. The question is classified to a personal category or a non-personal category at 2504. If the question is classified as a non-personal question, answers are obtained from all available resources at 2506. If the question is classified as a personal question, answers are obtained from a person-centric knowledge database at 2508. One or more answer cards with integrated answers are presented to the user at 2510. Further, one or more user interactions with the presented answers are collected at 2512. User feedback on the presented answers based on the collected one or more user interactions are analyzed at 2514. The question classification temporarily archived is refined based on the analysis at 2516. Classification knowledge with respect to the question is generated at 2518. The person-centric knowledge database is updated at 2520.

Figure 26:
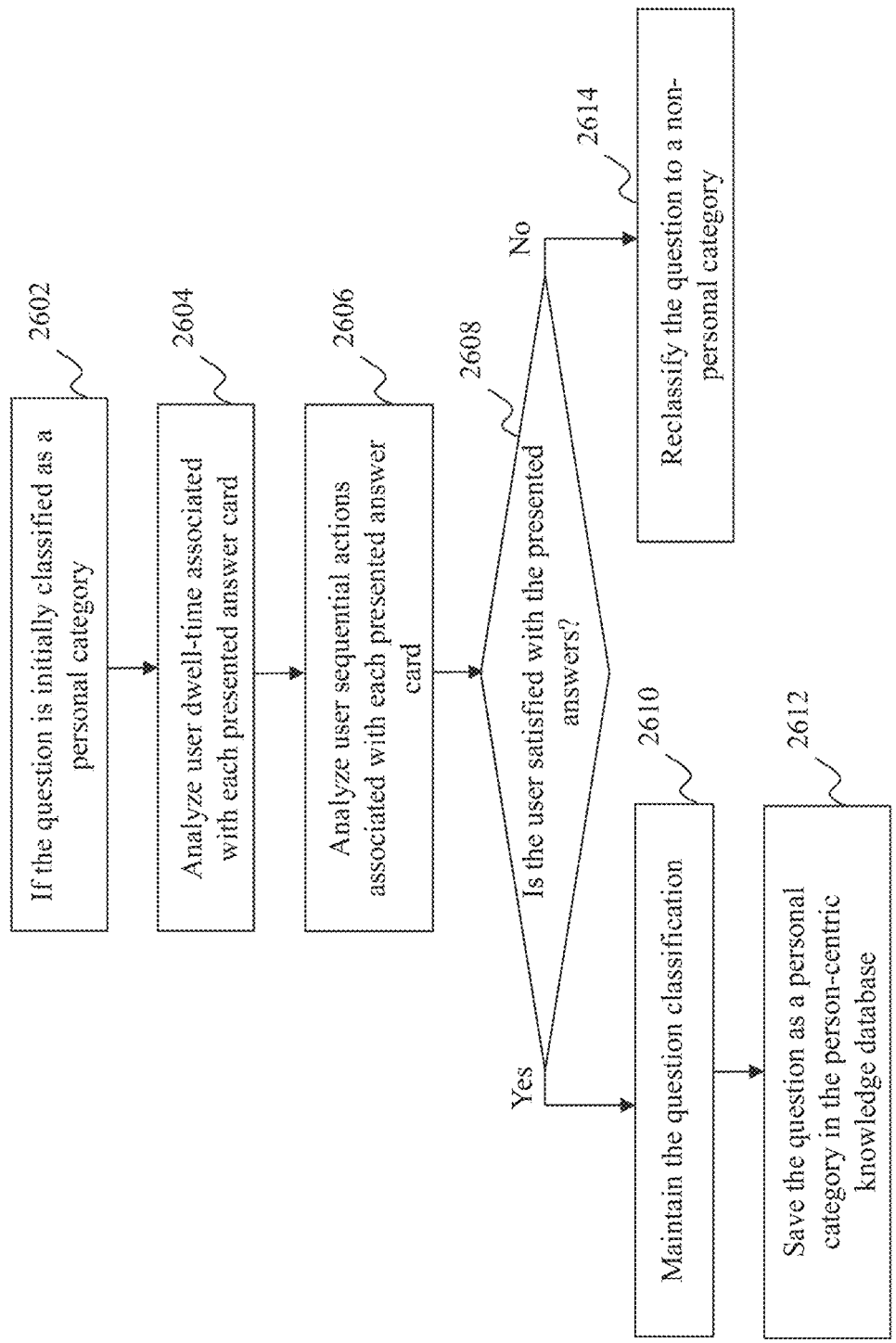
FIG. 26 is a flowchart of an exemplary process of a machine learning process for training the person-centric knowledge for classifying a question, according to another embodiment of the present teaching.

FIG. 26 is a flowchart of an exemplary process of a machine learning process for training the person-centric knowledge for classifying a question, according to another embodiment of the present teaching. A question is initially classified as a personal category at 2602. User dwell-time associated with each presented answer card is analyzed at 2604. User sequential actions associated with each presented answer card is analyzed at 2606. A decision is made as to whether the user is satisfied with the presented answers at 2608. If the person is satisfied with the presented answers, the question classification is maintained at 2610, and the question is saved in the person-centric knowledge database as a personal category at 2612. If the user is unsatisfied with the presented answers, the question is reclassified as a non-personal question at 2614 and is not saved in the person-centric knowledge database.

FIG. 27 depicts an example of determining the classification accuracy based on two parameters, according to another embodiment of the present teaching. As shown in the Table, the dwell-time and the sequential action are two parameters employed to determine whether a question classification is appropriate or not. When the person's dwell-time on a person-centric answer card is long and the next action is to click another person-centric answer card, it is determined that the classifying of the question as "personal" is highly appropriate. In another example, when the user's dwell-time on a person-centric answer card is moderate and the next action is to ask a new question, it is determined that the classifying of the question as "personal" is less appropriate. The determination of whether a question classification is appropriate or not may be performed by one or more computer algorithms, for example, machine learning algorithm or fuzzy logic algorithm. The parameters and computer algorithms used to determine whether a question classification is appropriate or not are not limited to the examples set forth above. The present teaching may use various other features related to the user interactions and apply different computer algorithms to make the decision.

Figure 28:
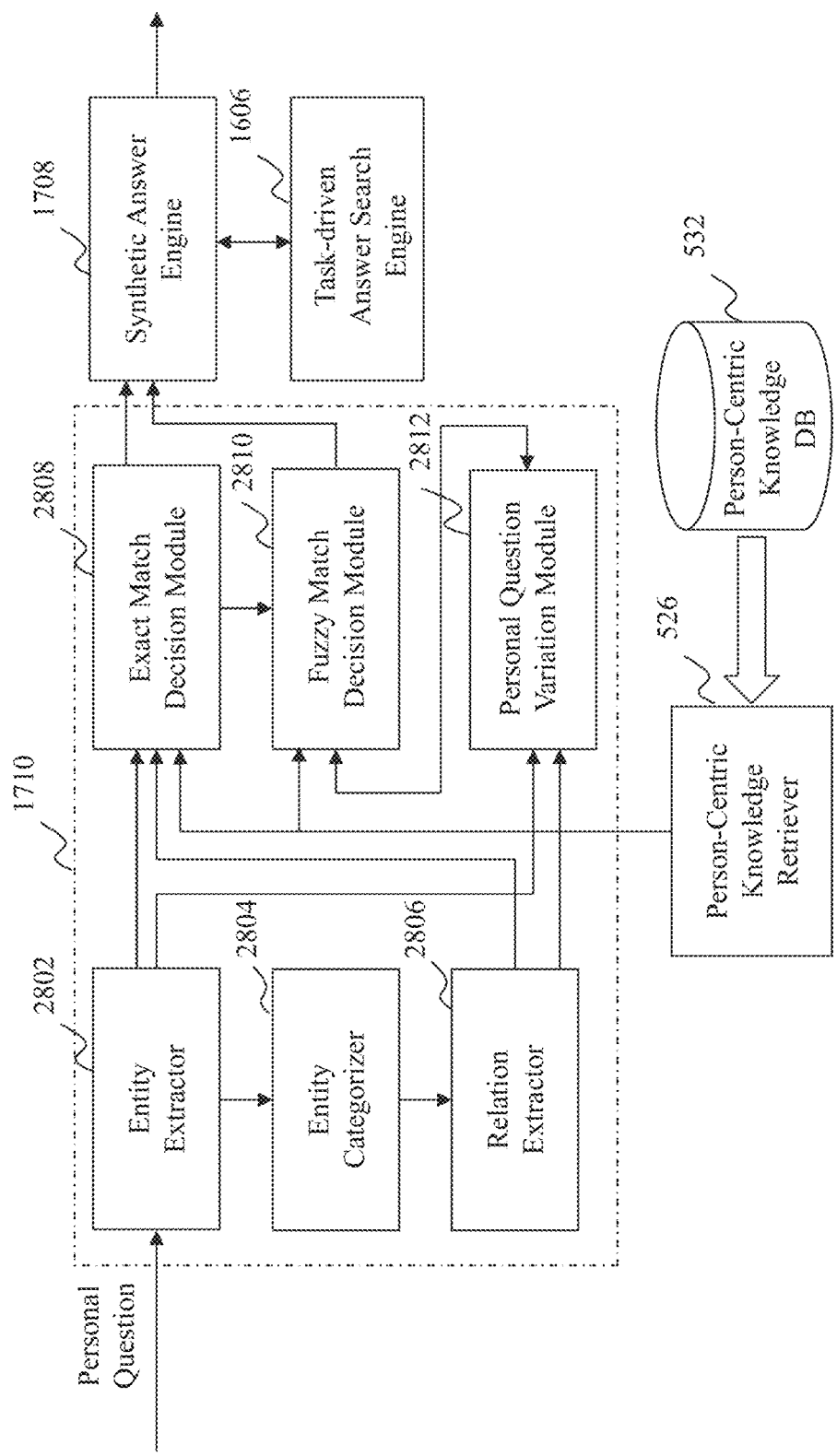
FIG. 28 depicts an exemplary system diagram for providing synthetic answers to a personal question, according to an embodiment of the present teaching.

FIG. 28 depicts an exemplary system diagram for providing synthetic answers to a personal question, according to an embodiment of the present teaching. The synthetic answers to a personal question are generated via person-centric answer search engine 1710, which comprises an entity extractor 2802, an entity categorizer 2804, a relation extractor 2806, an exact match decision module 2808, a fuzzy match decision module 2810, and a personal question variation module 2812. After a question is classified as a personal question, entity extractor 2802 extracts all entities from the question and entity categorizer 2804 categorizes the extracted entities into different categories. Entity extractor 2802 may apply a machine learning sequence tagger to identify all entities from the question; however, the methods of identifying the entities may include other computer algorithms. Entity extractor 2802 and entity categorizer 2804 as illustrated are two separate components; however, the present teaching is not intended to be limiting. Entity extractor 2802 and entity categorizer 2804 may be integrated as one function component. Relation extractor 2806 is configured to extract one or more relations between the identified entities from the question. Relation extractor 2806 may use a natural language parser to extract the relation information; however, relation extractor 2806 may use other parsing techniques to obtain the relation information.

Exact match decision module 2808 is configured to determine whether there is an exact match between one or more of the extracted entities and the extracted relations based on information provided by person-centric knowledge retriever 526 who retrieves such information from person-centric knowledge database 532. When an exact match is not found, fuzzy match decision module 2810 makes further decision as to whether an answer to a variation of the question exists in person-centric knowledge database 532. One or more variations of the question are generated by personal question variation module 2812 based on selected variation criteria. Results from exact match decision module 2808 and fuzzy match decision module 2810 are sent to synthetic answer engine 1708. In some embodiments, synthetic answer engine 1708 generates a plurality of person-centric answers based on the results from exact match decision module 2808 and fuzzy match decision module 2810. In some other embodiments, synthetic answer engine 1708 initiates a task request, and sends the task request to task-driven answer search engine 1606. Task-driven answer search engine 1606 searches for answers in accordance with the received task request and provides the searched answers to synthetic answer engine 1708.

Figure 29:
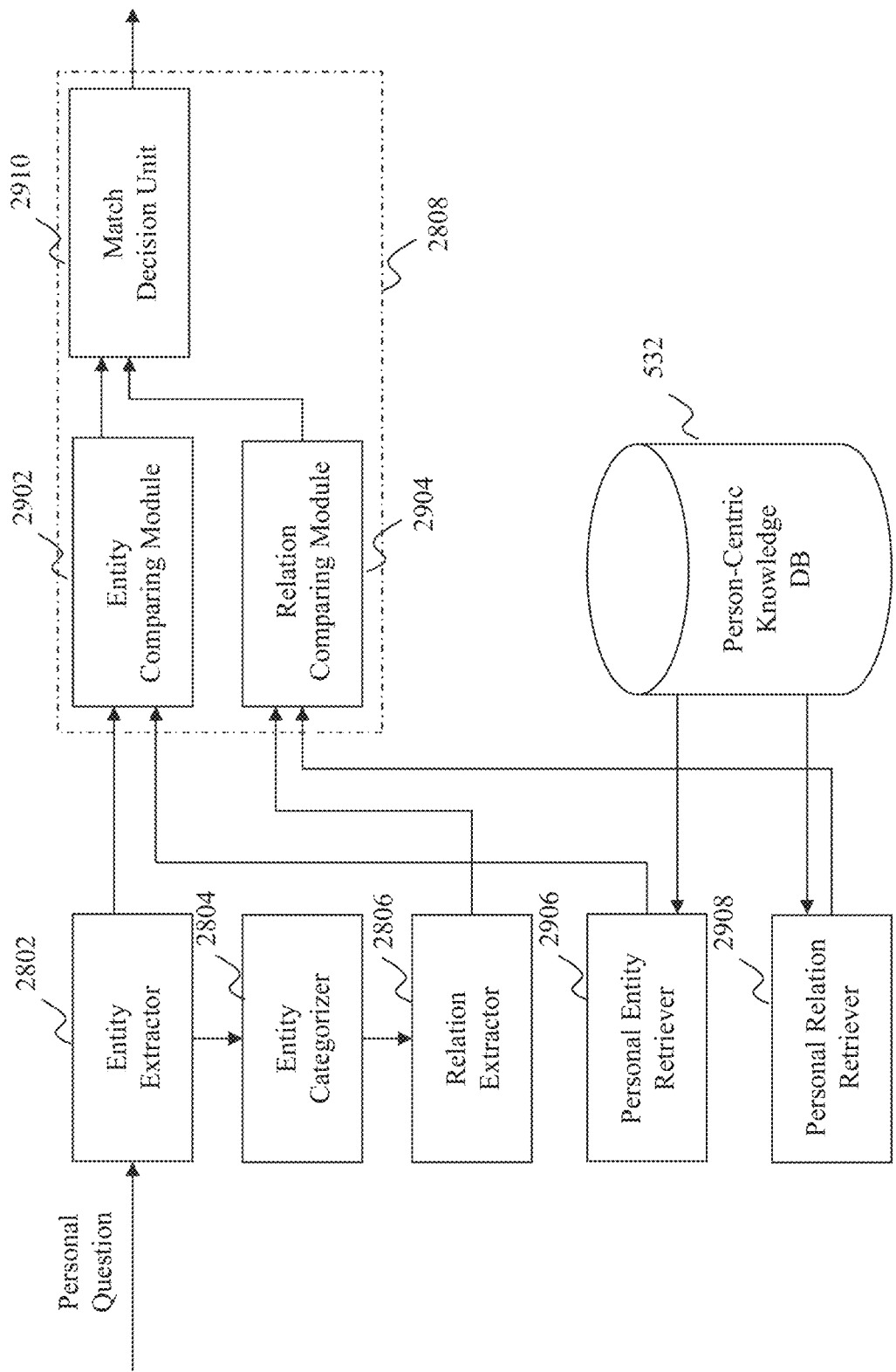
FIG. 29 depicts an exemplary system diagram for providing synthetic answers to a personal question, according to another embodiment of the present teaching.

FIG. 29 depicts an exemplary system diagram for providing synthetic answers to a personal question, according to another embodiment of the present teaching. According to the illustrated embodiment, a person-centric entity retriever 2906 retrieves all person-centric entities associated with the user who asked the personal question from person-centric knowledge database 532; a person-centric relation retriever 2908 retrieves all person-centric relations associated with the user who asked the personal question from person-centric knowledge database 532; an entity comparing module 2902 compares the entities extracted from the question with all person-centric entities associated with the user and determines whether there is at least one exact match; a relation comparing module 2904 compares the relations extracted from the question with all person-centric relations associated with the user and determines whether there is at least one exact match; and a match decision unit 2910 determines whether there exists an entity-relation argument in person-centric knowledge database 532 based on the comparison results. If there is an exact match with respect to one entity and an exact match with respect to one relation associated with the one entity, match decision unit 2910 determines that there exists an entity-relation argument in person-centric knowledge database 532. In some embodiments, if there are two exact matches with respect to two entities, match decision may also determine that there exists an entity-relation argument in person-centric knowledge database 532. The criteria to determine whether there exists an entity-relation argument in person-centric knowledge database 532 are not limited to the examples described above, and may be based on other features extracted from the question and/or any combination of the features extracted from the question.

Figure 30:
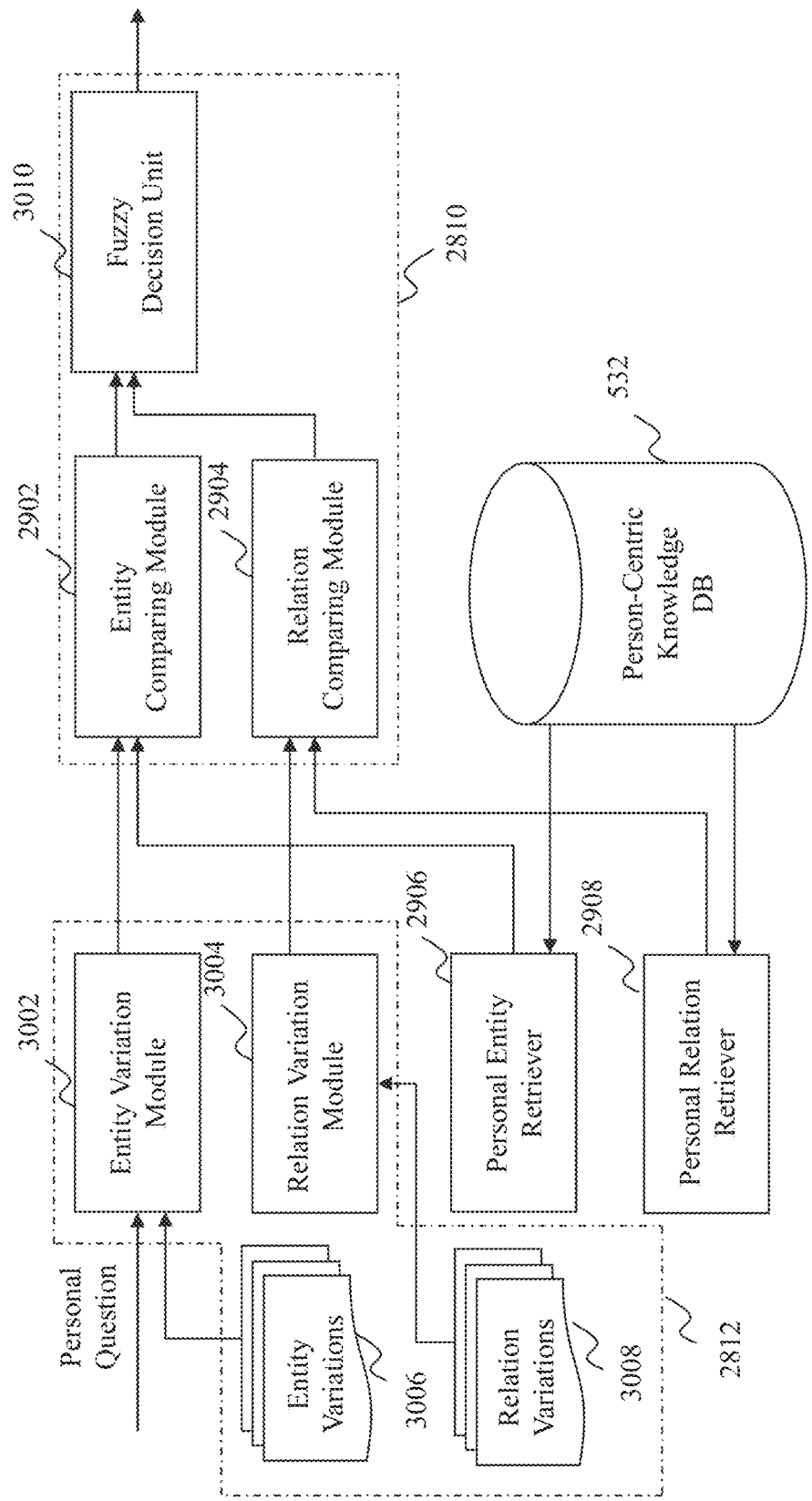
FIG. 30 depicts an exemplary system diagram for providing synthetic answers to a personal question, according to another embodiment of the present teaching.

FIG. 30 depicts an exemplary system diagram for providing synthetic answers to a personal question, according to another embodiment of the present teaching. When exact match decision module 2808 determines that no exact match is found, fuzzy match decision module 2810 receives from personal question variation module 2812 one or more variations of the entities and relations extracted from the personal question, and performs a fuzzy decision on whether an entity-relation argument exists in person-centric knowledge database 532. Personal question variation module 2812 comprises an entity variation module 3002, a relation variation module 3004, an entity variation library 3006, and a relation variation library 3008. An entity extracted from the question is transformed to one or more entity variations based on information from entity variation library 3006, and a relation extracted from the question is transformed to one or more variations based on information from relation variation library 3008. Variations of an entity may be a nick name of the entity, an abbreviation of the entity, a relation with another entity, an adjective of the entity, a synonym of the entity, another entity with similar meaning, etc. Variations of a relation may be a linguistic format of the relation, an entity, a synonym of the relation, another entity and/or relation with similar meaning, etc. The variations of the entities and relations are initially collected from Internet and are dynamically updated with respect to the question being asked. In some embodiments, words embedded over a large corpus of user texts are collected and trained to measure similarities between these words. Entity variation library 3006 and relation variation library 3008 as illustrated are separate components; however, they may also be integrated into one variation library. In some embodiments, entity variation library 3006 and relation variation library 3008 may be incorporated into person-centric knowledge database 532. Each of the entity variation is compared with the person-centric entities to determine whether there is a match, and each of the relation variation is compared with the person-centric relations to determine whether there is a match. If there is a match with respect to one entity variation and a match with respect to one relation variation associated with the one entity, fuzzy decision unit 3010 determines that there exists an entity-relation argument in person-centric knowledge database 532. In some embodiments, if there are two matches with respect to the variations of two entities, match decision may also determine that there exists an entity-relation argument in person-centric knowledge database 532. In some embodiments, after comparing all entity variations and relation variations, fuzzy decision unit 3010 may determine that more than one entity-relation argument exists in person-centric knowledge database 532. The criteria to determine whether there exists an entity-relation argument in person-centric knowledge database 532 are not limited to the examples described above, and may be based on other features extracted from the question and/or any combination of the features extracted from the question.

Figure 31:
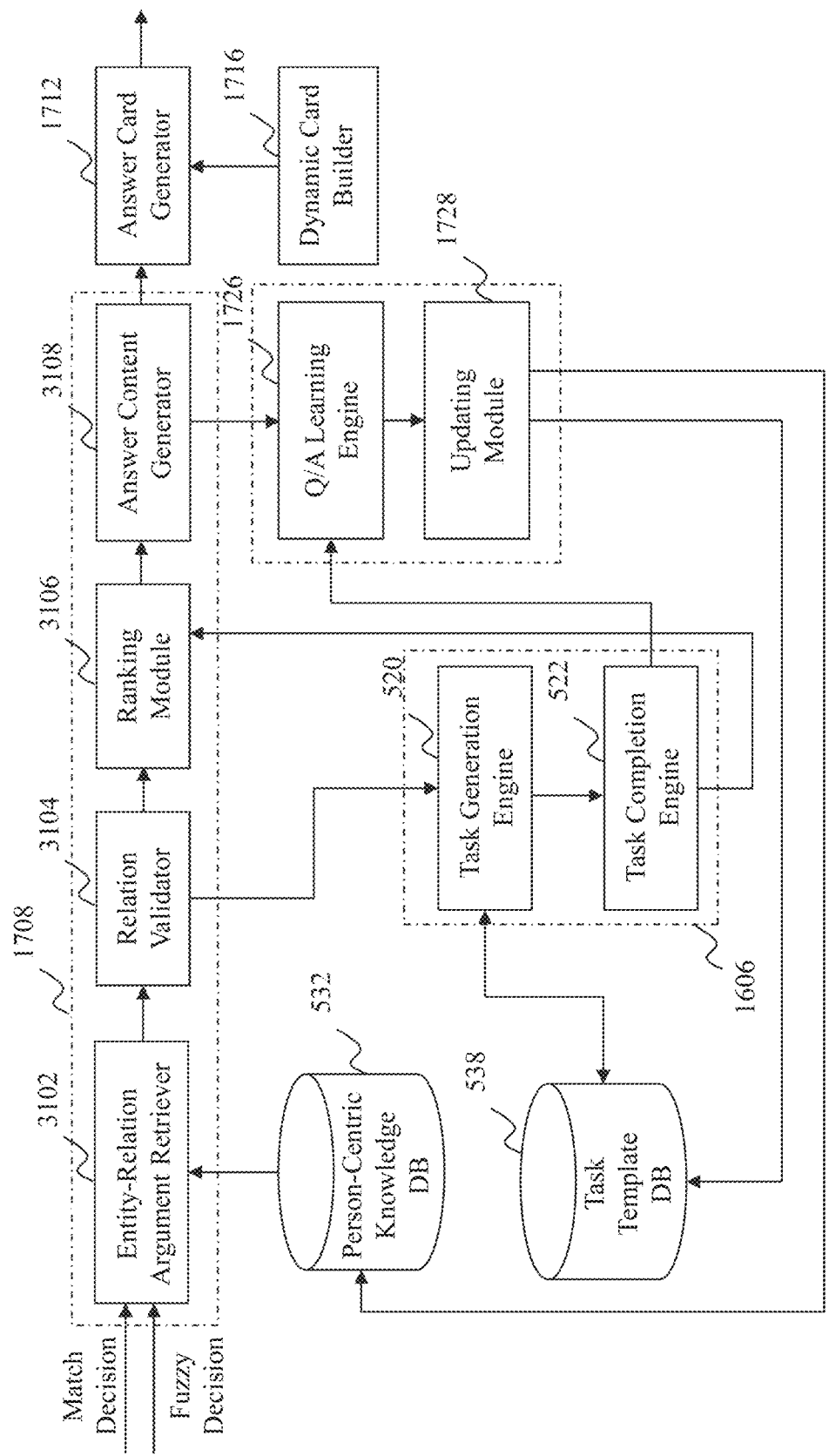
FIG. 31 depicts an exemplary system diagram for generating synthetic answers to a personal question, according to an embodiment of the present teaching.

FIG. 31 depicts an exemplary system diagram for generating synthetic answers to a personal question, according to an embodiment of the present teaching. Synthetic answer engine 1708 receives inputs from exact match decision module 2808 and fuzzy match decision module 2810. Synthetic answer engine 1708 determines whether a task request to search for up-to-date answers needs to be generated. The inputs from exact match decision module 2808 and fuzzy match decision module 2810 include one or more entries, each of which having at least an entity and a relation associated with the entity, and the entity and the relation are both found in person-centric knowledge database 532. The inputs may have other formats of the matched entities and relations and are not limited to the description above. If it is determined that there is a need to search for up-to-date answers to the personal question, synthetic answer engine 1708 sends the task request to task-driven answer search engine 1606 to perform the task.

Synthetic answer engine 1708 comprises an entity-relation argument retriever 3102, a relation validator 3104, a ranking module 3106, and an answer content generator 3108. Entity-relation argument retriever 3102 is configured to retrieve one or more arguments from person-centric knowledge database 532, each of which has a matched entity and a matched relation. Relation validator 3104 is configured to determine whether the relation between two entities is valid and/or up-to-date. As some relation may be a long-term relation and last long, such as the relation between Joe, a regular Amazon shopper and Amazon, other relations may be a short-term or a temporary relation, such as the relation between Joe and FedEx. An argument associated with Joe and FedEx may be set as invalid or out-of-date once FedEx completed a delivery. When a new question triggers extracting the argument of Joe-FedEx, relation validator 3104 sends a task request to task generation engine 520 to search for an up-to-date answer from the FedEx website if the Joe-FedEx relation is discovered as invalid or out-of-date. Task generation engine 520 creates a list of tasks that need to be completed in order to search the up-to-date answer from the FedEx website. Task generation engine 520 may use a template from task template database 538 or create a new template. Task completion engine 522 further performs each of the listed tasks in order to obtain the up-to-date answer. In some embodiments, if the relation is determined to be valid, the one or more entity-relation arguments are sent to ranking module 3106 to prioritize the arguments. In some embodiment when there is a newly searched up-to-date answer, the one or more entity-relation arguments and the newly searched up-to-date answer are both sent to ranking module 3106 to prioritize. The newly searched up-to-date answer is further sent to Q/A learning engine 1726 to update person-centric knowledge database 532 and task template database 539 via updating module 1728. The functions of Q/A learning engine 1726 and updating module 1728 are described above, and thus, are not detailed herein.

Answer content generator 3108 is configured to generate the content related to the answer, which may include textual description of the answer, information related to the answer, recommended information that may interest the user, etc. The answer content is further forwarded to answer card generator 1712 to generate one or more answer cards. The functions of answer card generator 1712 and dynamic card builder 538 are described foregoing, and therefore, are not detailed herein.

Figure 32:
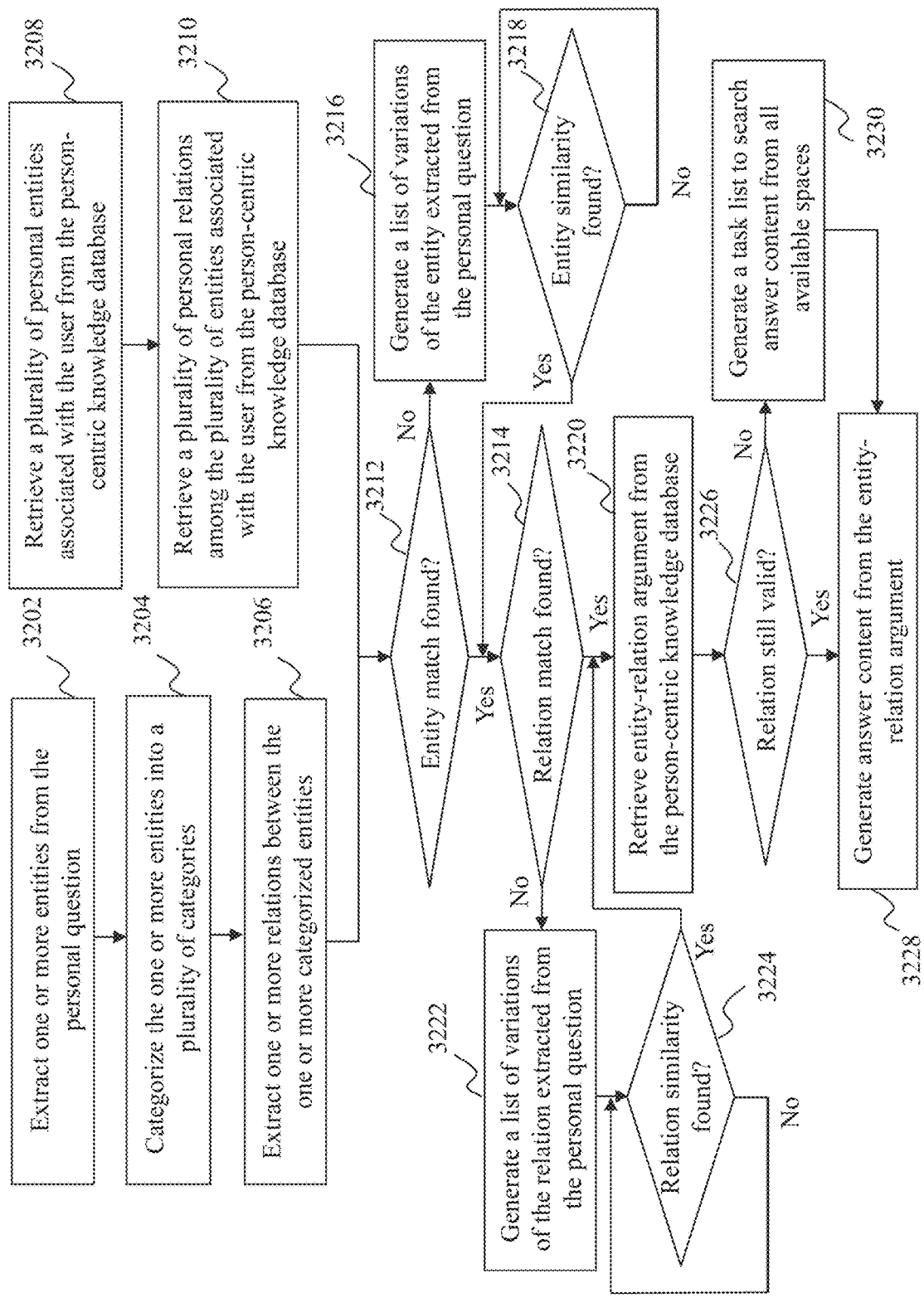
FIG. 32 is a flowchart of an exemplary process for generating synthetic answers to a personal question, according to an embodiment of the present teaching.

FIG. 32 is a flowchart of an exemplary process for generating synthetic answers to a personal question, according to an embodiment of the present teaching. One or more entities are extracted from the personal question at 3202. The one or more entities are further categorized into a plurality of categories at 3204. Based on the extracted entities and the categories, one or more relations between the one or more categorized entities are extracted from the question at 3206. Meanwhile, a plurality of person-centric entities associated with the user are retrieved from the person-centric knowledge database at 3208, and a plurality of person-centric relations among the plurality of person-centric entities are retrieved from the person-centric knowledge database at 3210. A decision as to whether a match is found between entities extracted from the question and the plurality of person-centric entities is made at 3212. If there is an entity match, a decision as to whether a match is found between relations extracted from the question and the plurality of person-centric relations is made at 3214. If no entity match is found, a list of variations of the entity extracted from the question is generated at 3216. A further decision as to whether a match is found between the entities variations from the question and the plurality of person-centric entities is made at 3218. If no relation match is found, a list of variations of the relations extracted from the question is generated at 3222. A further decision as to whether a match is found between the relation variations from the question and the plurality of person-centric relations is made at 3224. Further, one or more entity-relation arguments are retrieved from the person-centric knowledge database at 3220. A decision as to whether the relation is still valid is made at 3226. If the relation is determined to be valid, answer content is generated from the entity-relation argument at 3228. If the relation is determined to be not valid, a list of tasks is generated to search answer content from all available resources at 3230.

Figure 33:
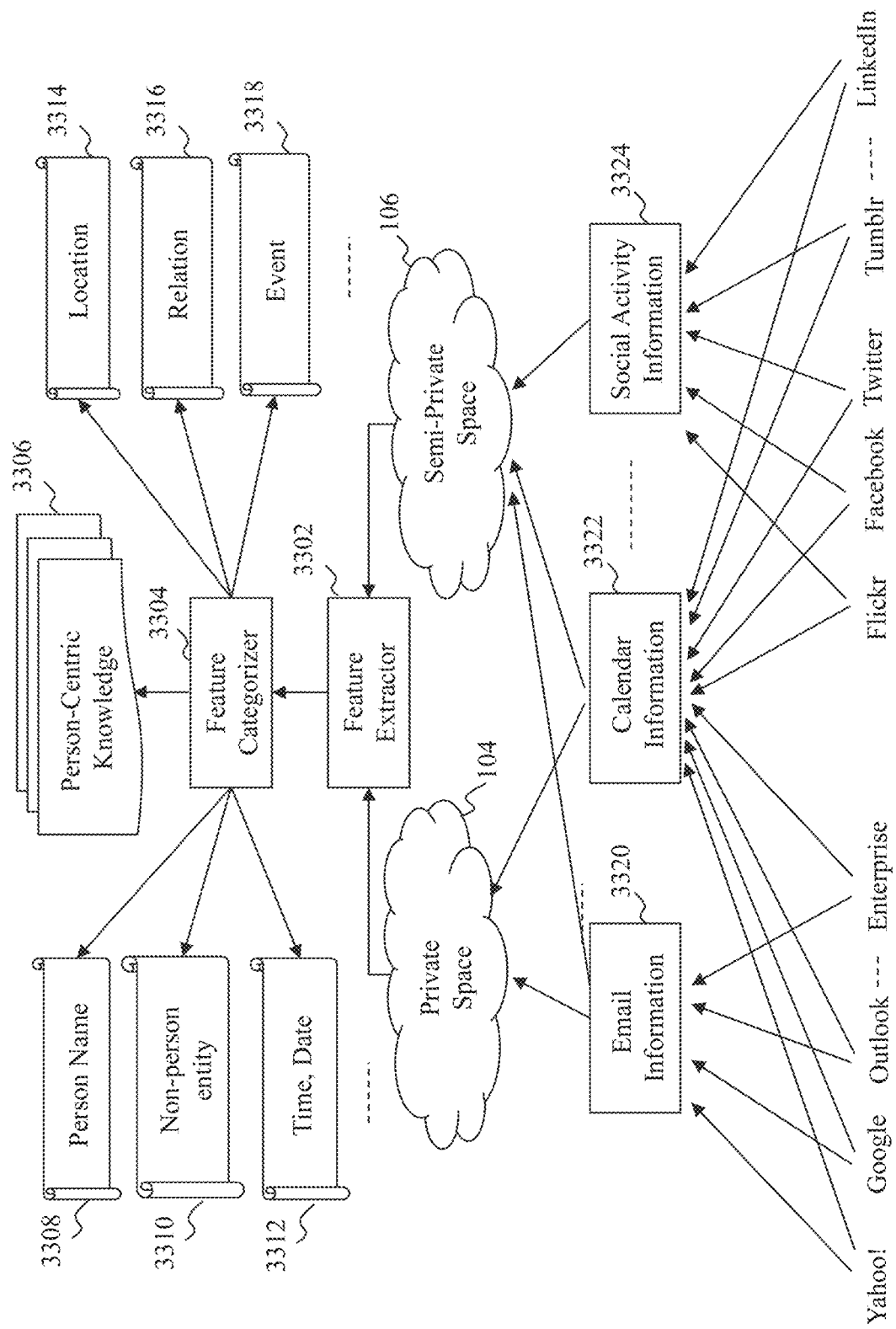
FIG. 33 depicts an example of generating person-centric knowledge, according to an embodiment of the present teaching.

FIG. 33 depicts an example of generating person-centric knowledge, according to an embodiment of the present teaching. According to the illustrated embodiment, person-centric knowledge 3306 is constructed based on information collected from private space 104 and semi-private space 106. Feature extractor 3302 is configured to collect email information 3320, calendar information 3322, social activity information 3324, etc. associated with a user from private space 104 and semi-private space 106. Feature categorizer 3304 is configured to categorize the collected information into a plurality of categories including but not limited to a person's name 3308, a non-personal entity 3310, time and/or date 3312, location 3314, relation 3316, event 3318, etc. The categorized features associated with the user are stored as person-centric knowledge associated with the user. It should be appreciated that the examples to construct person-centric knowledge are for illustrative purpose and are not intended to be limiting. The present teaching may acquire other features from private space 104 and semi-private space 106 to construct person-centric knowledge.

FIG. 34 depicts an exemplary person-centric knowledge for providing synthetic answers to a personal question, according to an embodiment of the present teaching. In one example, four entities are extracted from a previously asked question including Taylor Swift, Verizon Center, Concert, and Oct. 10, 2015, and one relation is extracted as Book e-ticket. Two arguments are created with respect to the extracted entities and relation. One argument states that Taylor Swift's concert is on Oct. 10, 2015, and another argument states that Taylor Swift's concert is at Verizon Center. In another example, three entities are extracted from a previously asked question including Uncle Sam, Annie, and 55, and one relation is extracted as wife. One argument states that Annie is Uncle Sam's wife, and another argument states that Annie is 55 years old. The examples shown in FIG. 34 are for illustrative purpose; however, the present teaching is not intended to be limiting, and may have more or less entity categories and arguments in the person-centric knowledge.

FIG. 35 depicts an exemplary person-centric knowledge for providing synthetic answers to a personal question, according to another embodiment of the present teaching. Person-centric knowledge 3306 may comprise one or more variations of an entity, for example, Verizon Center may has variations as Stadium, Center, and Washington D.C., and Recreation Center may has variations as Gym, Exercise, Swimming pool, and Racquet Court. The examples shown in FIG. 35 are for illustrative purpose; however, the present teaching is not intended to be limiting, and may have more or less entity variations in the person-centric knowledge.

FIG. 36 depicts an exemplary person-centric knowledge for providing synthetic answers to a personal question, according to another embodiment of the present teaching. Person-centric knowledge 3306 may comprise one or more variations of a relation, for example, Book may have variations as Purchase, Order, Buy, and Reserve, and Call may have variations as Conference, Meet, and Discuss. The examples shown in FIG. 36 are for illustrative purpose; however, the present teaching is not intended to be limiting, and may have more or less relation variations in the person-centric knowledge.

FIG. 37 depicts an example of obtaining synthetic answers to a personal question based on the person-centric knowledge, according to an embodiment of the present teaching. When a question of "How old is Uncle Sam's wife?" is asked, the system searches for possible matches between Uncle Sam and Wife. An exact match between Uncle Sam and Wife is found, and therefore, answer content is obtained from two arguments that "Annie is Uncle Sam's wife;" and "Annie is 55 years old." In another example, a question of "Taylor Swift's concert in a DC stadium?" is asked. The system searches for possible matches between entities including Taylor Swift, Concert, DC, and Stadium. Exact matches are found with respect to Taylor Swift and Concert, while fuzzy matches are found with respect to DC and Stadium because DC and Stadium are listed as variations of Verizon Center. Based on the results, answer content is obtained as "Taylor Swift's concert is in Verizon Center." It should be appreciated that the examples shown in FIG. 37 are for illustrative purpose; however, the present teaching is not intended to be limiting, and may have other decision schemes using the person-centric knowledge.

Figure 38:
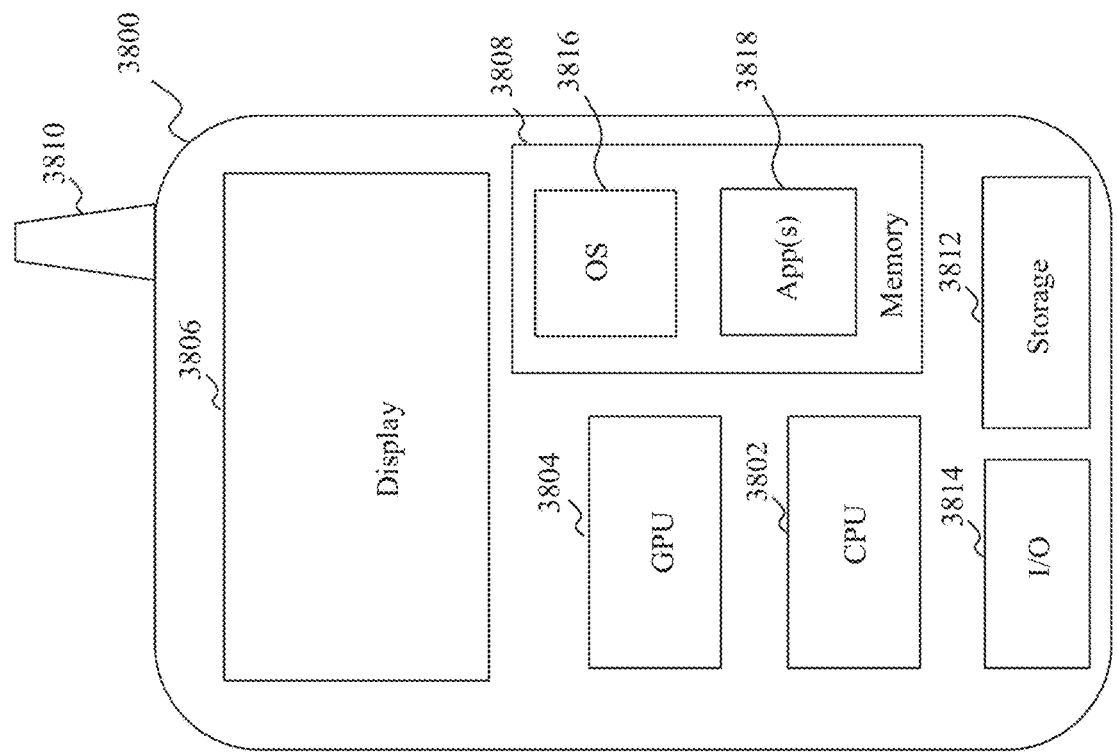
FIG. 38 depicts a general mobile device architecture on which the present teaching can be implemented.

FIG. 38 depicts a general mobile device architecture on which the present teaching can be implemented. In this example, the person's device is a mobile device 1300, including but is not limited to, a smart phone, a tablet, a music player, a handled gaming console, a global positioning system (GPS) receiver, a smart-TV, wearable devices, etc. The mobile device 1300 in this example includes one or more central processing units (CPUs) 3802, one or more graphic processing units (GPUs) 3804, a display 3806, a memory 3808, a communication platform 3810, such as a wireless communication module, storage 3812, and one or more input/output (I/O) devices 3814. Any other suitable component, such as but not limited to a system bus or a controller (not shown), may also be included in the mobile device 3800. As shown in FIG. 38, mobile operating system 3816, e.g., iOS, Android, Windows Phone, etc., and one or more applications 3818 may be loaded into the memory 3808 from the storage 3812 in order to be executed by the CPU 3802. The applications 3818 may include a browser or any other suitable mobile apps for sending a question and rendering the answer results page including through the mobile device 3800. Execution of the applications 3818 may cause the mobile device 3800 to perform the processing as described above in the present teaching. For example, presentation of an answer results page may be made by the GPU 3804 in conjunction with the display 3806. A question may be inputted by the person via the I/O devices 3814 and transmitted via the communication platform 3810.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 39:
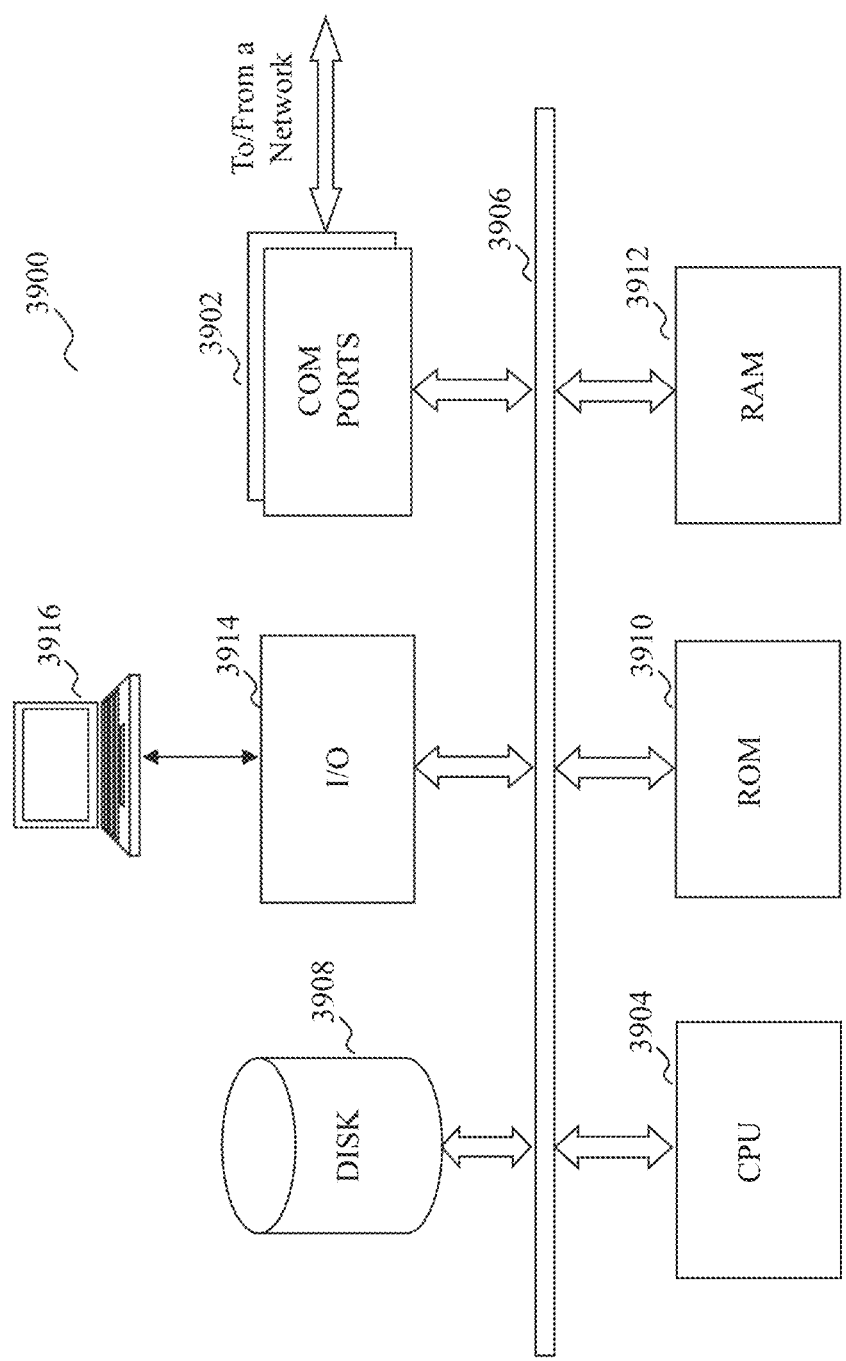
FIG. 39 depicts a general computer architecture on which the present teaching can be implemented.

FIG. 39 depicts a general computer architecture on which the present teaching can be implemented. The computer may be a general-purpose computer or a special purpose computer. This computer 3900 can be used to implement any components of the question answering architecture as described herein. Different components of the system in the present teaching can all be implemented on one or more computers such as computer 3900, via its hardware, software program, firmware, or a combination thereof. Although only one such computer is shown, for convenience, the computer functions relating to the target metric identification may be implemented in a distributed fashion on a number of similar platforms, to distribute the processing load.

The computer 3900, for example, includes COM ports 3902 connected to and from a network connected thereto to facilitate data communications. The computer 3900 also includes a central processing unit (CPU) 3904, in the form of one or more processors, for executing program instructions. The exemplary computer platform includes an internal communication bus 3906, program storage and data storage of different forms, e.g., disk 3908, read only memory (ROM) 3910, or random access memory (RAM) 3912, for various data files to be processed and/or communicated by the computer, as well as possibly program instructions to be executed by the CPU. The computer 3900 also includes an I/O component 3914, supporting input/output flows between the computer and other components. The computer 3900 may also receive programming and data via network communications.

Hence, aspects of the method of question answering, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is appreciated that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for providing synthetic answers to a personal question, the method comprising:
   determining whether a question from a person is a personal question or a non-personal question;
   if the question is a personal question,
      accessing information in a person-centric space with respect to the user, wherein the person-centric space is constructed by cross-linking information from a public space, a semi-private space, and a private space,
      extracting one or more entities from the personal question,
      identifying one or more relations among the one or more entities based on the personal question,
      matching the extracted one or more entities with person-centric entities in the person-centric space with respect to the user,
      matching the identified one or more relations with person-centric relations of the user in the person-centric space,
      generating one or more answers to the personal question based on at least one of the one or more entities that matches the person-centric entities and at least one of the one or more relations that matches the person-centric relations, and
      presenting the one or more answers to the personal question via a card to be displayed on a device operated by the person; and
   if the question is a non-personal question, searching one or more answers to the non-personal question in the public space.

2. The method according to claim 1, further comprising:
   retrieving a model selected based on the personal question, wherein the selected model comprises one or more entity-relation arguments generated based on information associated with the person.

3. The method according to claim 1, further comprising:
   determining whether there is an exact match between the one or more entities and the selected model, and an exact match between the one or more relations and the selected model;
   and
   when there is an exact match between the one or more entities and the selected model and an exact match between the one or more relations and the selected model, obtaining a first set of answers from the selected model.

4. The method according to claim 3, further comprising:
   when there is no exact match between the one or more entities and the selected model or there is no exact match between the one or more relations and the selected model, obtaining a second set of answers from the selected model that satisfy a first fuzzy match between the one or more entities and the selected model and a second fuzzy match between the one or more relations and the selected model.

5. The method according to claim 2, wherein the selected model is trained using a machine learning system.

6. The method according to claim 2, wherein each of the one or more entity-relation arguments indicates an aspect of person-centric knowledge associated with the person.

7. The method according to claim 1, further comprising:
   determining validities of the one or more answers; and
   when it is determined that one answer is invalid, generating a list of tasks to search for information that validates the answer.

8. The method of claim 1, wherein the person-centric space is constructed by projecting the cross-linked information from the public space, semi-private space, and private space onto the person-centric space.

9. A system having at least one processor, storage, and a communication platform connected to a network for providing synthetic answers to a personal question, the system comprising:
   a classification decision module implemented on the at least one processor and configured to determine whether a question from a person is a personal question or a non-personal question;
   a person-centric knowledge retriever implemented on the at least one processor and configured to, if the question is a personal question, access information in a person-centric space with respect to the user, wherein the person-centric space is constructed by cross-linking information from a public space, a semi-private space, and a private space,
   an entity extractor implemented on the at least one processor and configured to extract one or more entities from the personal question;
   a relation identifier implemented on the at least one processor and configured to identify one or more relations among the one or more entities based on the personal question;
   a synthetic answer engine implemented on the at least one processor and configured to
      match the extracted one or more entities with person-centric entities in the person-centric space with respect to the user,
      match the identified one or more relations with person-centric relations of the user in the person-centric space,
      generate one or more answers to the personal question based on at least one of the one or more entities that matches the person-centric entities and at least one of the one or more relations that matches the person-centric relations, and
      present the one or more answers to the personal question via a card to be displayed on a device operated by the person; and
   a public answer search engine implemented on the at least one processor and configured to, if the question is a non-personal question, searching one or more answers to the non-personal question in the public space.

10. The system according to claim 9, wherein the synthetic answer engine is further configured to
    retrieve a model selected based on the personal question, wherein the selected model comprises one or more entity-relation arguments generated based on information associated with the person.

11. The system according to claim 9, wherein the synthetic answer engine comprises:
    an exact match decision module implemented on the at least one processor and configured to determine whether there is an exact match between the one or more entities and the selected model and whether there is an exact match between the one or more relations and the selected model, wherein when there is an exact match between the one or more entities and the selected model and there is an exact match between the one or more relations and the selected model, the synthetic answer engine obtains a first set of answers from the selected model.

12. The system according to claim 11, wherein the synthetic answer engine comprises:

a fuzzy match decision module implemented on the at least one processor and configured to determine a first fuzzy match between the one or more entities and the selected model and a second fuzzy match between the one or more relations and the selected model, wherein the synthetic answer engine is further configured to obtain a second set of answers from the selected model.

13. The system according to claim 9, wherein the selected model is trained using a machine learning system.

14. The system according to claim 10, wherein each of the one or more entity-relation arguments indicates an aspect of person-centric knowledge associated with the person.

15. The system according to claim 9, wherein the synthetic answer engine is further configured to determine validities of the one or more answers; and when it is determined that one answer is invalid, generate a list of tasks to search for information that validates the answer.

16. A non-transitory machine-readable medium having information recorded thereon for providing synthetic answers to a personal question, wherein the information, when read by the machine, causes the machine to perform the following:

determining whether a question from a person is a personal question or a non-personal question;

if the question is a personal question, accessing information in a person-centric space with respect to the user, wherein the person-centric space is constructed by cross-linking information from a public space, a semi-private space, and a private space, extracting one or more entities from the personal question;

identifying one or more relations among the one or more entities based on the personal question, matching the extracted one or more entities with person-centric entities in the person-centric space with respect to the user, matching the identified one or more relations with person-centric relations of the user in the person-centric space, generating one or more answers to the personal question based on at least one of the one or more entities that matches the person-centric entities and at least one of the one or more relations that matches the person-centric relations, and presenting the one or more answers to the personal question via a card to be displayed on a device operated by the person; and if the question is a non-personal question, searching one or more answers to the non-personal question in the public space.

17. The non-transitory machine-readable medium of claim 16, further comprising:

retrieving a model selected based on the personal question, wherein the selected model comprises one or more entity-relation arguments generated based on information associated with the person.

18. The non-transitory machine-readable medium of claim 16, wherein the information, when read by the machine, causes the machine to further perform the following:

determining whether there is an exact match between the one or more entities and the selected model, and an exact match between the one or more relations and the selected model;

and when there is an exact match between the one or more entities and the selected model and an exact match between the one or more relations and the selected model, obtaining a first set of answers from the selected model.

19. The non-transitory machine-readable medium of claim 18, wherein the information, when read by the machine, causes the machine to further perform the following:

when there is no exact match between the one or more entities and the selected model or there is no exact match between the one or more relations and the selected model, obtaining a second set of answers from the selected model that satisfy a first fuzzy match between the one or more entities and the selected model and a second fuzzy match between the one or more relations and the selected model.

20. The non-transitory machine-readable medium of claim 17, wherein the selected model is trained using a machine learning system.

21. The non-transitory machine-readable medium of claim 16, wherein the information, when read by the machine, causes the machine to further perform the following:

determining validities of the one or more answers; and when it is determined that one answer is invalid, generating a list of tasks to search for information that validates the answer.

* * * * *